US011215790B2

(12) United States Patent
Nakamura

(10) Patent No.: US 11,215,790 B2
(45) Date of Patent: Jan. 4, 2022

(54) ZOOM LENS, OPTICAL APPARATUS AND METHOD FOR MANUFACTURING THE ZOOM LENS

(71) Applicant: Nikon Corporation, Tokyo (JP)

(72) Inventor: Keiichi Nakamura, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 182 days.

(21) Appl. No.: 15/761,889

(22) PCT Filed: Sep. 30, 2016

(86) PCT No.: PCT/JP2016/078979
§ 371 (c)(1),
(2) Date: Aug. 28, 2018

(87) PCT Pub. No.: WO2017/057662
PCT Pub. Date: Apr. 6, 2017

(65) Prior Publication Data
US 2019/0025545 A1 Jan. 24, 2019

(30) Foreign Application Priority Data

Sep. 30, 2015 (JP) .............................. JP2015-195291

(51) Int. Cl.
*G02B 3/02* (2006.01)
*G02B 13/18* (2006.01)
(Continued)

(52) U.S. Cl.
CPC ............... *G02B 9/60* (2013.01); *G02B 13/02* (2013.01); *G02B 13/06* (2013.01); *G02B 15/145121* (2019.08)

(58) Field of Classification Search
CPC .... G02B 1/041; G02B 13/009; G02B 15/173; G02B 15/14; G02B 15/20; G02B 15/22; H04N 5/23296
(Continued)

(56) References Cited

U.S. PATENT DOCUMENTS

2002/0060855 A1 5/2002 Ohashi
2010/0007967 A1 1/2010 Ohashi
(Continued)

FOREIGN PATENT DOCUMENTS

CN 103698878 A 4/2014
JP 2001-059938 A 3/2001
(Continued)

OTHER PUBLICATIONS

English Translation of International Search Report from International Patent Application No. PCT/JP2016/078979, dated Jan. 10, 2017.
(Continued)

*Primary Examiner* — Mahidere S Sahle
(74) *Attorney, Agent, or Firm* — SGPatents PLLC

(57) ABSTRACT

A zoom lens comprises, in order from an object: a first lens group (G1) having positive refractive power; a second lens group (G2) having negative refractive power; a third lens group (G3) having positive refractive power; a fourth lens group (G4) having negative refractive power; and a fifth lens group (G5) having positive refractive power, in which the first to the fifth lens groups (G1 to G5) each move in an optical axis direction upon zooming from a wide angle end state to a telephoto end state, at least a part of the fourth lens group (G4) is configured to serve as a focusing lens group to move in the optical axis direction upon focusing, the first lens group (G1) consists of two lenses, and the following conditional expression is satisfied.

$$0.30 < GD3/ft < 0.8$$

where,
GD3 denotes a thickness of the third lens group (G3) on the optical axis, and
(Continued)

ft denotes a focal length of the zoom lens in the telephoto end state.

25 Claims, 32 Drawing Sheets

(51) Int. Cl.
  *G02B 9/60* (2006.01)
  *G02B 15/14* (2006.01)
  *G02B 13/02* (2006.01)
  *G02B 13/06* (2006.01)
(58) Field of Classification Search
  USPC ...... 359/557, 686, 690, 695; 348/240.3, 345
  See application file for complete search history.

(56) References Cited

U.S. PATENT DOCUMENTS

| | | | |
|---|---|---|---|
| 2012/0087017 A1 | 4/2012 | Fujisaki | |
| 2013/0120853 A1* | 5/2013 | Hagiwara | G02B 15/14 359/684 |
| 2013/0258498 A1 | 10/2013 | Yanai et al. | |
| 2013/0286277 A1 | 10/2013 | Yanai et al. | |
| 2013/0335830 A1* | 12/2013 | Tashiro | G02B 27/64 359/683 |
| 2014/0085527 A1 | 3/2014 | Yamano | |
| 2014/0085531 A1 | 3/2014 | Yamano | |
| 2014/0125827 A1* | 5/2014 | Mimura | G02B 15/145121 348/208.6 |
| 2014/0198231 A1 | 7/2014 | Itoh | |
| 2014/0268365 A1 | 9/2014 | Nishio et al. | |
| 2014/0354857 A1 | 12/2014 | Kato et al. | |
| 2015/0177500 A1* | 6/2015 | Ori | G02B 15/163 359/557 |
| 2015/0219883 A1* | 8/2015 | Mogi | G02B 15/173 359/683 |
| 2016/0109692 A1 | 4/2016 | Shibata | |
| 2016/0349491 A1 | 12/2016 | Suzuki | |
| 2018/0031812 A1 | 2/2018 | Suzuki | |

FOREIGN PATENT DOCUMENTS

| | | |
|---|---|---|
| JP | 2002-244039 A | 8/2002 |
| JP | 2010-019931 A | 1/2010 |
| JP | 2011-237588 A | 11/2011 |
| JP | 2012-083472 A | 4/2012 |
| JP | 2013-210570 A | 10/2013 |
| JP | 2013-210571 A | 10/2013 |
| JP | 2013-231760 A | 11/2013 |
| JP | 2014-066944 A | 4/2014 |
| JP | 2014-066945 A | 4/2014 |
| JP | 2014-095754 A | 5/2014 |
| JP | 2014-138196 A | 7/2014 |
| JP | 2014-178478 A | 9/2014 |
| JP | 2014-235238 A | 12/2014 |
| JP | 2015-072369 A | 4/2015 |
| JP | 2015-099174 A | 5/2015 |
| JP | 2015-099175 A | 5/2015 |
| WO | WO 2014/208091 A1 | 12/2014 |
| WO | WO 2015/075904 A1 | 5/2015 |

OTHER PUBLICATIONS

English Translation of International Preliminary Reporton Patentability from International Patent PCT/JP2016/078979, dated Apr. 12, 2018.
Office Action dated Dec. 24, 2019, in Japanese Patent Application No. 2017-543607.
Office Action dated Dec. 9, 2019, in Chinese Patent Application No. 201680057764.1.
Office Action dated Mar. 26, 2019, in Japanese Patent Application No. 2017-543607.
Office Action dated Jul. 15, 2020, in Chinese Patent Application No. 201680057764.1.
Office Action dated Sep. 21, 2021, in Japanese Patent Application No. 2020-042684.

* cited by examiner

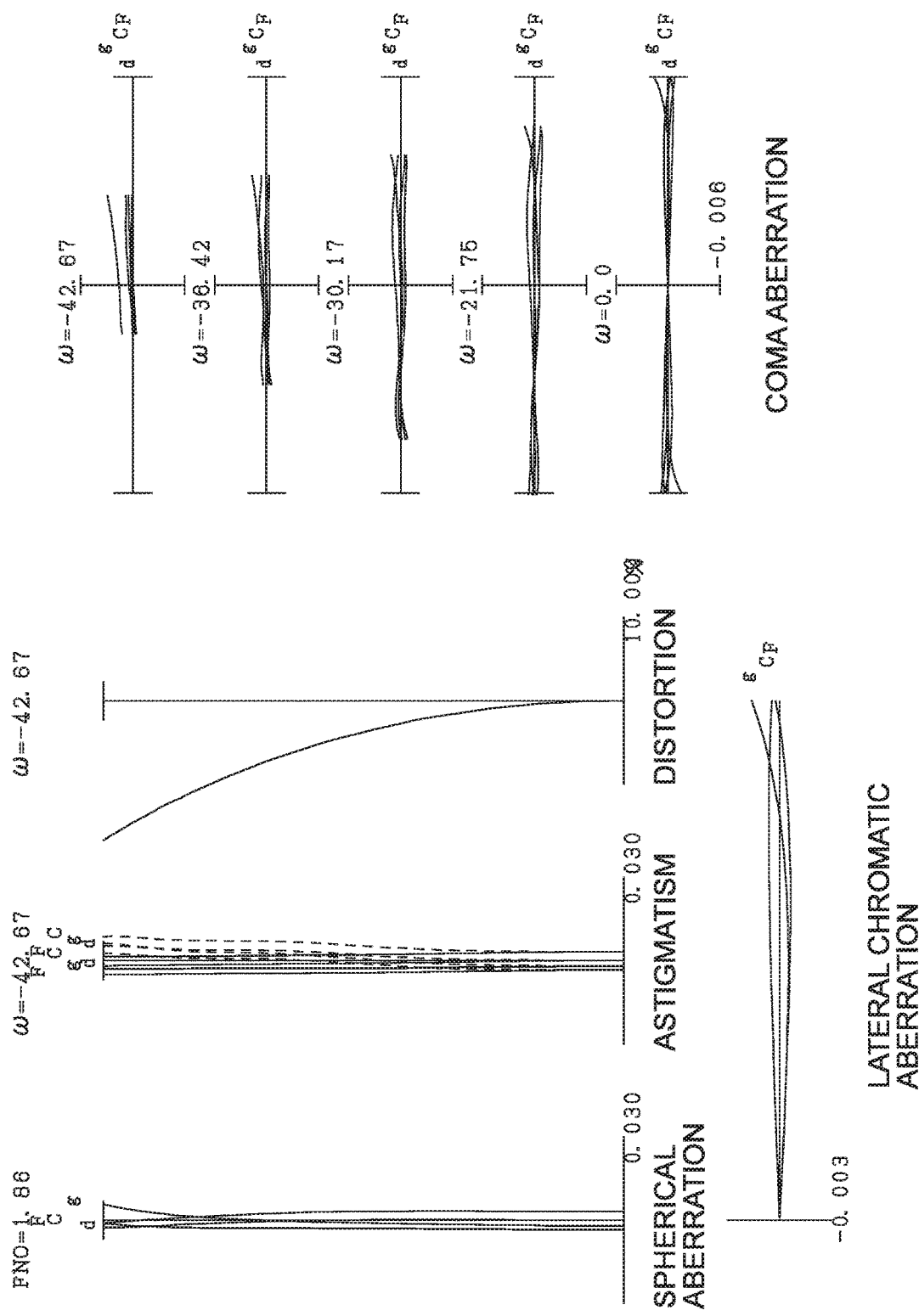

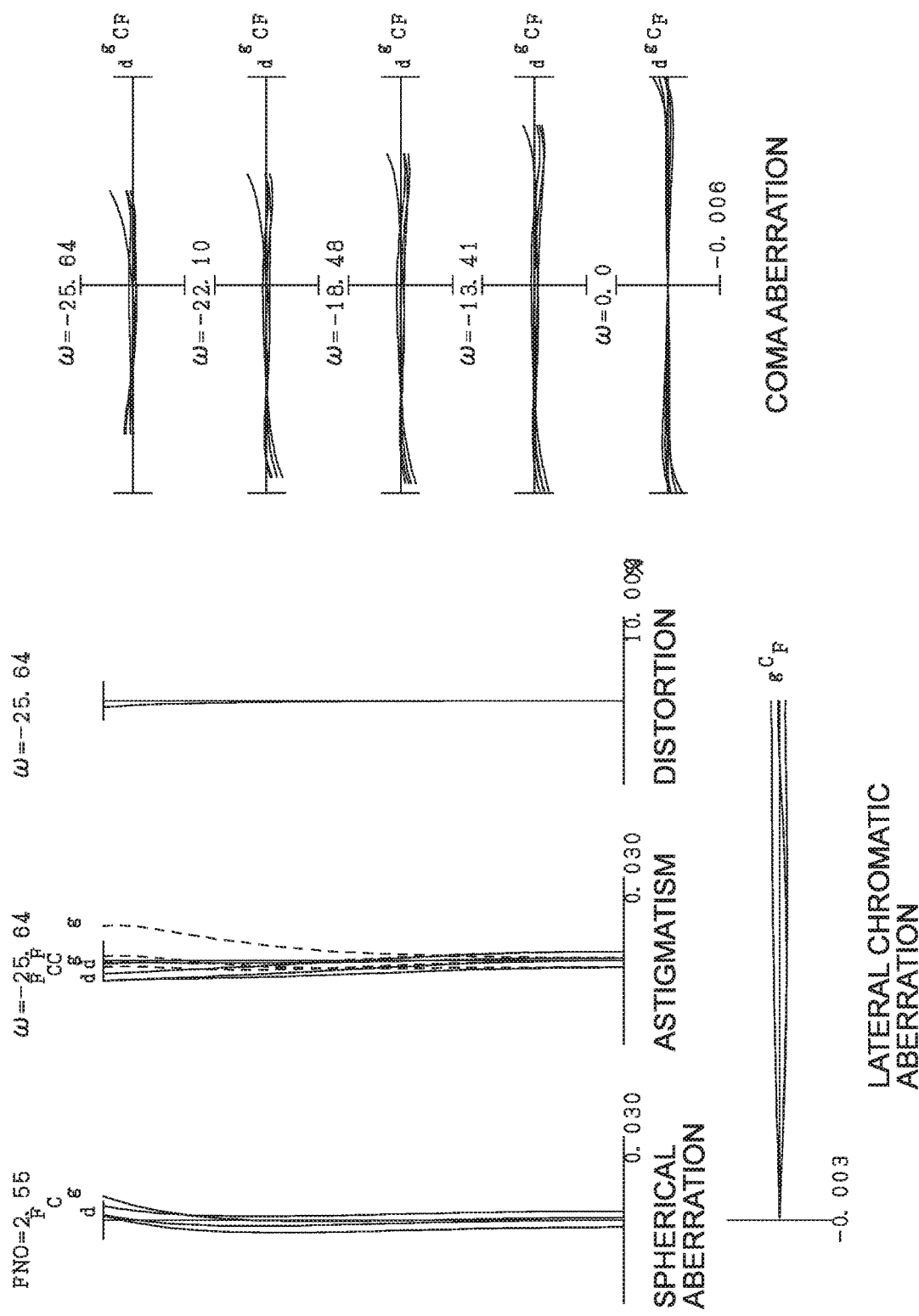

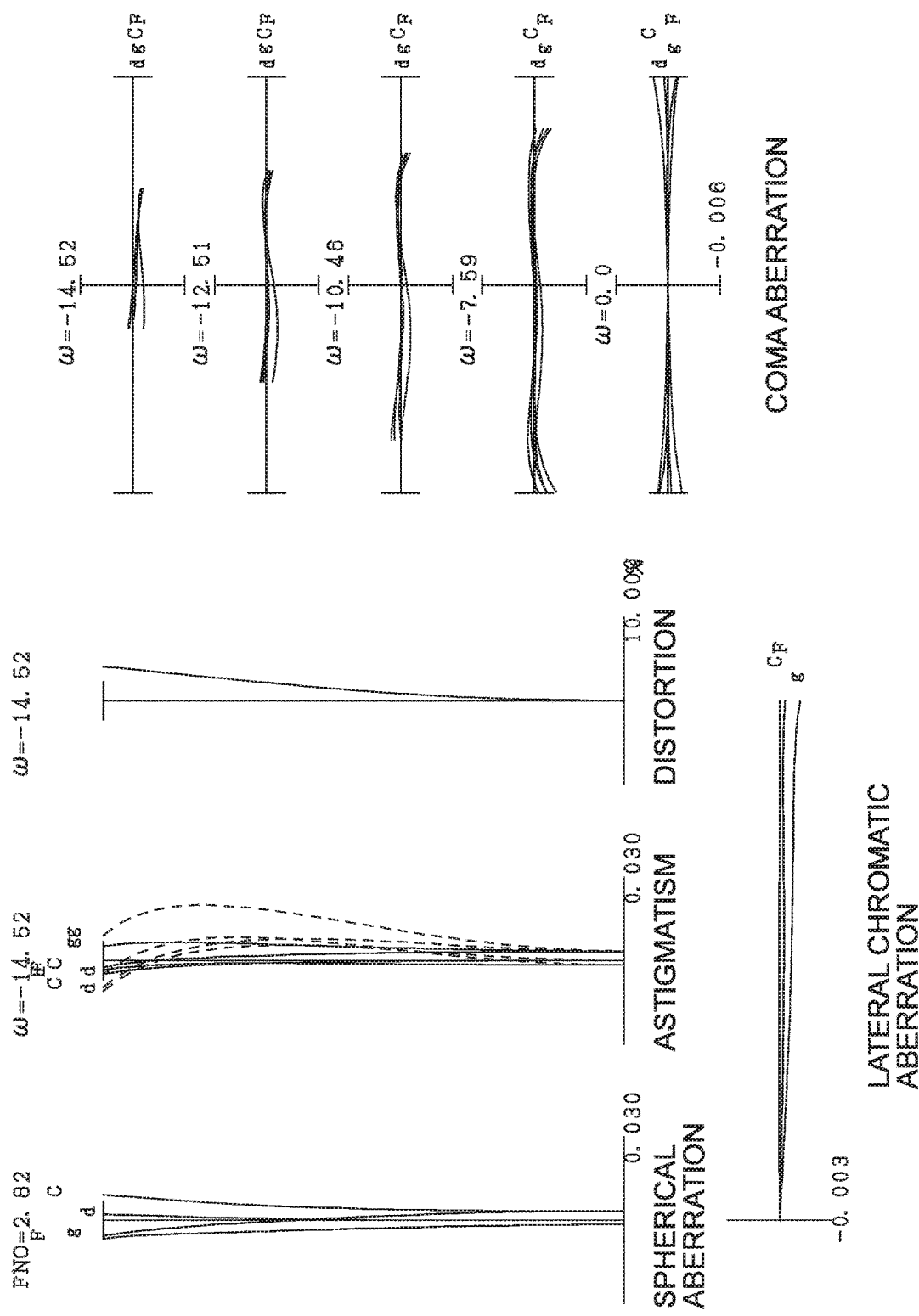

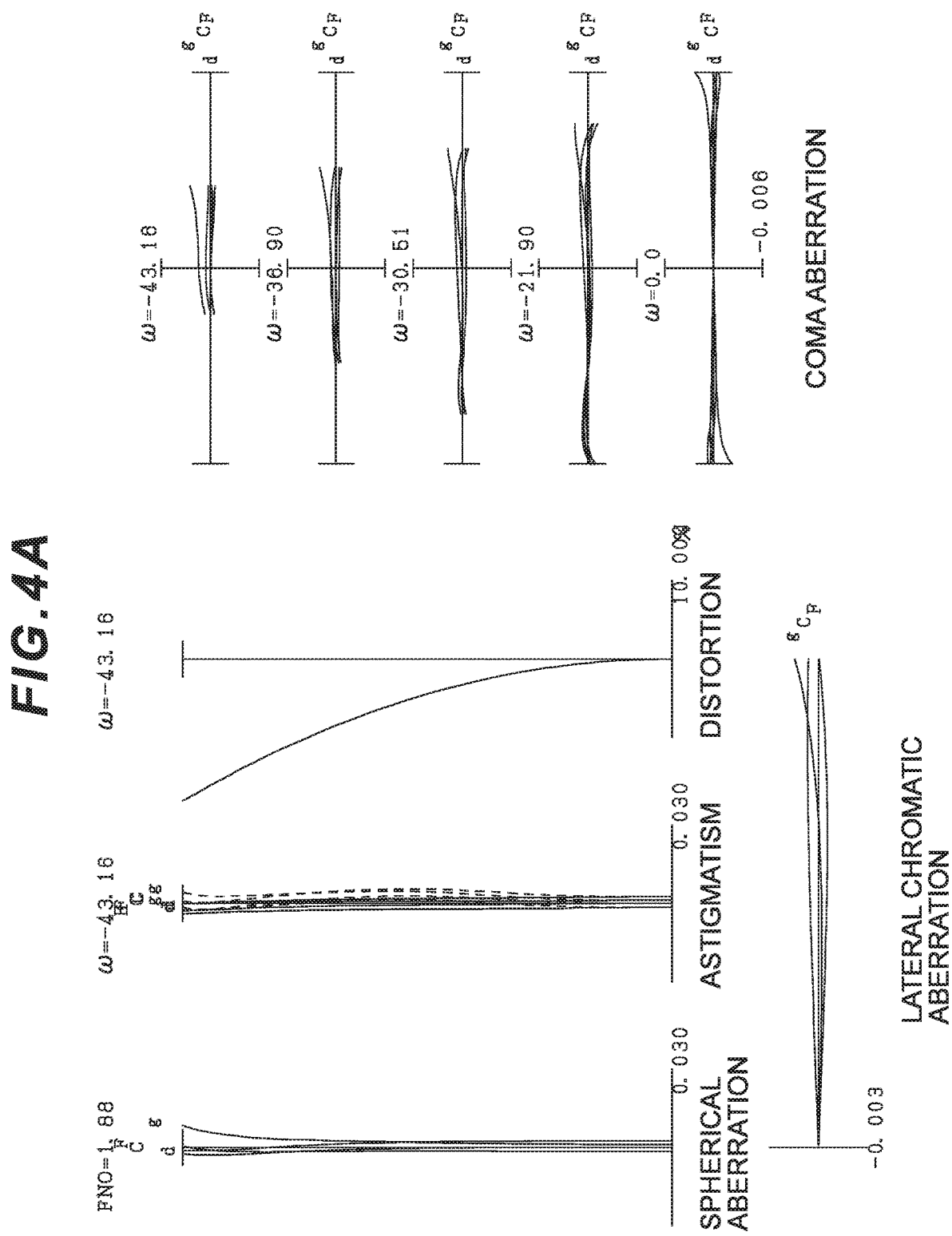

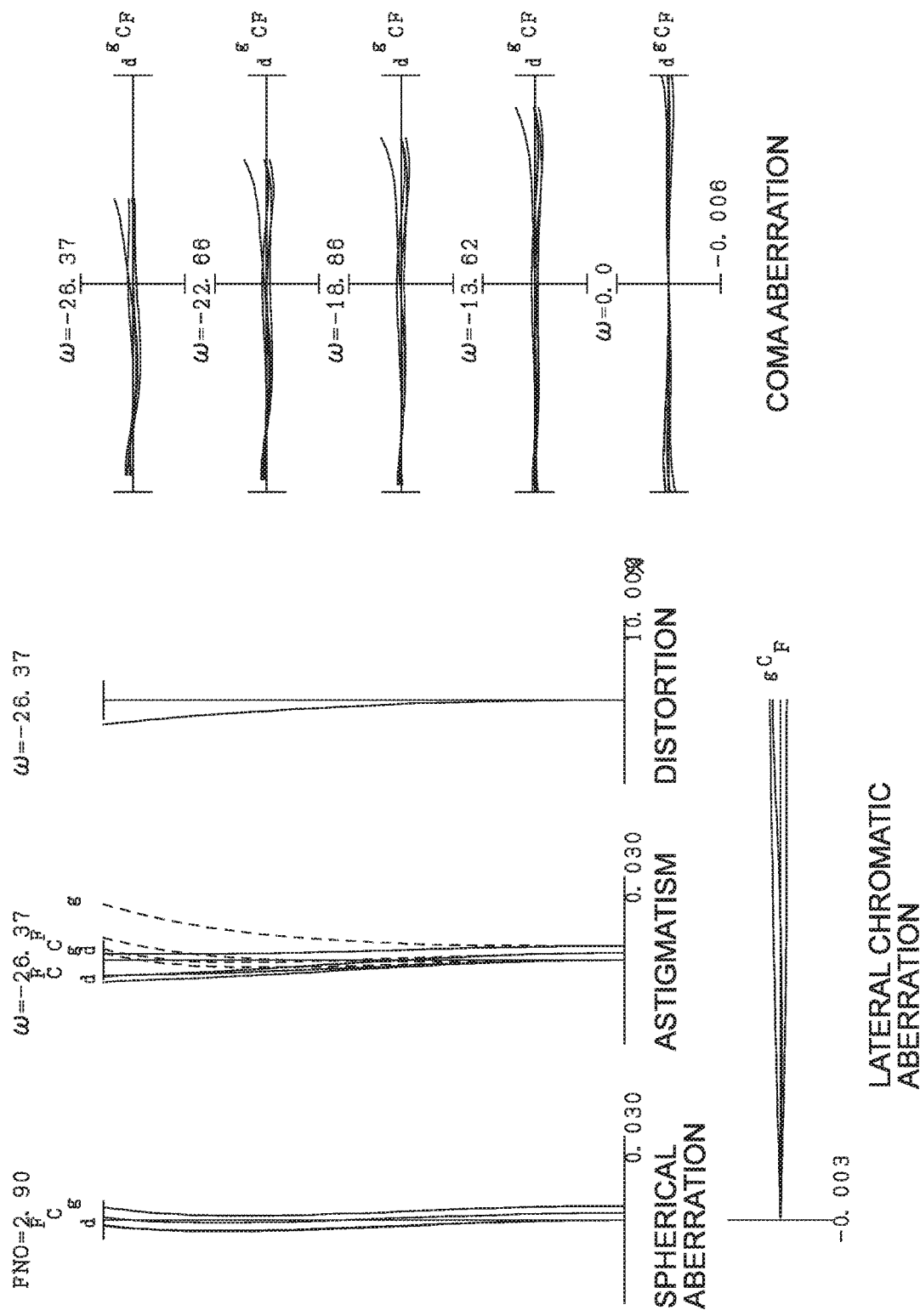

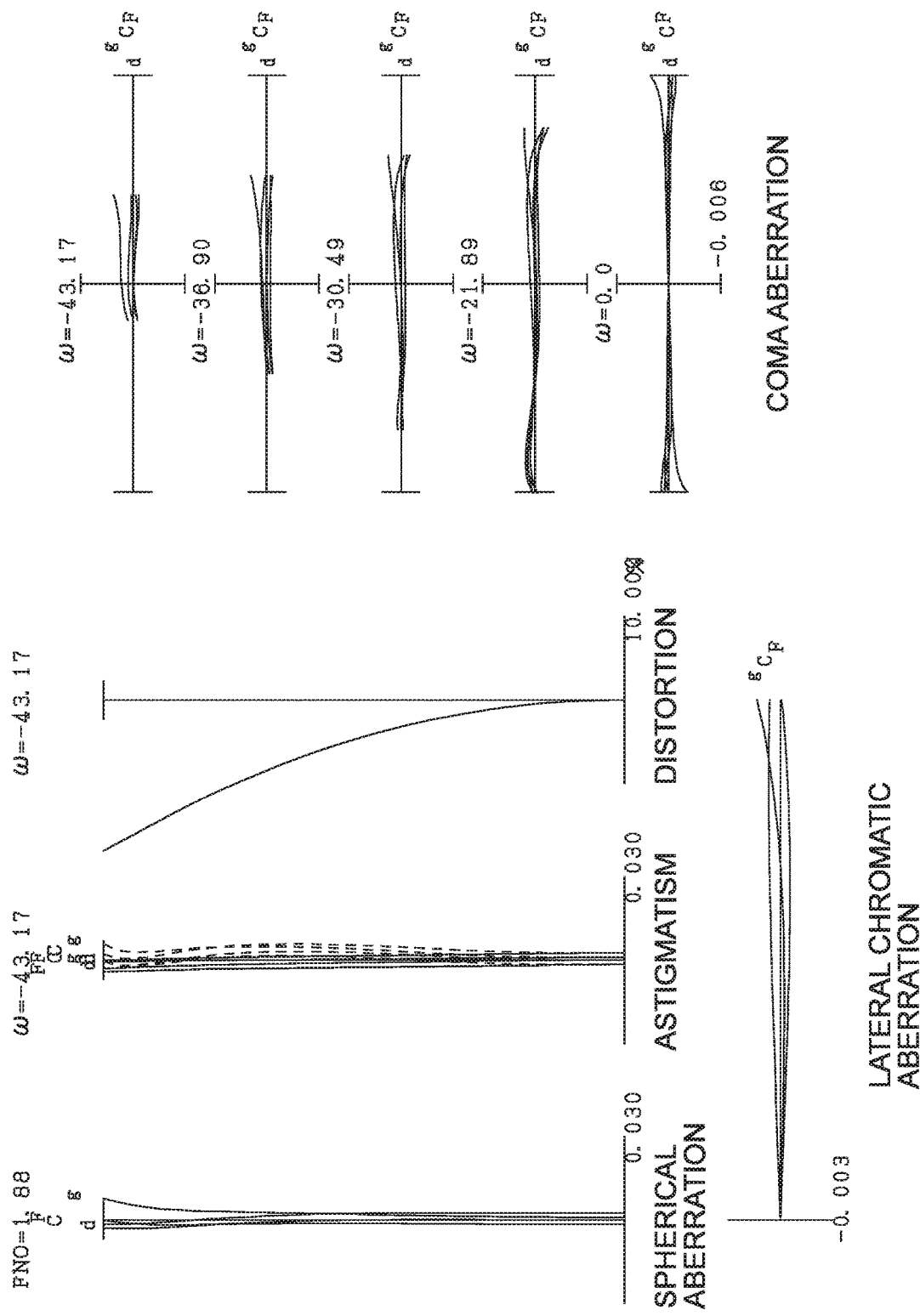

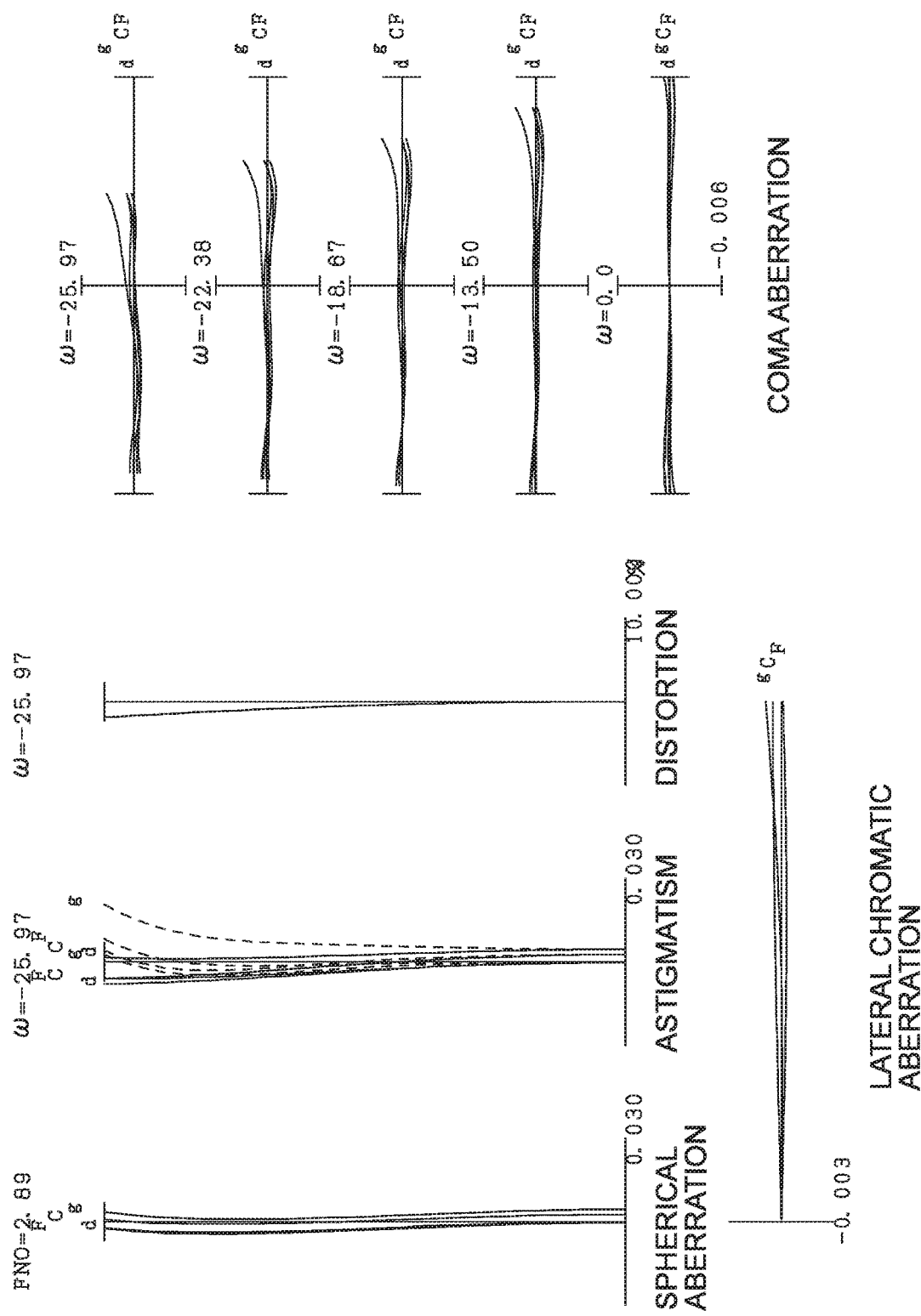

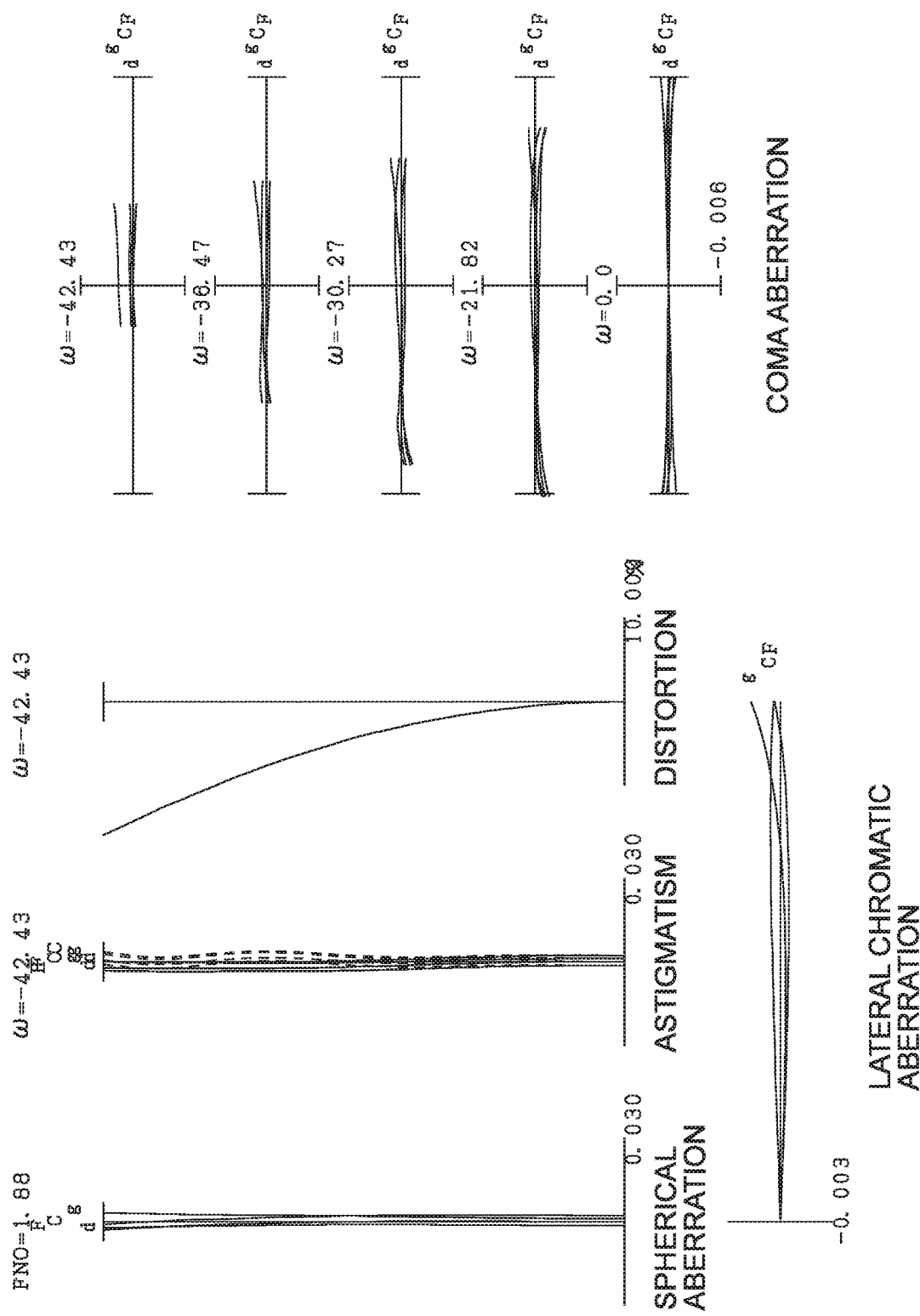

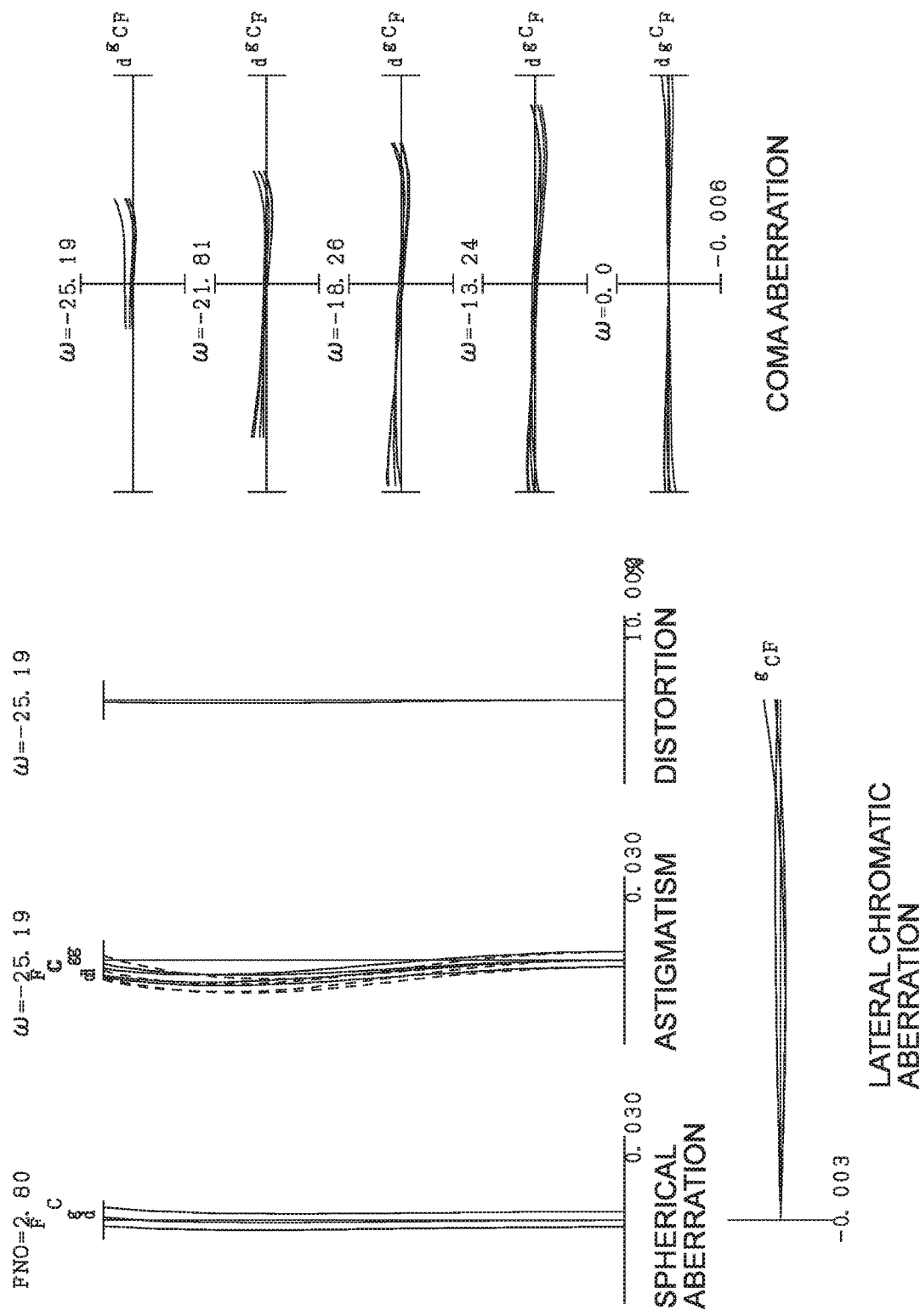

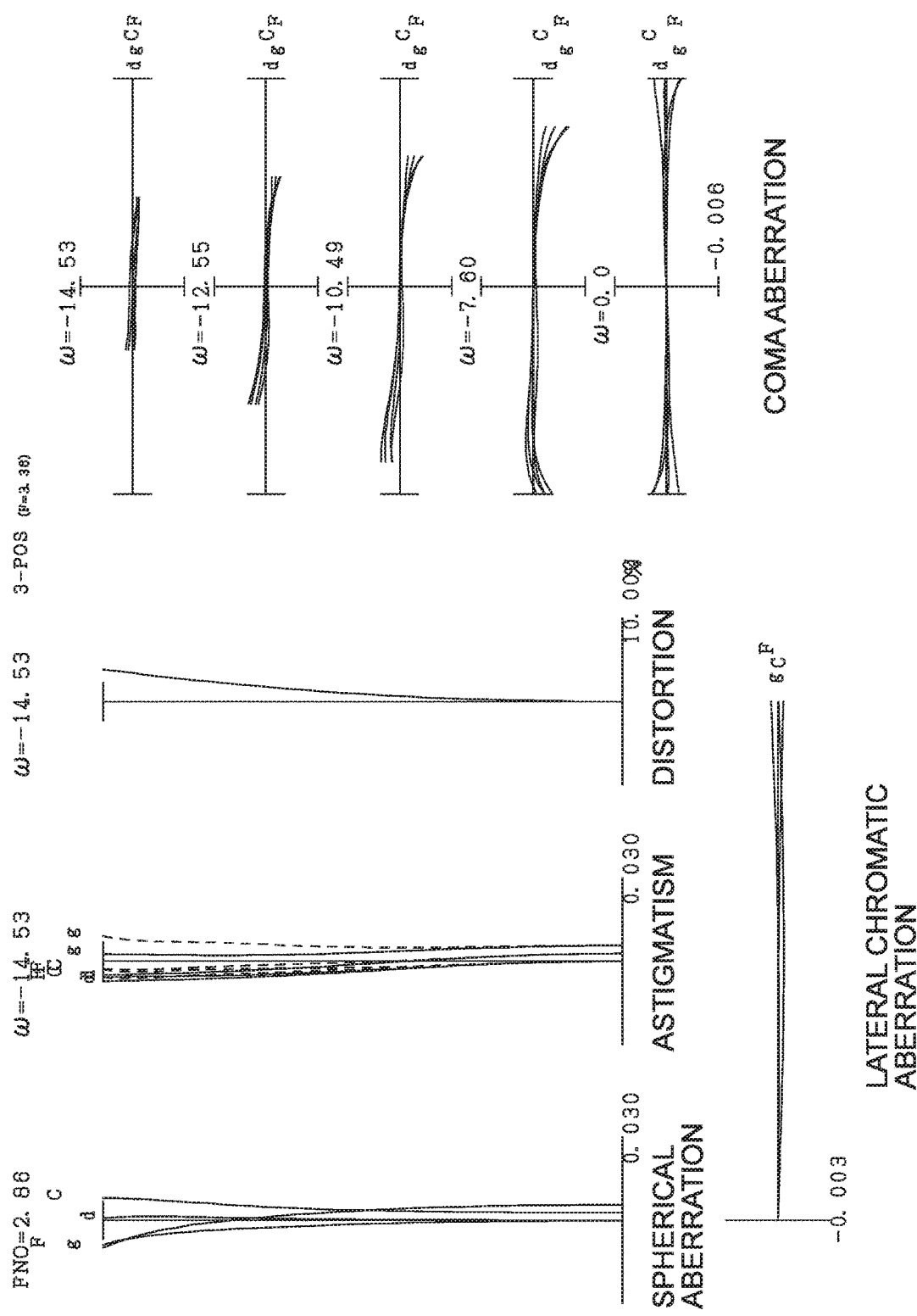

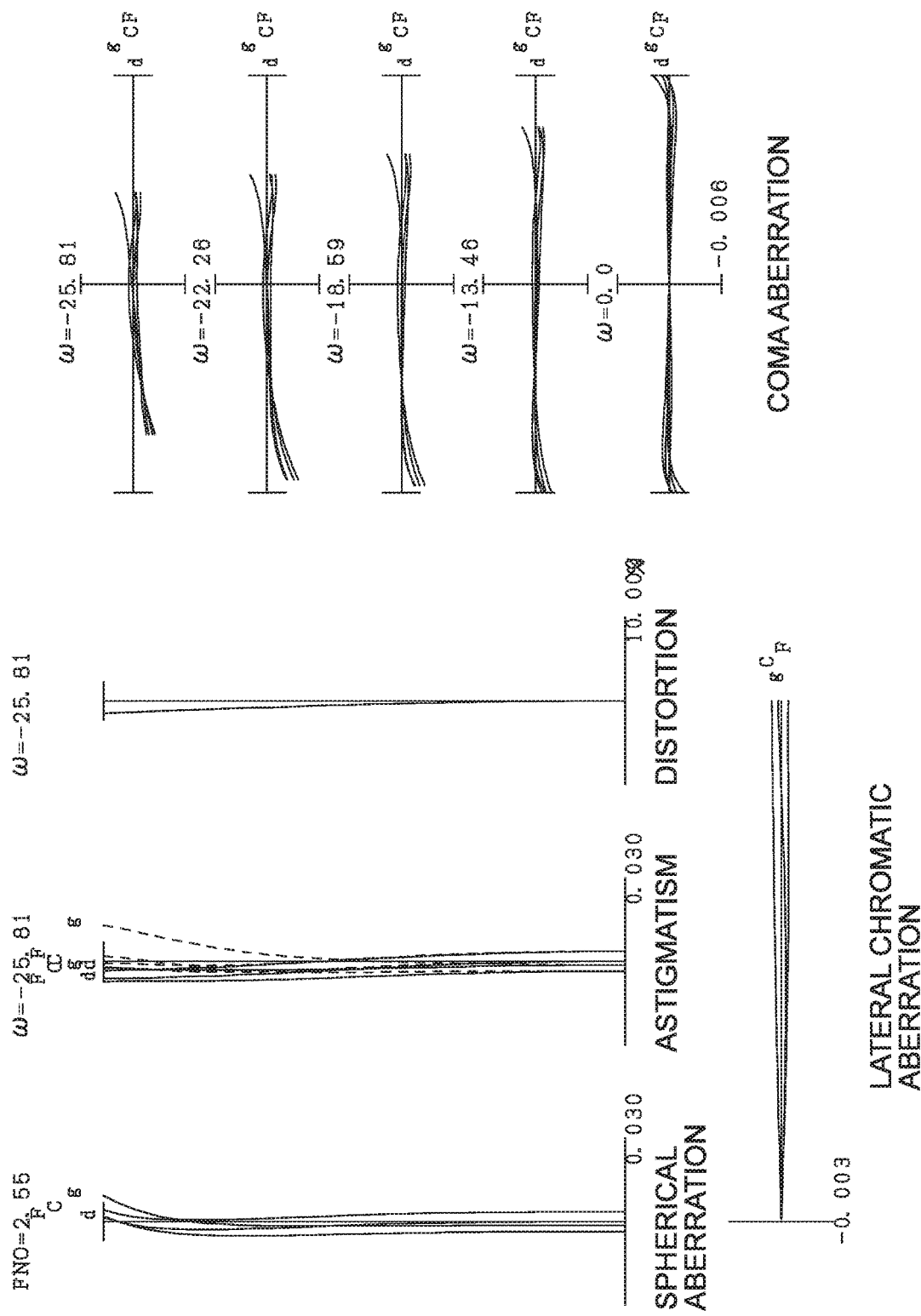

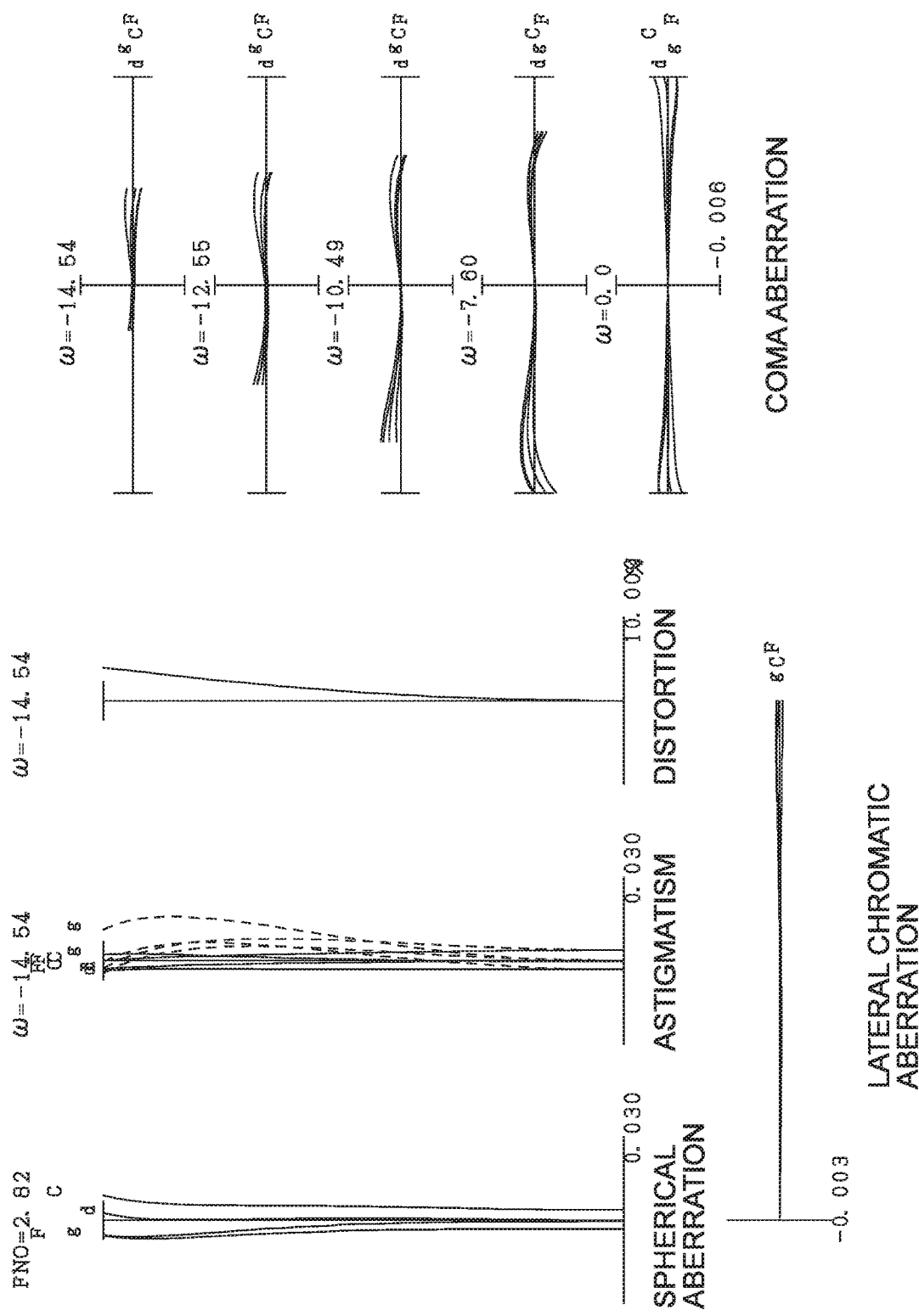

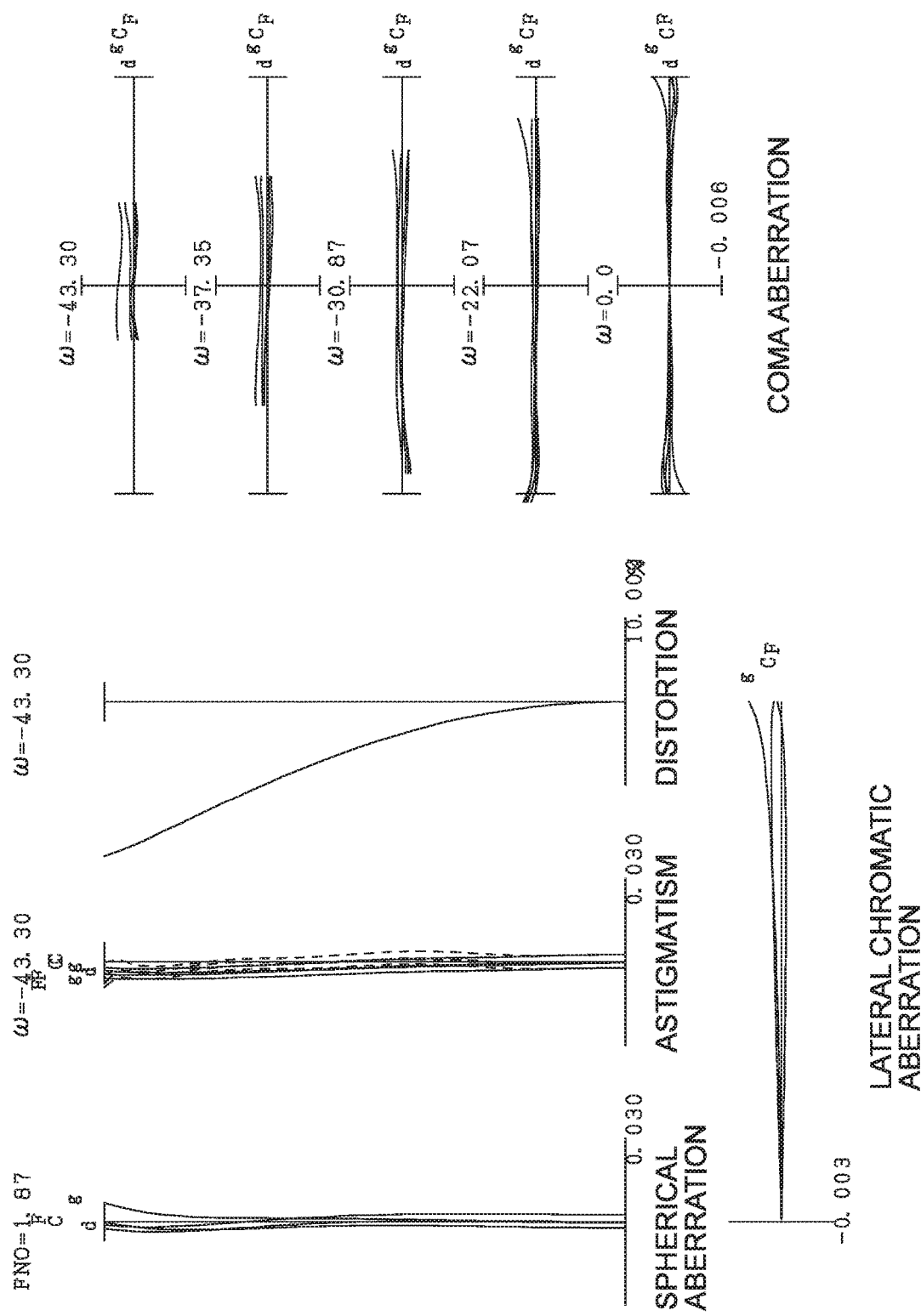

ZOOM LENS, OPTICAL APPARATUS AND METHOD FOR MANUFACTURING THE ZOOM LENS

TECHNICAL FIELD

The present invention relates to a zoom lens, an optical apparatus using the same, and a method for manufacturing the zoom lens.

TECHNICAL BACKGROUND

Recently, zoom lenses designed to have larger diameters have been proposed. Patent Document 1 discloses an example of such a zoom lens. Now, zoom lenses are required to have a smaller size and higher performance rather than simply having a larger diameter. In view of this, zoom lenses having a small size and excellent optical performance while having a large diameter have been demanded.

PRIOR ARTS LIST

Patent Document

Patent Document 1: Japanese Laid-Open Patent Publication No. 2015-72369 (A)

SUMMARY OF THE INVENTION

A zoom lens according to a first aspect of the present invention comprises, in order from an object: a first lens group having positive refractive power; a second lens group having negative refractive power; a third lens group having positive refractive power; a fourth lens group having negative refractive power; and a fifth lens group having positive refractive power, in which the first to the fifth lens groups each move in an optical axis direction upon zooming from a wide angle end state to a telephoto end state, at least a part of the fourth lens group is configured to serve as a focusing lens group to move in the optical axis direction upon focusing, the first lens group consists of two lenses, and the following conditional expression is satisfied.

$$0.30 < GD3/ft < 0.80$$

where,

GD3 denotes a thickness of the third lens group on the optical axis, and ft denotes a focal length of the zoom lens in the telephoto end state.

A zoom lens according to a second aspect of the present invention comprises, in order from an object: a first lens group having positive refractive power; a second lens group having negative refractive power; a third lens group having positive refractive power; a fourth lens group having negative refractive power; and a fifth lens group having positive refractive power, in which the first to the fifth lens groups each move in an optical axis direction upon zooming from a wide angle end state to a telephoto end state, at least a part of the fourth lens group is configured to serve as a focusing lens group to move in the optical axis direction upon focusing, the first lens group consists of two lenses, and the following conditional expression is satisfied.

$$0.80 < (\beta 45w)/(\beta 45t) < 1.30$$

where, $\beta 45w$ denotes a combined magnification of the fourth lens group and the fifth lens group in the wide angle end state, and $\beta 45t$ denotes a combined magnification of the fourth lens group and the fifth lens group in the telephoto end state.

A zoom lens according to a third aspect of the present invention comprises, in order from an object: a first lens group having positive refractive power; a second lens group having negative refractive power; a third lens group having positive refractive power; and a fourth lens group having negative refractive power, in which the first to the fourth lens groups each move in an optical axis direction upon zooming from a wide angle end state to a telephoto end state, at least a part of the fourth lens group is configured to serve as a focusing lens group to move in the optical axis direction upon focusing, the first lens group consists of two lenses, and the following conditional expression is satisfied.

$$0.85 < (\beta 4w)/(\beta 4t) < 1.20$$

where, $\beta 4w$ denotes a magnification of the fourth lens group in the wide angle end state, and $\beta 4t$ denotes a magnification of the fourth lens group in the telephoto end state.

A zoom lens according to a fourth aspect of the present invention comprises a plurality of lens groups, in which a distance between adjacent lens groups in the plurality of lens groups is changed upon zooming from a wide angle end state to a telephoto end state, at least a part of the plurality of lens groups serves as a focusing lens group that moves in an optical axis direction upon focusing, and a range in which focusing is possible is moved toward a short distant side with a range changing lens group including at least one of the lens groups not serving as the focusing lens group moved in the optical axis direction, at any focal length between the wide angle end state and the telephoto end state.

An optical apparatus according to the present invention comprises the zoom lens described above.

A method for manufacturing according to a first aspect of the present invention is a method for manufacturing a zoom lens including, in order from an object: a first lens group having positive refractive power; a second lens group having negative refractive power; a third lens group having positive refractive power; a fourth lens group having negative refractive power; and a fifth lens group having positive refractive power, the first to the fifth lens groups each moving in an optical axis direction upon zooming from a wide angle end state to a telephoto end state, at least a part of the fourth lens group being configured to serve as a focusing lens group to move in the optical axis direction upon focusing, the first lens group consisting of two lenses, the method comprising arranging the lenses within a lens barrel with the following conditional expression satisfied.

$$0.30 < GD3/ft < 0.80$$

where,

GD3 denotes a thickness of the third lens group on the optical axis, and ft denotes a focal length of the zoom lens in the telephoto end state.

A method for manufacturing according to a second aspect of the present invention is a method for manufacturing a zoom lens including, in order from an object: a first lens group having positive refractive power; a second lens group having negative refractive power; a third lens group having positive refractive power; a fourth lens group having negative refractive power; and a fifth lens group having positive refractive power, the first to the fifth lens groups each moving in an optical axis direction upon zooming from a wide angle end state to a telephoto end state, at least a part of the fourth lens group being configured to serve as a focusing lens group to move in the optical axis direction upon focusing, the first lens group consisting of two lenses, the method comprising arranging the lenses within a lens barrel with the following conditional expression satisfied.

$$0.80<(\beta 45w)/(\beta 45t)<1.30$$

where,

β45w denotes a combined magnification of the fourth lens group and the fifth lens group in the wide angle end state, and β45t denotes a combined magnification of the fourth lens group and the fifth lens group in the telephoto end state.

A method for manufacturing according to a third aspect of the present invention is a method for manufacturing a zoom lens including, in order from an object: a first lens group having positive refractive power; a second lens group having negative refractive power; a third lens group having positive refractive power; and a fourth lens group having negative refractive power, the first to the fourth lens groups each moving in an optical axis direction upon zooming from a wide angle end state to a telephoto end state, at least a part of the fourth lens group being configured to serve as a focusing lens group to move in the optical axis direction upon focusing, the first lens group consisting of two lenses, the method comprising arranging the lenses within a lens barrel with the following conditional expression satisfied.

$$0.85<(\beta 4w)/(\beta 4t)<1.20$$

where,

β4w denotes a magnification of the fourth lens group in the wide angle end state, and β4t denotes a magnification of the fourth lens group in the telephoto end state.

A method for manufacturing according to a fourth aspect of the present invention is a method for manufacturing a zoom lens including a plurality of lens groups, the method comprising: arranging the plurality of lens groups within a lens barrel in such a manner that a distance between adjacent lens groups in the plurality of lens groups is changed upon zooming from a wide angle end state to a telephoto end state, and at least a part of the plurality of lens groups serves as a focusing lens group that moves in an optical axis direction upon focusing; and moving a range in which focusing is possible toward a short distant side with a range changing lens group including at least one of the lens groups not serving as the focusing lens group moved in the optical axis direction, at any focal length between the wide angle end state and the telephoto end state.

BRIEF DESCRIPTION OF THE DRAWINGS

FIGS. 2A, 2B, and 2C are graphs showing various aberrations of the zoom lens according to Example 1 respectively in a wide angle end state, an intermediate focal length state, and a telephoto end state.

FIGS. 4A, 4B, and 4C are graphs showing various aberrations of the zoom lens according to Example 2 respectively in the wide angle end state, the intermediate focal length state, and the telephoto end state.

FIGS. 6A, 6B, and 6C are graphs showing various aberrations of the zoom lens according to Example 3 respectively in the wide angle end state, the intermediate focal length state, and the telephoto end state.

FIGS. 10A, 10B, and 10C are graphs showing various aberrations of the zoom lens according to Example 5 respectively in the wide angle end state, the intermediate focal length state, and the telephoto end state.

FIGS. 12A, 12B, and 12C are graphs showing various aberrations of the zoom lens according to Example 6 respectively in the wide angle end state, the intermediate focal length state, and the telephoto end state.

FIGS. 14A, 14B, and 14C are graphs showing various aberrations of the zoom lens according to Example 7 respectively in the wide angle end state, the intermediate focal length state, and the telephoto end state.

DESCRIPTION OF THE EMBODIMENTS

Figure 1:
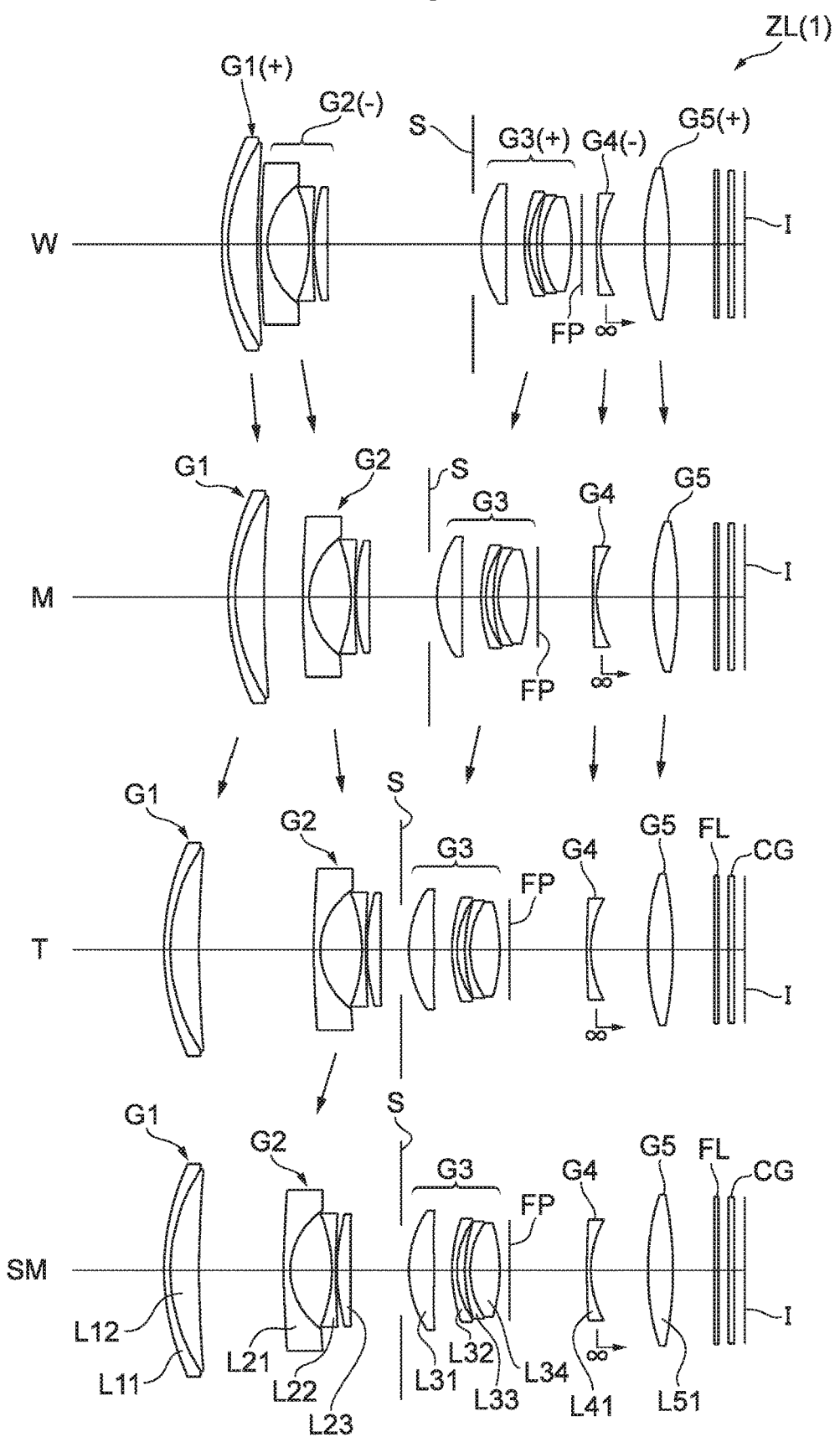
FIG. 1 is a cross-sectional diagram illustrating a lens configuration of a zoom lens according to Example 1.

A zoom lens and an optical apparatus according to the present embodiments are described below with reference to the drawings. As illustrated in FIG. 1, a zoom lens ZL(1) as an example of a zoom lens ZL according to a first embodiment includes, in order from an object: a first lens group G1 having positive refractive power; a second lens group G2 having negative refractive power; a third lens group G3 having positive refractive power; a fourth lens group G4 having negative refractive power; and a fifth lens group G5 having positive refractive power. Upon zooming from a wide angle end state to a telephoto end state, the first to the fifth lens groups G1 to G5 each move in an optical axis direction, at least a part of the fourth lens group G4 serves as a focusing lens group Gfc moving in the optical axis direction upon focusing, and the first lens group G1 consists of two lenses.

Figure 3:
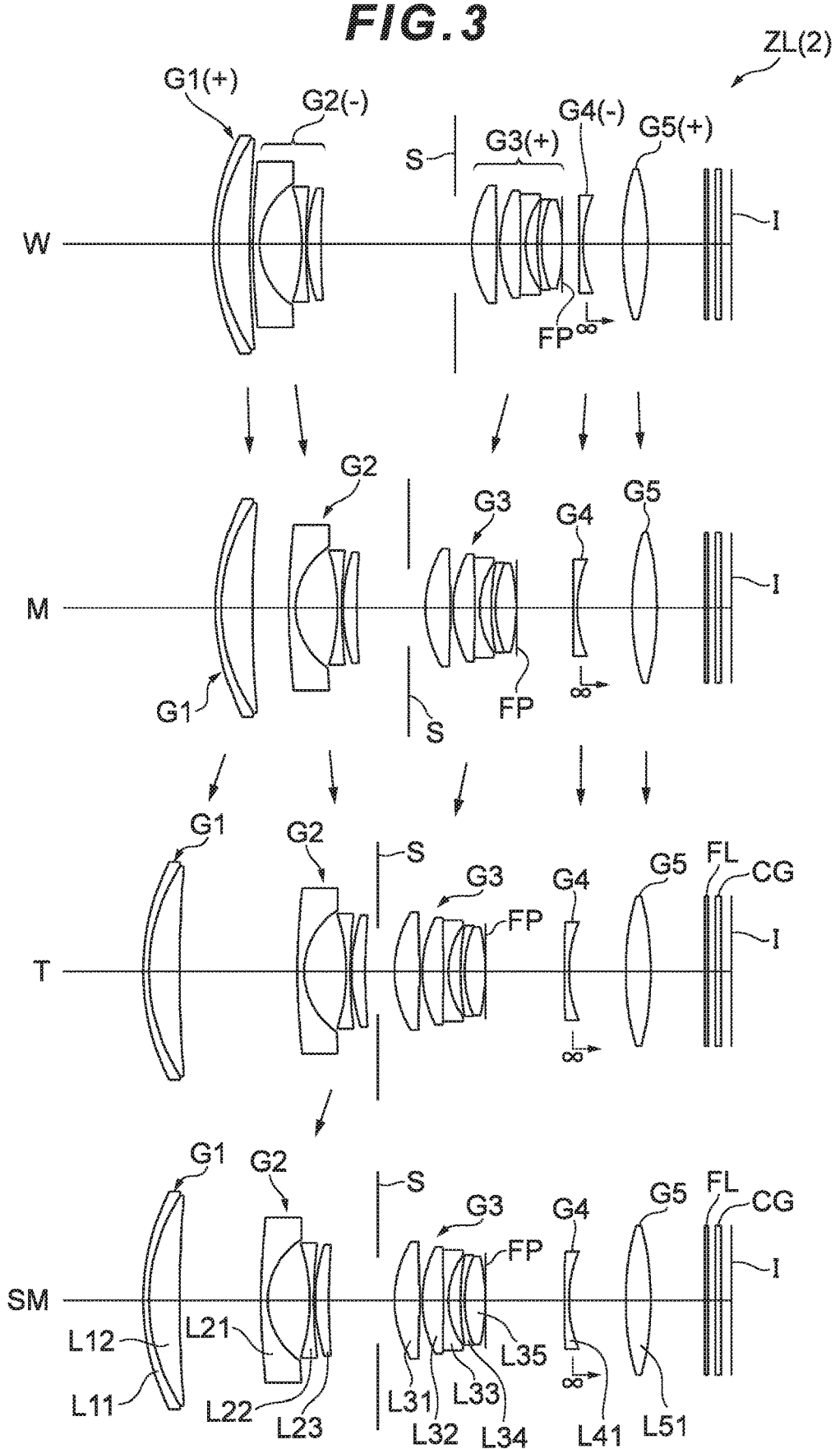
FIG. 3 is a cross-sectional diagram illustrating a lens configuration of a zoom lens according to Example 2.
Figure 5:
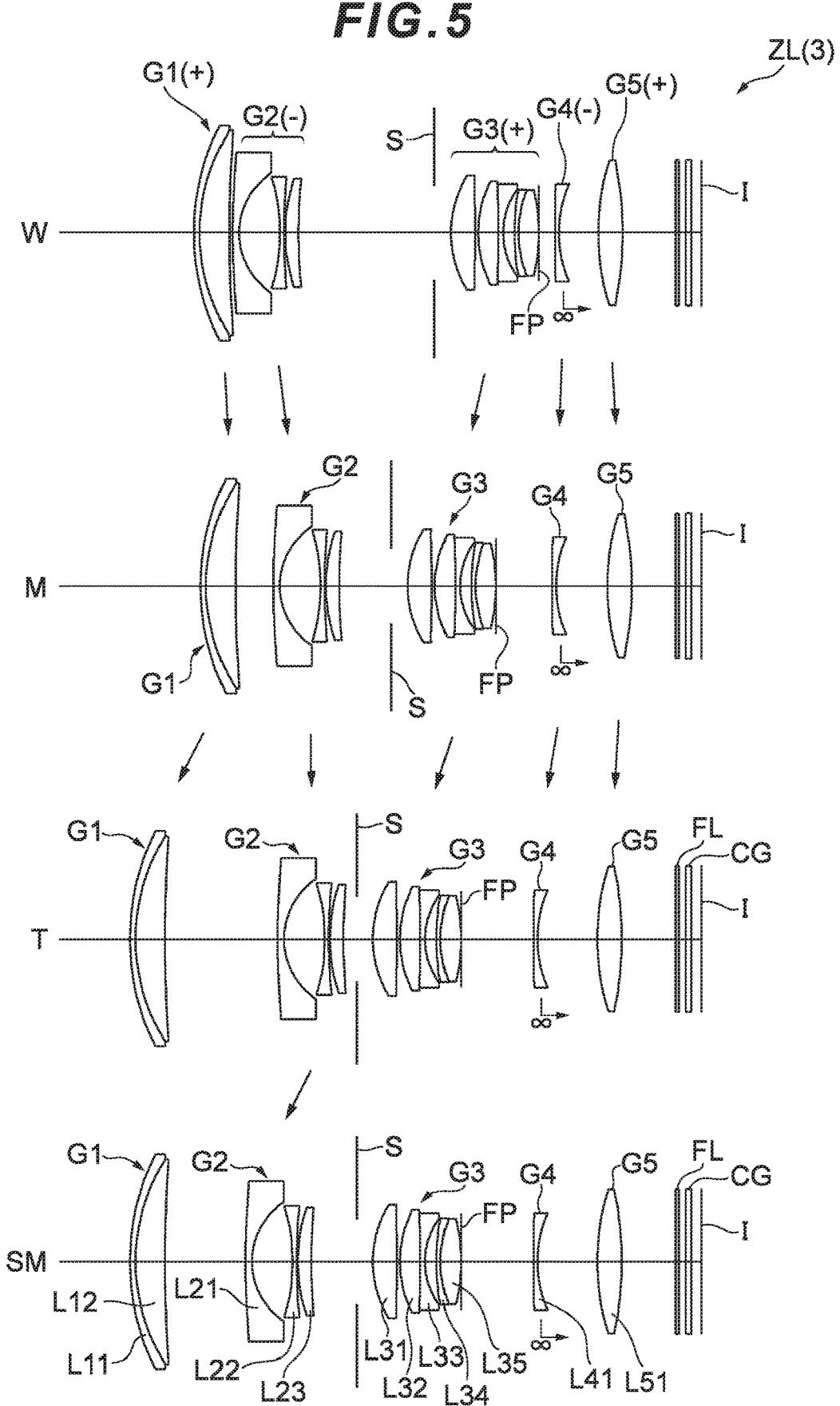
FIG. 5 is a cross-sectional diagram illustrating a lens configuration of a zoom lens according to Example 3.
Figure 7:
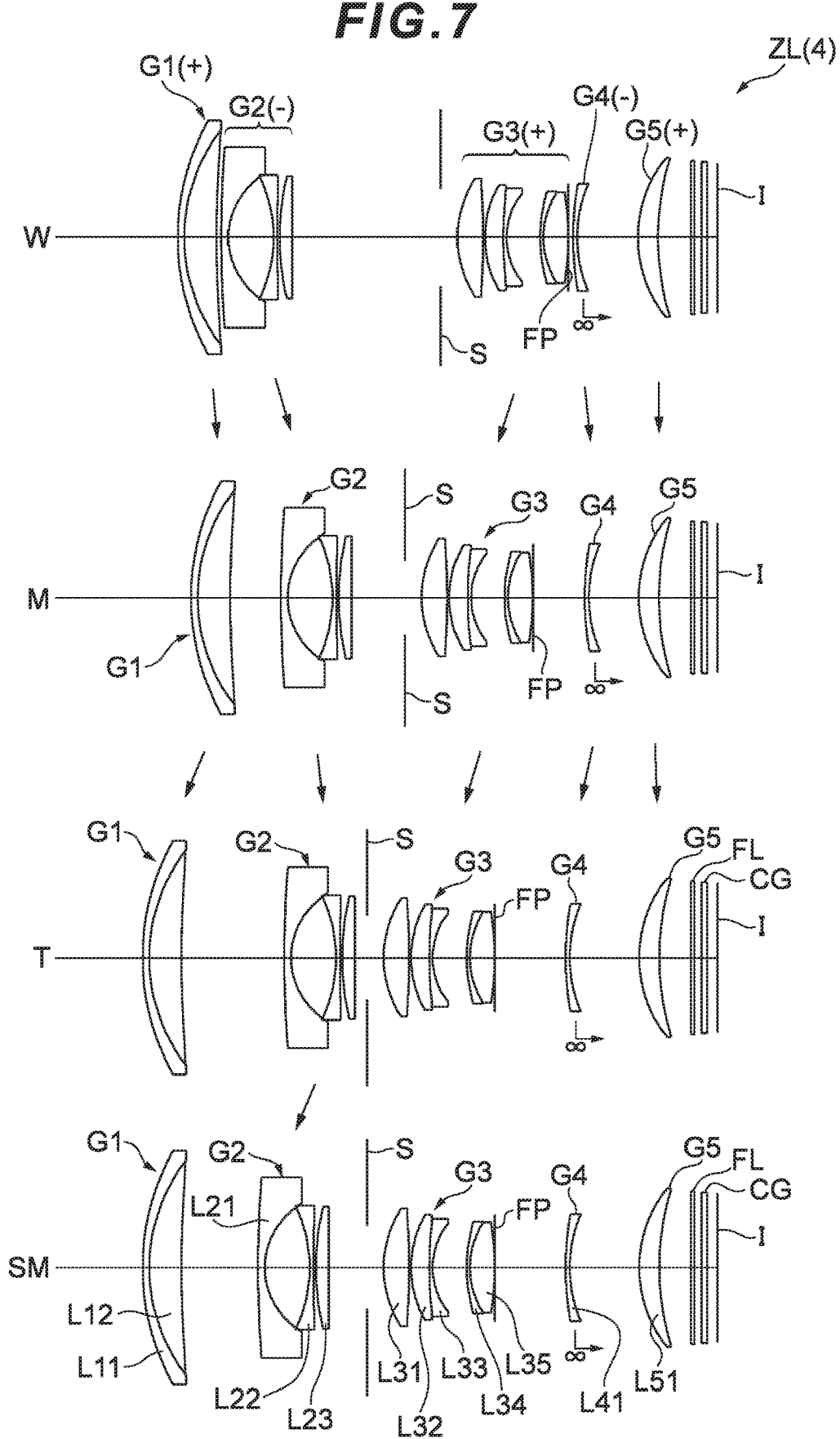
FIG. 7 is a cross-sectional diagram illustrating a lens configuration of a zoom lens according to Example 4.
Figure 9:
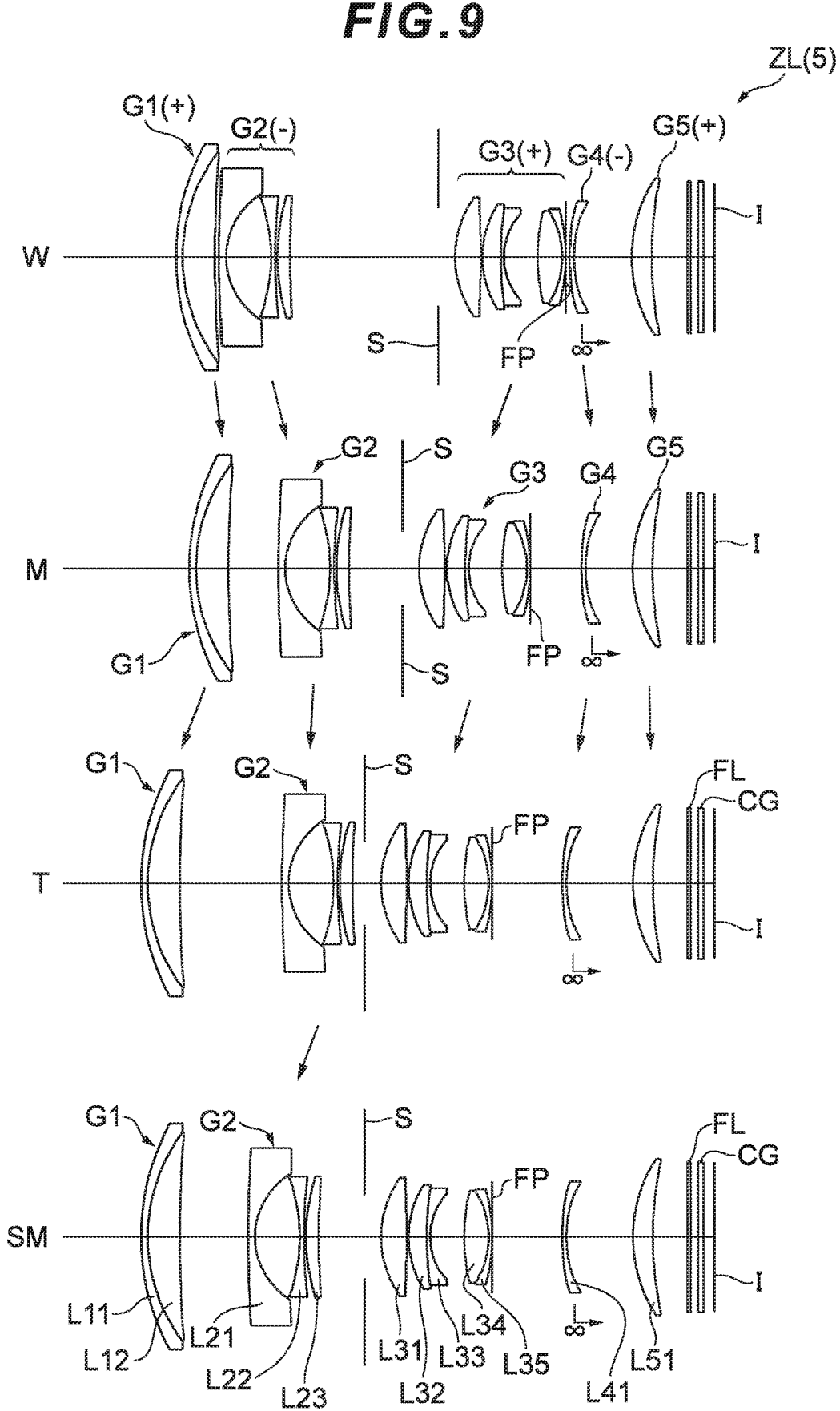
FIG. 9 is a cross-sectional diagram illustrating a lens configuration of a zoom lens according to Example 5.
Figure 11:
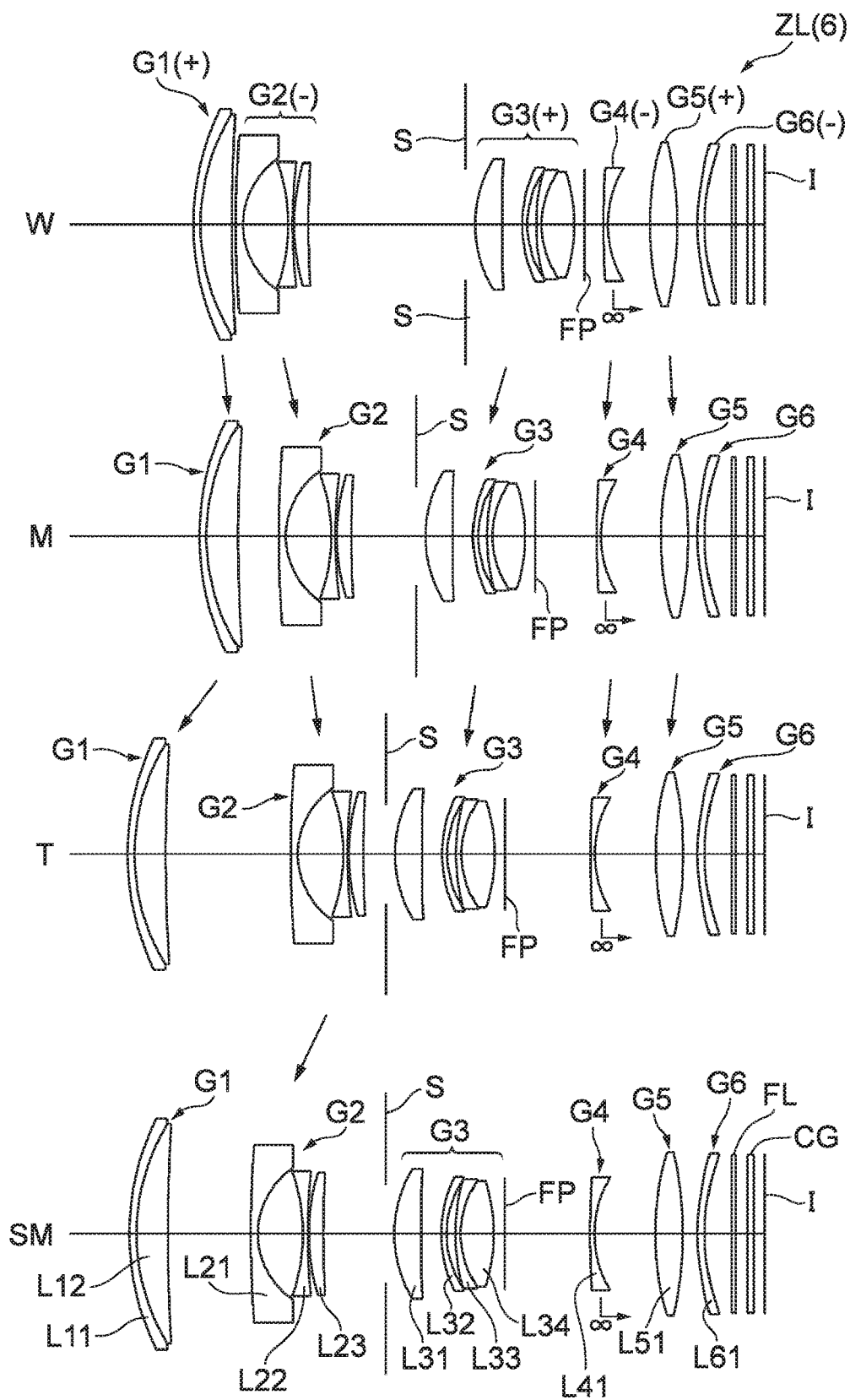
FIG. 11 is a cross-sectional diagram illustrating a lens configuration of a zoom lens according to Example 6.
Figure 13:
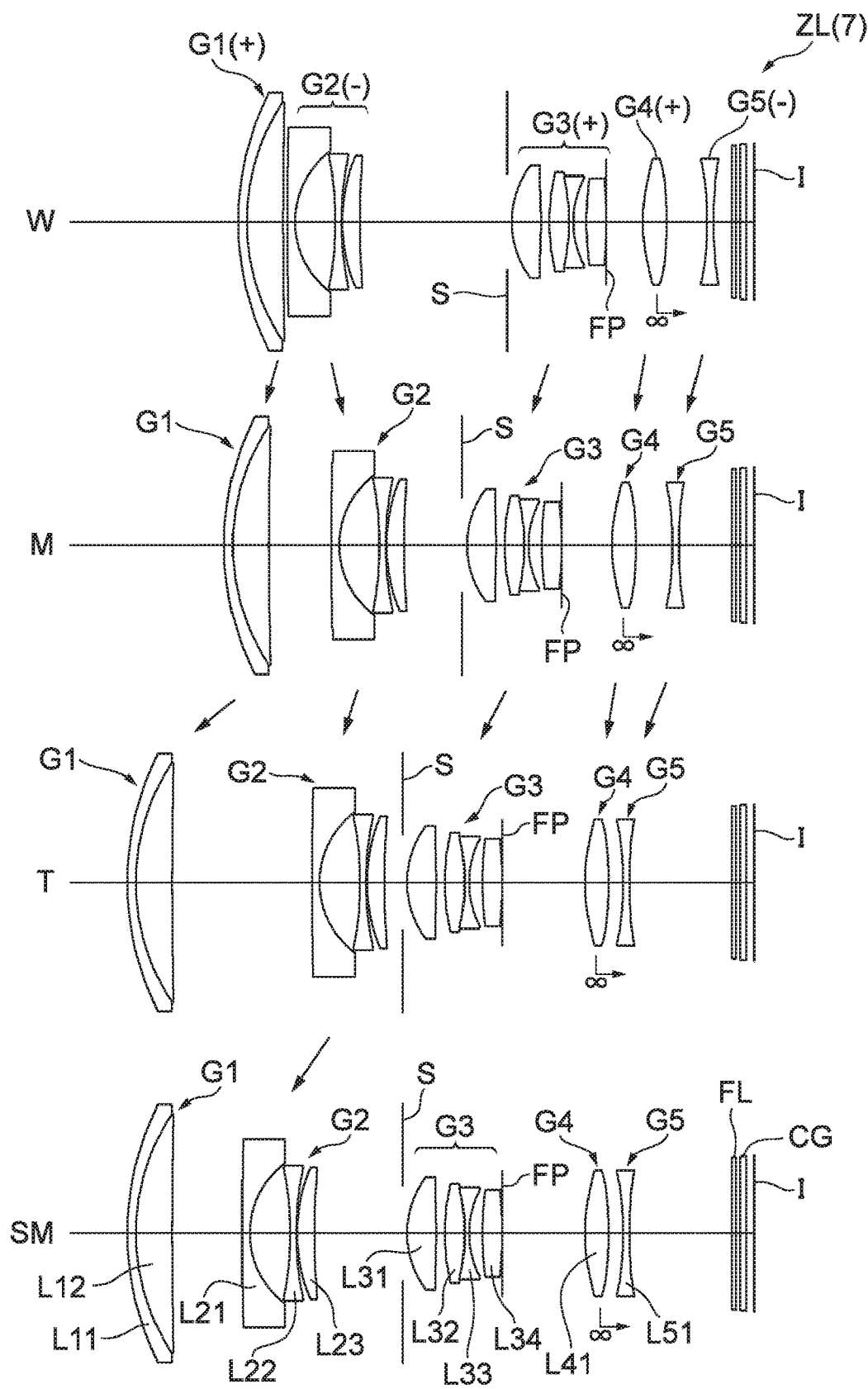
FIG. 13 is a cross-sectional diagram illustrating a lens configuration of a zoom lens according to Example 7.

The zoom lens ZL according to the present embodiment may also be a zoom lens ZL(2) illustrated in FIG. 3, a zoom lens ZL(3) illustrated in FIG. 5, a zoom lens ZL(4) illustrated in FIG. 7, a zoom lens ZL(5) illustrated in FIG. 9, a zoom lens ZL(6) illustrated in FIG. 11, and a zoom lens ZL(7) illustrated in FIG. 13.

The zoom lens ZL {ZL(1) to ZL(7)} according to the first embodiment having the configuration described above satisfies the following conditional expression (1).

$$0.30<GD3/ft<0.80 \qquad (1)$$

where,

GD3 denotes a thickness of the third lens group G3 on the optical axis, and ft denotes a focal length of the zoom lens in the telephoto end state.

The zoom lens ZL according to the first embodiment includes five lens groups including a lens group having positive refractive power, a lens group having negative refractive power, a lens group having positive refractive power, a lens group having negative refractive power, and a lens group having positive refractive power arranged in this order, and all of the lens groups move in the optical axis direction upon zooming from the wide angle end state to the telephoto end state. Thus, successful aberration correction can be achieved upon zooming. With the fourth lens group G4 serving as the focusing lens group Gfc and with the first lens group G1 consisting of two lenses, a zoom lens having a large diameter and a small size, and featuring excellent optical performance can be obtained.

A spherical aberration, an on-axis chromatic aberration, a lateral chromatic aberration, and a coma aberration can be successfully corrected and the thickness of the third lens group G3 can be reduced, when the conditional expression (1), defining the thickness of the third lens group G3 on the optical axis, is satisfied. This more effectively ensures an effect of providing the zoom lens having a large diameter and a small size, and featuring excellent optical performance.

A value lower than the lower limit value of the conditional expression (1) results in an increase in the spherical aberration, the on-axis chromatic aberration, and the coma aberration in the third lens group G3 that are difficult to correct particularly in a range from an intermediate focal length state to the telephoto end state. To guarantee the effects of the present embodiment, the lower limit value of the conditional expression (1) is preferably set to be 0.33. To more effectively guarantee the effects of the present embodiment, the lower limit value of the conditional expression (1) is preferably set to be 0.35.

With a value higher than the upper limit value of the conditional expression (1), it is difficult to ensure the amount of movement by the third lens group G3 and thus the third lens group G3 is required to have high refractive power. Thus, the spherical aberration, the on-axis chromatic aberration, and the coma aberration increase. To guarantee the effects of the present embodiment, the upper limit value of the conditional expression (1) is preferably set to be 0.65. To more effectively guarantee the effects of the present embodiment, the upper limit value of the conditional expression (1) is preferably set to be 0.50. To even more effectively guarantee the effects of the present embodiment, the upper limit value of the conditional expression (1) is preferably set to be 0.47.

As illustrated in FIG. 1, a zoom lens ZL(1) or the like as an example of a zoom lens ZL according to a second embodiment includes, in order from an object: a first lens group G1 having positive refractive power; a second lens group G2 having negative refractive power; a third lens group G3 having positive refractive power; a fourth lens group G4 having negative refractive power; and a fifth lens group G5 having positive refractive power. Upon zooming from the wide angle end state to the telephoto end state, the first to the fifth lens groups G1 to G5 each move in the optical axis direction, at least a part of the fourth lens group G4 serves as the focusing lens group Gfc moving in the optical axis direction upon focusing, and the first lens group G1 consists of two lenses.

The zoom lens ZL according to the second embodiment satisfies the following conditional expression (5).

$$0.80<(\beta 45w)/(\beta 45t)<1.30 \quad (5)$$

where,

β45w denotes a combined magnification of the fourth lens group G4 and the fifth lens group G5 in the wide angle end state, and β45t denotes a combined magnification of the fourth lens group G4 and the fifth lens group G5 in the telephoto end state.

A variation of astigmatism, a curvature of field, and the coma aberration due to zooming can be successfully corrected, when the conditional expression (5), defining the combined magnifications of the fourth lens group G4 and the fifth lens group G5 in the wide angle end state and in the telephoto end state, is satisfied.

A value lower than the lower limit value of the conditional expression (5) renders a variation of curvature of field and astigmatism, due to an increase in the Petzval sum, difficult to correct. To guarantee the effects of the present embodiment, the lower limit value of the conditional expression (5) is preferably set to be 0.85. To more effectively guarantee the effects of the present embodiment, the lower limit value of the conditional expression (5) is preferably set to be 0.90. To even more effectively guarantee the effects of the present embodiment, the lower limit value of the conditional expression (5) is preferably set to be 0.93.

A value higher than the upper limit value of the conditional expression (5) renders the astigmatism, the curvature of field, and the coma aberration difficult to correct. To guarantee the effects of the present embodiment, the upper limit value of the conditional expression (5) is preferably set to be 1.20. To more effectively guarantee the effects of the present embodiment, the upper limit value of the conditional expression (5) is preferably set to be 1.10.

As illustrated in FIG. 1, a zoom lens ZL(1) or the like as an example of a zoom lens ZL according to a third embodiment includes, in order from an object: a first lens group G1 having positive refractive power; a second lens group G2 having negative refractive power; a third lens group G3 having positive refractive power; and a fourth lens group G4 having negative refractive power. Upon zooming from the wide angle end state to the telephoto end state, the first to the fourth lens groups G1 to G4 each move in the optical axis direction, at least a part of the fourth lens group G4 serves as a focusing lens group Gfc moving in the optical axis direction upon focusing, and the first lens group G1 consists of two lenses.

The zoom lens ZL according to the third embodiment satisfies the following conditional expression (13).

$$0.85<(\beta 4w)/(\beta 4t)<1.20 \quad (13)$$

where,

β4w denotes a magnification of the fourth lens group G4 in the wide angle end state, and β4t denotes a magnification of the fourth lens group G4 in the telephoto end state.

A variation of the astigmatism, the curvature of field, and the coma aberration due to zooming can be successfully corrected, when the conditional expression (13), defining the magnifications of the fourth lens group G4 in the wide angle end state and in the telephoto end state, is satisfied.

A value lower than the lower limit value of the conditional expression (13) renders a variation of the curvature of field and the astigmatism, due to an increase in the Petzval sum, difficult to correct. To guarantee the effects of the present embodiment, the lower limit value of the conditional expression (13) is preferably set to be 0.902. To more effectively guarantee the effects of the present embodiment, the lower limit value of the conditional expression (13) is preferably set to be 0.925. To even more effectively guarantee the effects of the present embodiment, the lower limit value of the conditional expression (13) is preferably set to be 0.945.

A value higher than the upper limit value of the conditional expression (13) renders the astigmatism, the curvature of field, and the coma aberration difficult to correct. To guarantee the effects of the present embodiment, the upper limit value of the conditional expression (13) is preferably set to be 1.100. To more effectively guarantee the effects of the present embodiment, the upper limit value of the conditional expression (13) is preferably set to be 1.105.

Preferably, the zoom lens ZL according to the third embodiment further includes a fifth lens group G5 that has positive refractive power disposed to the image side of the fourth lens group G4 and moves in the optical axis direction upon zooming from the wide angle end state to the telephoto end state. With this configuration, the zoom lens having a large diameter and a small size, and featuring excellent optical performance can be provided.

In the zoom lenses ZL according to the first to the third embodiments, the fifth lens group G5 preferably consists of a single lens. With this configuration, the zoom lens having a large diameter and a small size, and featuring excellent optical performance can be provided.

The zoom lenses ZL according to the first to the third embodiments preferably satisfy the following conditional expression (5).

$$0.80 < (\beta 45w)/(\beta 45t) < 1.30 \tag{5}$$

where,

β45w denotes a combined magnification of the fourth lens group G4 and the fifth lens group G5 in the wide angle end state, and β45t denotes a combined magnification of the fourth lens group G4 and the fifth lens group G5 in the telephoto end state.

A variation of astigmatism, a curvature of field, and the coma aberration due to zooming can be successfully corrected, when the conditional expression (5), defining the combined magnifications of the fourth lens group G4 and the fifth lens group G5 in the wide angle end state and in the telephoto end state, is satisfied.

A value lower than the lower limit value of the conditional expression (5) renders a variation of curvature of field and astigmatism, due to an increase in the Petzval sum, difficult to correct. To guarantee the effects of the present embodiment, the lower limit value of the conditional expression (5) is preferably set to be 0.85. To more effectively guarantee the effects of the present embodiment, the lower limit value of the conditional expression (5) is preferably set to be 0.90. To even more effectively guarantee the effects of the present embodiment, the lower limit value of the conditional expression (5) is preferably set to be 0.93.

A value higher than the upper limit value of the conditional expression (5) renders the astigmatism, the curvature of field, and the coma aberration difficult to correct. To guarantee the effects of the present embodiment, the upper limit value of the conditional expression (5) is preferably set to be 1.20. To more effectively guarantee the effects of the present embodiment, the upper limit value of the conditional expression (5) is preferably set to be 1.10.

The zoom lenses ZL according to the first to the third embodiments preferably satisfy the following conditional expression (14).

$$0.85 < (\beta Fw)/(\beta Ft) < 1.20 \tag{14}$$

where,

βFw denotes a magnification of the focusing lens group Gfc in the wide angle end state, and βFt denotes a magnification of the focusing lens group Gfc in the telephoto end state.

A variation of the astigmatism, the curvature of field, and the coma aberration due to zooming can be successfully corrected, when the conditional expression (14), defining the magnifications of the focusing lens group Gfc in the wide angle end state and in the telephoto end state, is satisfied. Furthermore, there is an advantage that the amount of movement of the focusing lens group Gfc can be reduced and variations in an image surface can be reduced upon zooming.

A value lower than the lower limit value of the conditional expression (14) renders a variation of the curvature of field and the astigmatism, due to an increase in the Petzval sum, difficult to correct. To guarantee the effects of the present embodiment, the lower limit value of the conditional expression (14) is preferably set to be 0.902. To more effectively guarantee the effects of the present embodiment, the lower limit value of the conditional expression (14) is preferably set to be 0.925. To even more effectively guarantee the effects of the present embodiment, the lower limit value of the conditional expression (14) is preferably set to be 0.945.

A value higher than the upper limit value of the conditional expression (14) renders the astigmatism, the curvature of field, and the coma aberration difficult to correct. To guarantee the effects of the present embodiment, the upper limit value of the conditional expression (14) is preferably set to be 1.100. To more effectively guarantee the effects of the present embodiment, the upper limit value of the conditional expression (14) is preferably set to be 1.105.

The zoom lenses ZL according to the first to the third embodiments preferably satisfy the following conditional expression (15).

$$1.000 < (ft/fw)/FNw < 2.350 \tag{15}$$

where, fw denotes a focal length of the zoom lens ZL in the wide angle end state, ft denotes a focal length of the zoom lens ZL in the telephoto end state, and FNw denotes the maximum aperture in the wide angle end state.

The conditional expression (15) defines relationship between the zooming rate and the F number in the wide angle end state, and is for setting the optimum specification of the zoom lens ZL according to the present embodiment. A value higher than the upper limit value of the conditional expression (15) leads to small F number resulting in excessively high brightness of the zoom lens ZL, and thus renders the spherical aberration difficult to correct. Furthermore, the zooming rate is difficult to guarantee. A forcible attempt to ensure the zooming rate renders the curvature of field and the coma aberration difficult to correct. To guarantee the effects of the present embodiment, the upper limit value of the conditional expression (15) is preferably set to be 2.300. To more effectively guarantee the effects of the present embodiment, the upper limit value of the conditional expression (15) is preferably set to be 2.200, 2.115, 2.000, 1.900, or 1.800.

A value lower than the lower limit value of the conditional expression (15) leads to large F number, that is, excessively low brightness of the zoom lens ZL and a low zooming rate, and thus is not preferable. To guarantee the effects of the present embodiment, the lower limit value of the conditional expression (15) is preferably set to be 1.100. To more effectively guarantee the effects of the present embodiment, the lower limit value of the conditional expression (15) is preferably set to be 1.200, 1.400, or 1.600.

The zoom lenses ZL according to the first to the third embodiments preferably satisfy the following conditional expression (16).

$$1.35 < FNw < 2.65 \tag{16}$$

where,

FNw denotes the maximum aperture in the wide angle end state.

The conditional expression (16) defines a range of the F number in the wide angle end state, and is for setting the optimum specification of the zoom lens ZL according to the present embodiment. A value lower than the lower limit value of the conditional expression (16) leads to small F number resulting in excessively high brightness of the zoom lens ZL, and thus renders the spherical aberration difficult to correct. To guarantee the effects of the present embodiment, the lower limit value of the conditional expression (16) is preferably set to be 1.45. To more effectively guarantee the effects of the present embodiment, the lower limit value of the conditional expression (16) is preferably set to be 1.55 or 1.65.

A value higher than the upper limit value of the conditional expression (16) leads to large F number, that is, excessively low brightness of the zoom lens ZL, and thus is not preferable. To guarantee the effects of the present embodiment, the upper limit value of the conditional expression (16) is preferably set to be 2.45. To more effectively guarantee the effects of the present embodiment, the upper limit value of the conditional expression (16) is preferably set to be 2.25, 2.05, or 1.95.

The zoom lenses ZL according to the first to the third embodiments preferably satisfy the following conditional expression (2).

$$0.21 < GD2/ft < 0.55 \tag{2}$$

where,

GD2 denotes a thickness of the second lens group G2 on the optical axis.

The astigmatism, the distortion, and the curvature of field can be successfully corrected and the thickness of the second lens group G2 can be reduced, when the conditional expression (2), defining the thickness of the second lens group G2 on the optical axis, is satisfied.

A value lower than the lower limit value of the conditional expression (2) involves a large distortion and curvature of field in the second lens group G2 that are difficult to correct particularly in the wide angle end state. To guarantee the effects of the present embodiment, the lower limit value of the conditional expression (2) is preferably set to be 0.25.

A value higher than the upper limit value of the conditional expression (2) leads to separation of an off-axis ray from the optical axis in the wide angle end state, and thus the lens group is required to have large refractive power (power). As a result, the astigmatism, the distortion, and the curvature of field become difficult to correct. To guarantee the effects of the present embodiment, the upper limit value of the conditional expression (2) is preferably set to be 0.45. To more effectively guarantee the effects of the present embodiment, the upper limit value of the conditional expression (2) is preferably set to be 0.35. To even more effectively guarantee the effects of the present embodiment, the upper limit value of the conditional expression (2) is preferably set to be 0.32.

The zoom lenses ZL according to the first to the third embodiments preferably satisfy the following conditional expression (3).

$$1.10 < f1/ft < 2.3 \tag{3}$$

where, f1 denotes a focal length of the first lens group G1.

The spherical aberration, the astigmatism, and the lateral chromatic aberration can be successfully corrected while achieving a short total length of the zoom lens in the telephoto end state, when the conditional expression (3), defining the focal length of the first lens group G1, is satisfied.

A value lower than the lower limit value of the conditional expression (3) is effective for shortening the total length of the zoom lens, but renders the spherical aberration, the astigmatism, and the lateral chromatic aberration in the telephoto end state difficult to correct. To guarantee the effects of the present embodiment, the lower limit value of the conditional expression (3) is preferably set to be 1.25. To more effectively guarantee the effects of the present embodiment, the lower limit value of the conditional expression (3) is preferably set to be 1.40.

With a value higher than the upper limit value of the conditional expression (3), the refractive power of the first lens group G1 becomes low and thus the refractive power of the second and the third lens groups G2 and G3 needs to be increased. As a result, a variation of the spherical aberration and the astigmatism upon zooming becomes difficult to reduce. To guarantee the effects of the present embodiment, the upper limit value of the conditional expression (3) is preferably set to be 2.00. To more effectively guarantee the effects of the present embodiment, the upper limit value of the conditional expression (3) is preferably set to be 1.80.

The zoom lenses ZL according to the first to the third embodiments preferably satisfy the following conditional expression (4).

$$1.90 < TLt/ft < 3.80 \tag{4}$$

where,

TLt denotes the total length of the zoom lens ZL in the telephoto end state.

A variation of the spherical aberration, the on-axis chromatic aberration, the astigmatism, and the coma aberration upon zooming can be successfully corrected while achieving a short total length of the zoom lens, when the conditional expression (4), defining the total length of the zoom lens in the telephoto end state, is satisfied.

A value lower than the lower limit value of the conditional expression (4) leads to large refractive power of the first lens group G1, rendering the spherical aberration, the astigmatism, and the lateral chromatic aberration in the telephoto end state difficult to correct. To guarantee the effects of the present embodiment, the lower limit value of the conditional expression (4) is preferably set to be 2.00. To more effectively guarantee the effects of the present embodiment, the lower limit value of the conditional expression (4) is preferably set to be 2.10.

A value higher than the upper limit of the conditional expression (4) results in a long total length of the zoom lens, rendering a compact structure difficult to achieve. In view of this, the refractive power of the third lens group G3 needs to be increased. However, this results in a large variation of the spherical aberration, the on-axis chromatic aberration, and the coma aberration. To guarantee the effects of the present embodiment, the upper limit value of the conditional expression (4) is preferably set to be 3.00. To more effectively guarantee the effects of the present embodiment, the upper limit value of the conditional expression (4) is preferably set to be 2.50.

The zoom lenses ZL according to the first to the third embodiments preferably satisfy the following conditional expression (6).

$$7.0°<\omega t<22.0°\qquad(6)$$

where,

ωt denotes a half angle of view in the telephoto end state.

Various aberrations, such as a coma aberration, curvature of field, and distortion can be successfully corrected, when the conditional expression (6), defining a condition for achieving the optimum value of an angle of view in the telephoto end state, is satisfied.

A value higher than the upper limit value of the conditional expression (6) renders these aberrations difficult to correct. To guarantee the effects of the present embodiment, the upper limit value of the conditional expression (6) is preferably set to be 20.0°. To more effectively guarantee the effects of the present embodiment, the upper limit value of the conditional expression (6) is preferably set to be 18.0°. To even more effectively guarantee the effects of the present embodiment, the upper limit value of the conditional expression (6) is preferably set to be 16.0°.

A value lower than the lower limit value of the conditional expression (6) also renders the various aberrations described above difficult to correct. To guarantee the effects of the present embodiment, the lower limit value of the conditional expression (6) is preferably set to be 9.0°. To more effectively guarantee the effects of the present embodiment, the lower limit value of the conditional expression (6) is preferably set to be 11.0°. To even more effectively guarantee the effects of the present embodiment, the lower limit value of the conditional expression (6) is preferably set to be 12.0°.

The zoom lenses ZL according to the first to the third embodiments preferably satisfy the following conditional expression (7).

$$30.0°<\omega w<60.0°\qquad(7)$$

where,

ωw denotes a half angle of view in the wide angle end state.

Various aberrations, such as a coma aberration, curvature of field, and distortion can be successfully corrected while achieving a wide angle of view, when the conditional expression (7), defining a condition for achieving the optimum value of an angle of view in the wide angle end state, is satisfied.

A value higher than the upper limit value of the conditional expression (7) renders these aberrations difficult to correct. To guarantee the effects of the present embodiment, the upper limit value of the conditional expression (7) is preferably set to be 50.0°. To more effectively guarantee the effects of the present embodiment, the upper limit value of the conditional expression (7) is preferably set to be 46.0°.

A value lower than the lower limit value of the conditional expression (7) results in a small angle of view, rendering the various aberrations described above difficult to correct. To guarantee the effects of the present embodiment, the lower limit value of the conditional expression (7) is preferably set to be 33.0° To more effectively guarantee the effects of the present embodiment, the lower limit value of the conditional expression (7) is preferably set to be 36.0°.

In the zoom lenses ZL according to the first to the third embodiments, the second lens group G2 preferably consists of a lens having negative refractive power, a lens having negative refractive power, and a lens having positive refractive power arranged in order from the object. With this configuration of the second lens group G2, the distortion, the curvature of field, the coma aberration, and the like in the wide angle end state can be successfully corrected, and a small thickness of the second lens group G2 can be achieved.

Preferably, in the zoom lenses ZL according to the first to the third embodiments, the fourth lens group G4 consists of a single lens having negative refractive power. With this configuration, the spherical aberration, the coma aberration, and the like can be successfully corrected, and a small thickness of the fourth lens group G4 can be achieved.

Preferably, in the zoom lenses ZL according to the first to the third embodiments, the two lenses of the first lens group G1 are a cemented lens having a meniscus shape having a convex surface facing the object. With this configuration, the spherical aberration and the coma aberration can be successfully corrected.

Preferably, in the zoom lenses ZL according to the first to the third embodiments, the third lens group G3 comprises a positive lens component, a negative lens component, and a positive lens component (the lens components are each a single lens or a cemented lens) arranged in order from the object. With this configuration, the spherical aberration, the coma aberration, the curvature of field, and the like can be successfully corrected.

The zoom lenses ZL according to the first to the third embodiments preferably have the distance between the adjacent lens groups in the first to the fifth lens groups G1 to G5 changing upon zooming from the wide angle end state to the telephoto end state. With such a configuration, a sufficient zooming rate can be achieved.

Preferably, in the zoom lenses ZL according to the first to the third embodiments, at least a part of the first to the fifth lens groups G1 to G5 serves as a vibration-proof lens group with a displacement component in a direction orthogonal to the optical axis. With such a configuration, image blur due to camera shake can be corrected. Furthermore, the vibration-proof lens group can be arranged with a higher degree of freedom, and thus can be appropriately arranged for a specific example.

Preferably, in the zoom lenses ZL according to the first to the third embodiments, at least a part of the second to the fourth lens groups G2 to G4 serves as the vibration-proof lens group with the displacement component in the direction orthogonal to the optical axis. This configuration ensures the camera shake to be corrected and the degree of freedom in the arrangement of the vibration proof lens to be high, and can further reduce variations in various aberrations such as coma aberration upon camera shake correction.

Preferably, in the zoom lenses ZL according to the first to the third embodiments, at least a part of the third lens group G3 serves as the vibration-proof lens group with the displacement component in the direction orthogonal to the optical axis. With this configuration, variations in various aberrations such as the coma aberration upon camera shake correction can be reduced.

In the zoom lenses ZL according to the first to the third embodiments, the fourth lens group G4 preferably includes at least one aspherical surface. With this configuration, the astigmatism, the curvature of field, the coma aberration, and the like can be successfully corrected, using an aspherical lens shape that can be processed.

In the zoom lenses ZL according to the first to the third embodiments, preferably, a range in which focusing is possible is moved toward a short distant side with at least one of the lens groups not serving as the focusing lens group moved, at any focal length between the wide angle end state and the telephoto end state. With this configuration, the range in which focusing is possible can be more on the short distant side.

A zoom lens ZL according to a fourth embodiment includes a plurality of lens groups (for example, the first to the fifth lens groups G1 to G5 illustrated in FIG. 1 and the like or first to sixth lens groups G1 to G6 illustrated in FIG. 11). In the zoom lens, a distance between adjacent lens groups in the plurality of lens groups is changed upon zooming from the wide angle end state to the telephoto end state, at least a part of the plurality of lens groups serves as a focusing lens group that moves in the optical axis direction upon focusing, and the range in which focusing is possible is moved toward the short distant side with a range changing lens group including at least one of the lens groups not serving as the focusing lens group moved in the optical axis direction, at any focal length between the wide angle end state and the telephoto end state. This configuration can provide the zoom lens ZL that has excellent optical performance and can have the range in which focusing is possible moved toward the short distant side.

Preferably, in the zoom lens ZL according to the fourth embodiment, the plurality of lens groups comprises, in order from the object: a first lens group having positive refractive power, a second lens group having negative refractive power, a third lens group having positive refractive power, a fourth lens group, and a fifth lens group. This configuration can provide the zoom lens ZL that has excellent optical performance and can have the range in which focusing is possible moved more toward the short distant side.

Preferably, in the zoom lens ZL according to the fourth embodiment, the plurality of lens groups comprises, in order from the object: a first lens group having positive refractive power, a second lens group having negative refractive power, a third lens group having positive refractive power, a fourth lens group having negative refractive power, and a fifth lens group having positive refractive power. This configuration can provide the zoom lens ZL that has excellent optical performance and can have the range in which focusing is possible moved more toward the short distant side.

In the zoom lens ZL according to the fourth embodiment, the fourth lens group preferably serves as the focusing lens group. This configuration can provide the zoom lens ZL that has excellent optical performance and can have the range in which focusing is possible moved more toward the short distant side.

In the zoom lens ZL according to the fourth embodiment, the second lens group preferably serves as the range changing lens group. This configuration can provide the zoom lens ZL that has excellent optical performance and can have the range in which focusing is possible moved more toward the short distant side.

In the zoom lens ZL according to the fourth embodiment, the any focal length is a focal length in the telephoto end state. This configuration can provide the zoom lens ZL that has excellent optical performance and can have the range in which focusing is possible moved more toward the short distant side.

The zoom lens ZL according to the fourth embodiment preferably satisfies the following conditional expression (8).

$$(-\beta SM) > 0.150 \tag{8}$$

where, $\beta SM$ denotes a shooting magnification at the shortest focal length set with the range in which focusing is possible moved toward the short distant side.

The zoom lens ZL that can have the range in which focusing is possible moved more toward the short distant side can be provided when the conditional expression (8), defining a condition for achieving the optimum value of the shooting magnification at the shortest focal length set with the range in which focusing is possible moved toward the short distant side, is satisfied.

To guarantee the effects of the present embodiment, the lower limit value of the conditional expression (8) is preferably set to be 0.200. To more effectively guarantee the effects of the present embodiment, the lower limit value of the conditional expression (8) is preferably set to be 0.250. To even more effectively guarantee the effects of the present embodiment, the lower limit value of the conditional expression (8) is preferably set to be 0.300. To even more effectively guarantee the effects of the present embodiment, the lower limit value of the conditional expression (8) is preferably set to be 0.350.

The zoom lens ZL according to the fourth embodiment preferably satisfies the following conditional expression (9).

$$\beta SM/\beta M > 2.00 \tag{9}$$

where, $\beta M$ denotes a shooting magnification at the shortest focal length set without moving the range in which focusing is possible toward the short distant side, and $\beta SM$ denotes a shooting magnification at the shortest focal length set with the range in which focusing is possible moved toward the short distant side.

The zoom lens ZL that can have the range in which focusing is possible moved more toward the short distant side can be provided when the conditional expression (9), defining a condition for achieving the optimum value of the shooting magnification at the shortest focal length set with the range in which focusing is possible moved toward the short distant side, is satisfied.

To guarantee the effects of the present embodiment, the lower limit value of the conditional expression (9) is preferably set to be 2.50. To more effectively guarantee the effects of the present embodiment, the lower limit value of the conditional expression (9) is preferably set to be 3.00. To even more effectively guarantee the effects of the present embodiment, the lower limit value of the conditional expression (9) is preferably set to be 3.50. To even more effectively guarantee the effects of the present embodiment, the lower limit value of the conditional expression (9) is preferably set to be 3.90.

The zoom lens ZL according to the fourth embodiment preferably satisfies the following conditional expression (10).

$$0.050 < |fSM/fF| < 1.000 \tag{10}$$

where, fSM denotes a focal length of a lens group moved when moving the range in which focusing is possible toward the short distant side, and fF denotes a focal length of the focusing lens group.

The zoom lens ZL that can have the range in which focusing is possible moved more toward the short distant side can be provided when the conditional expression (10), defining a condition for achieving the optimum value of the focal length of a lens group moved when moving the range in which focusing is possible toward the short distant side, is satisfied.

To guarantee the effects of the present embodiment, the lower limit value of the conditional expression (10) is preferably set to be 0.10. To more effectively guarantee the effects of the present embodiment, the lower limit value of the conditional expression (10) is preferably set to be 0.15.

To even more effectively guarantee the effects of the present embodiment, the lower limit value of the conditional expression (10) is preferably set to be 0.20. To even more effectively guarantee the effects of the present embodiment, the lower limit value of the conditional expression (10) is preferably set to be 0.22.

To guarantee the effects of the present embodiment, the upper limit value of the conditional expression (10) is preferably set to be 0.90. To more effectively guarantee the effects of the present embodiment, the upper limit value of the conditional expression (10) is preferably set to be 0.80. To even more effectively guarantee the effects of the present embodiment, the upper limit value of the conditional expression (10) is preferably set to be 0.70. To even more effectively guarantee the effects of the present embodiment, the upper limit value of the conditional expression (10) is preferably set to be 0.65.

The zoom lens ZL according to the fourth embodiment preferably satisfies the following conditional expression (11).

$$0.10<|fSM|/fw<2.00 \quad (11)$$

where, fSM denotes a focal length of a lens group moved when moving the range in which focusing is possible toward the short distant side, and fw denotes a focal length of the zoom lens ZL in the wide angle end state.

The zoom lens ZL that can have the range in which focusing is possible moved more toward the short distant side can be provided when the conditional expression (11), defining a condition for achieving the optimum value of the focal length of a lens group moved when moving the range in which focusing is possible toward the short distant side, is satisfied.

To guarantee the effects of the present embodiment, the lower limit value of the conditional expression (11) is preferably set to be 0.30. To more effectively guarantee the effects of the present embodiment, the lower limit value of the conditional expression (11) is preferably set to be 0.50. To even more effectively guarantee the effects of the present embodiment, the lower limit value of the conditional expression (11) is preferably set to be 0.70. To even more effectively guarantee the effects of the present embodiment, the lower limit value of the conditional expression (11) is preferably set to be 0.90.

To guarantee the effects of the present embodiment, the upper limit value of the conditional expression (11) is preferably set to be 1.80. To more effectively guarantee the effects of the present embodiment, the upper limit value of the conditional expression (11) is preferably set to be 1.60. To even more effectively guarantee the effects of the present embodiment, the upper limit value of the conditional expression (11) is preferably set to be 1.50. To even more effectively guarantee the effects of the present embodiment, the upper limit value of the conditional expression (11) is preferably set to be 1.40.

The zoom lens ZL according to the fourth embodiment preferably satisfies the following conditional expression (12).

$$1.00<|fF|/fw<30.00 \quad (12)$$

where, fF denotes a focal length of the focusing lens group, and fw denotes a focal length of the zoom lens ZL in the wide angle end state.

Variations in various aberrations, such as the spherical aberration and the coma aberration, can be reduced upon focusing, when the conditional expression (12), defining a condition for achieving the optimum value of the focal length of the focus lens group, is satisfied.

To guarantee the effects of the present embodiment, the lower limit value of the conditional expression (12) is preferably set to be 1.30. To more effectively guarantee the effects of the present embodiment, the lower limit value of the conditional expression (12) is preferably set to be 1.60. To even more effectively guarantee the effects of the present embodiment, the lower limit value of the conditional expression (12) is preferably set to be 1.80. To even more effectively guarantee the effects of the present embodiment, the lower limit value of the conditional expression (12) is preferably set to be 2.00.

To guarantee the effects of the present embodiment, the upper limit value of the conditional expression (12) is preferably set to be 20.00. To more effectively guarantee the effects of the present embodiment, the upper limit value of the conditional expression (12) is preferably set to be 15.00. To even more effectively guarantee the effects of the present embodiment, the upper limit value of the conditional expression (12) is preferably set to be 10.00. To even more effectively guarantee the effects of the present embodiment, the upper limit value of the conditional expression (12) is preferably set to be 7.00.

Figure 15:
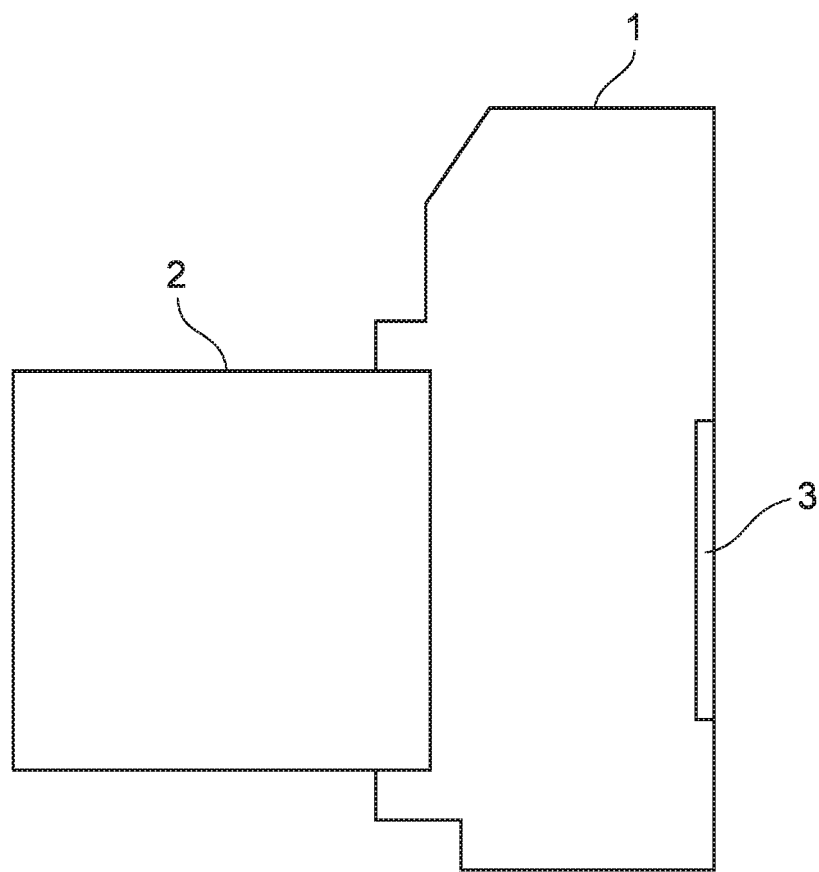
FIG. 15 is a schematic diagram illustrating a configuration of a camera including a zoom lens according to an embodiment.

The optical apparatus according to the present embodiment includes the zoom lens ZL with the configuration described above. A camera (optical apparatus) including the zoom lens ZL is described, as a specific example, with reference to FIG. 15. This camera 1 is a digital camera including the zoom lens ZL according to the present embodiment serving as an imaging lens 2 as illustrated in FIG. 15. In the camera 1, the imaging lens 2 collects light from an object (subject) (not illustrated), and then the light reaches an image sensor 3. Thus, an image based on the light from the subject is formed with the image sensor 3 to be stored as a subject image in a memory (not illustrated). In this manner, the photographer can capture an image of the subject with the camera 1. The camera may be a mirrorless camera, or may be a single lens reflex camera having a quick return mirror.

In the camera 1 having the configuration described above and including the zoom lens ZL serving as the imaging lens 2, the spherical aberration, the on-axis chromatic aberration, the lateral chromatic aberration, and the coma aberration can be successfully corrected and the thickness of the third lens group G3 can be reduced. Thus, a camera (optical apparatus) having a large diameter and a small size, and featuring excellent optical performance can be obtained.

Figure 16:
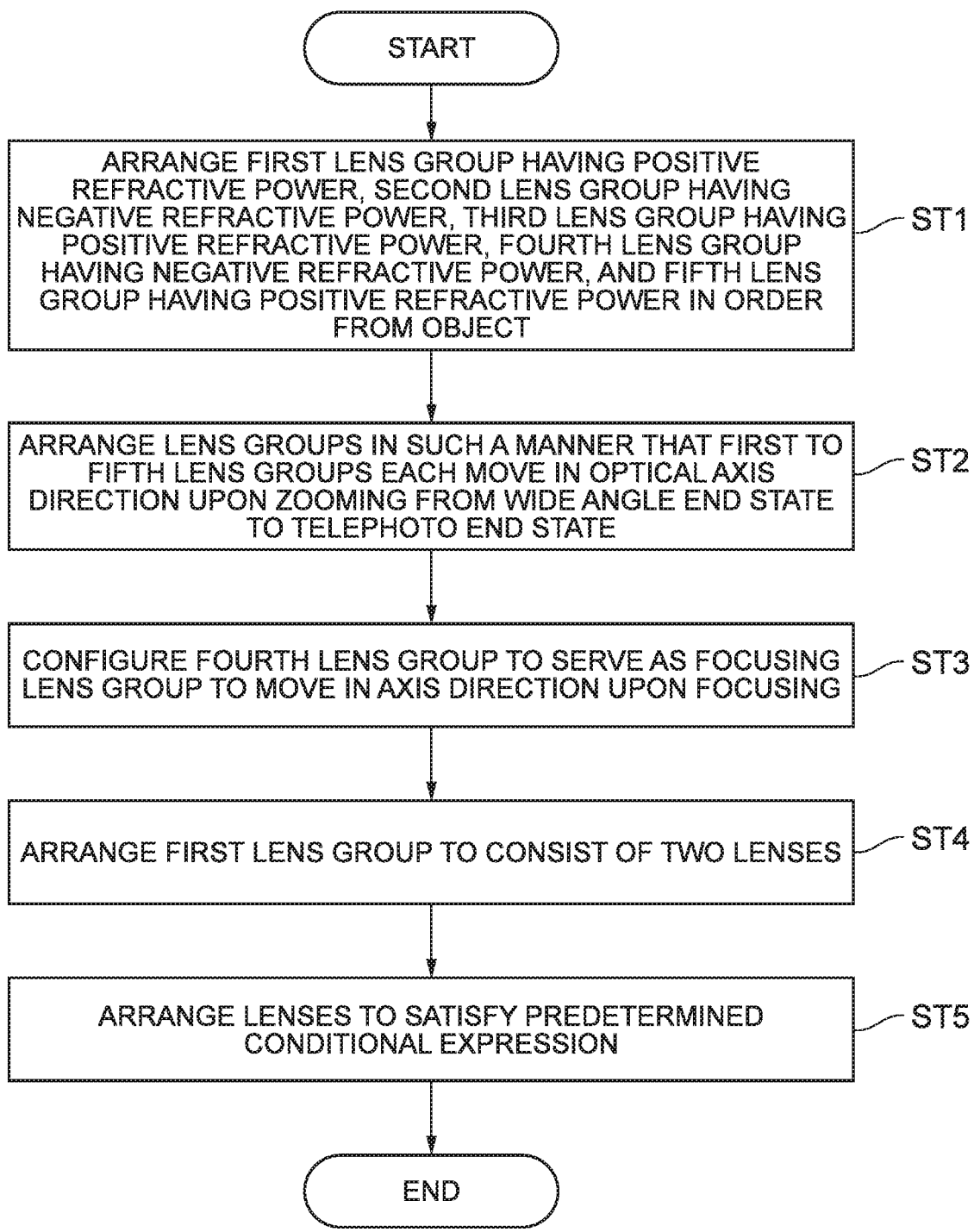
FIG. 16 is a flowchart illustrating an outline of a method for manufacturing the zoom lens according to first and second embodiments.

Next, a method for manufacturing the zoom lens ZL according to the first embodiment is described with reference to FIG. 16. First of all, the lens groups are arranged within a barrel in such a manner that the first lens group having positive refractive power, the second lens group having negative refractive power, the third lens group having positive refractive power, the fourth lens group having negative refractive power, and the fifth lens group having positive refractive power are disposed in order from the object (step ST1). The lens groups are arranged in such a manner that the first to the fifth lens groups each move in the optical axis direction upon zooming from the wide angle end state to the telephoto end state (step ST2). At least a part of the fourth lens group is configured to serve as the focusing lens group to move in the optical axis direction upon focusing (step ST3). The first lens group is arranged to consist of two lenses (step ST4). The lenses are arranged in such a manner that at least the conditional expression (1) described above is satisfied (step ST5).

Next, a method for manufacturing the zoom lens ZL according to the second embodiment is described with reference to FIG. 16, as in the case of the first embodiment. First of all, the lens groups are arranged within a barrel in such a manner that the first lens group having positive refractive power, the second lens group having negative refractive power, the third lens group having positive refractive power, the fourth lens group having negative refractive power, and the fifth lens group having positive refractive power are disposed in order from the object (step ST1). The lens groups are arranged in such a manner that the first to the fifth lens groups each move in the optical axis direction upon zooming from the wide angle end state to the telephoto end state (step ST2). At least a part of the fourth lens group is configured to serve as the focusing lens group to move in the optical axis direction upon focusing (step ST3). The first lens group is arranged to consist of two lenses (step ST4). The lenses are arranged in such a manner that at least the conditional expression (5) described above is satisfied (step ST5).

Figure 17:
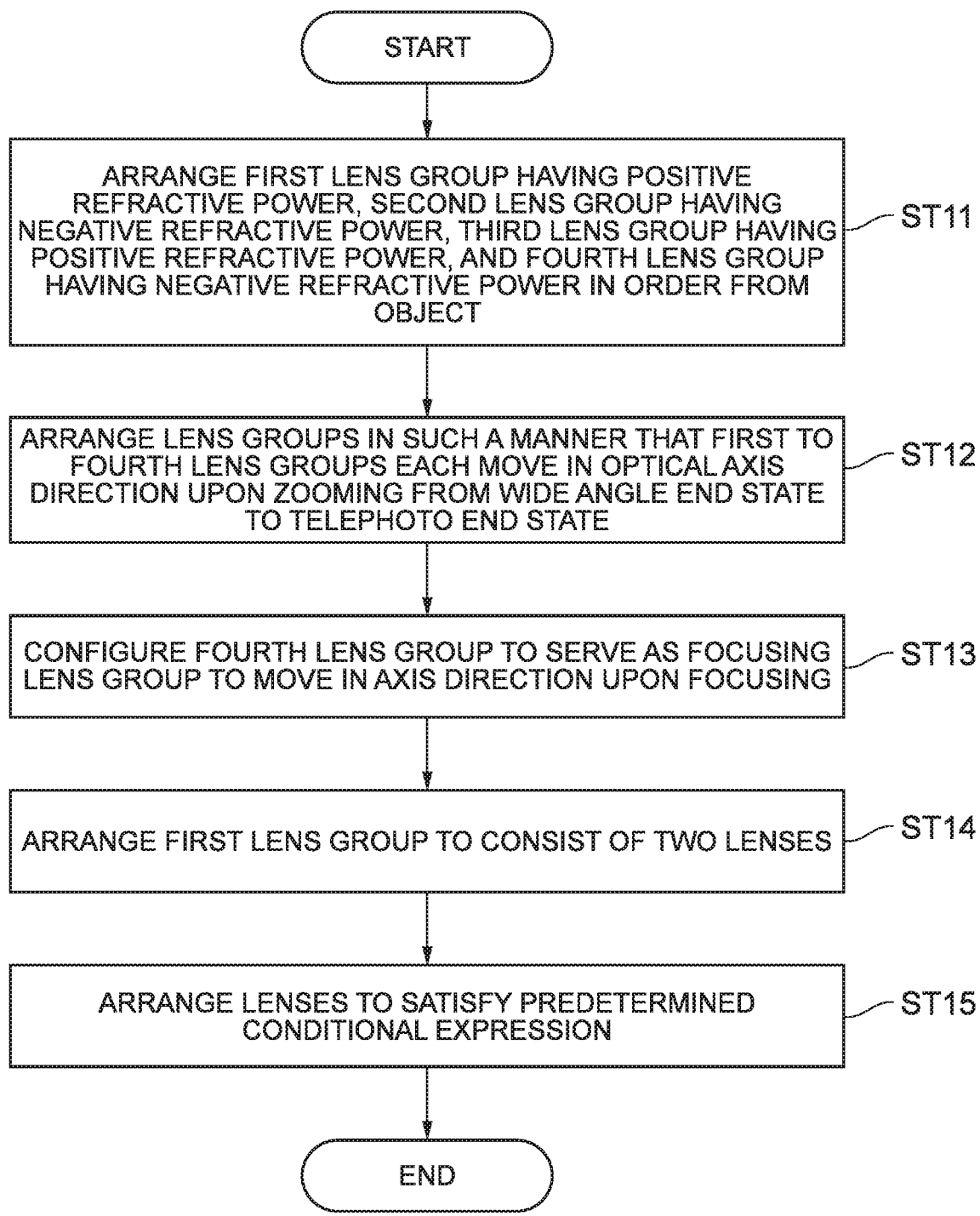
FIG. 17 is a flowchart illustrating an outline of a method for manufacturing the zoom lens according to a third embodiment.

Next, a method for manufacturing the zoom lens ZL according to the third embodiment is described with reference to FIG. 17. First of all, the lens groups are arranged within a barrel in such a manner that the first lens group having positive refractive power, the second lens group having negative refractive power, the third lens group having positive refractive power, and the fourth lens group having negative refractive power are disposed in order from the object (step ST11). The lens groups are arranged in such a manner that the first to the fourth lens groups each move in the optical axis direction upon zooming from the wide angle end state to the telephoto end state (step ST12). At least a part of the fourth lens group is configured to serve as the focusing lens group to move in the optical axis direction upon focusing (step ST13). The first lens group is arranged to consist of two lenses (step ST14). The lenses are arranged in such a manner that at least the conditional expression (13) described above is satisfied (step ST15).

Figure 18:
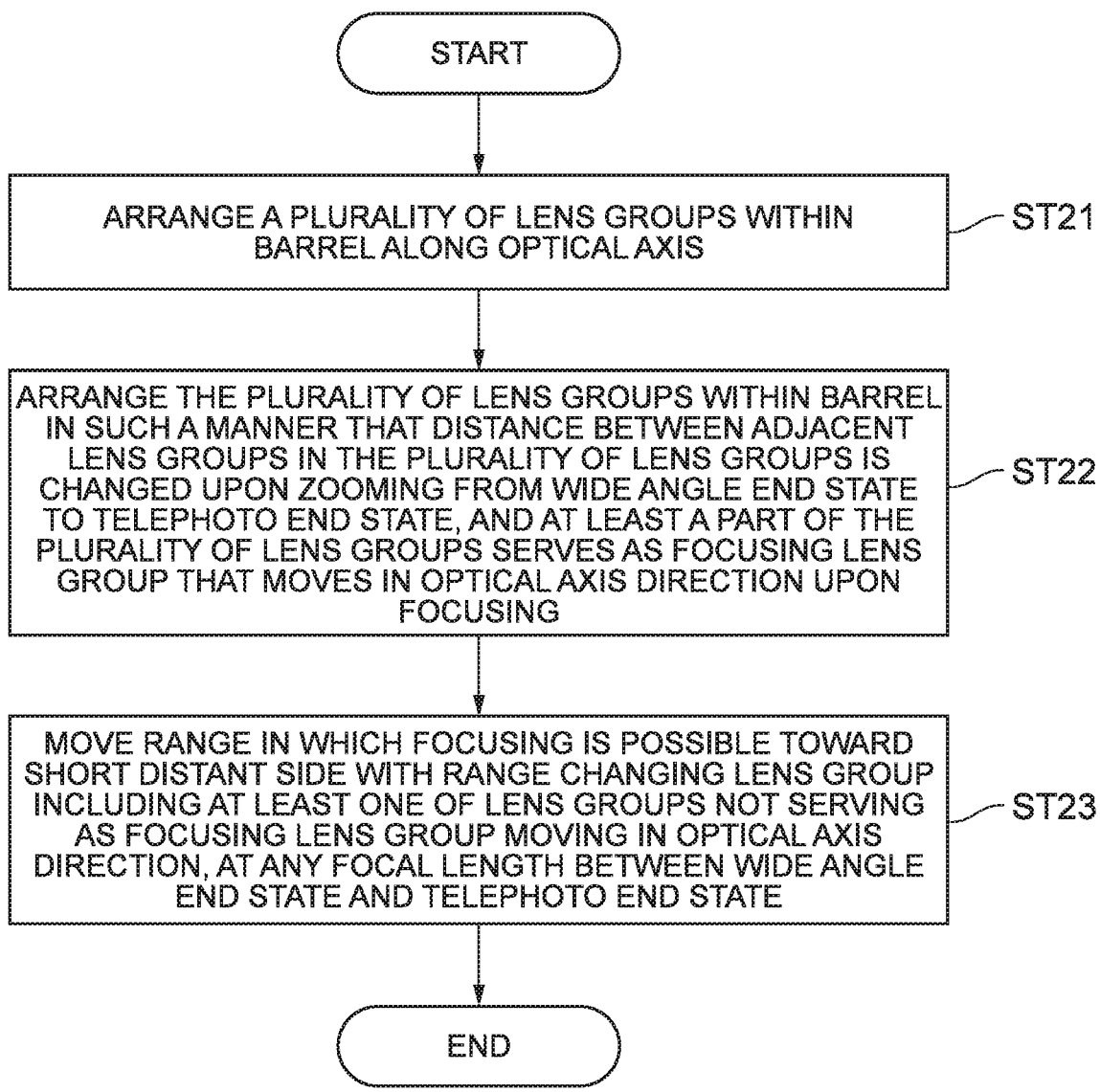
FIG. 18 is a flowchart illustrating an outline of a method for manufacturing the zoom lens according to a fourth embodiment.

Next, a method for manufacturing the zoom lens according to the fourth embodiment is described with reference to FIG. 18. First of all, a plurality of lens groups are arranged within a barrel along the optical axis (step S21). The plurality of lens groups are arranged within the barrel in such a manner that a distance between adjacent lens groups in the plurality of lens groups is changed upon zooming from the wide angle end state to the telephoto end state, and at least a part of the plurality of lens groups serves as a focusing lens group that moves in the optical axis direction upon focusing (step ST22). The range in which focusing is possible is moved toward the short distant side with a range changing lens group including at least one of the lens groups not serving as the focusing lens group moved in the optical axis direction, at any focal length between the wide angle end state and the telephoto end state (step ST23).

The manufacturing method according to the present embodiment can manufacture a camera (optical apparatus) having a large diameter and a small size, and featuring excellent optical performance, with the spherical aberration, the on-axis chromatic aberration, the lateral chromatic aberration, and the coma aberration successfully corrected.

EXAMPLES

Zoom lenses ZL according to Examples of the embodiments are described below with reference to the drawings.

FIGS. 1, 3, 5, 7, 9, 11, and 13 are cross-sectional views illustrating configurations and the like of the zoom lenses ZL{(ZL(1) to ZL(7)} according to Examples 1 to 7. In these figures, the positions of the zoom lenses ZL(1) to ZL(7) in the wide angle end state, the intermediate focal length state, the telephoto end state, and a macro state are respectively illustrated in an uppermost section (W), a second section (M), a third section (T), and a lowermost section (SM). Arrows between the sections indicate directions in which the lens groups move along the optical axis upon zooming from the wide angle end state (W) to the telephoto end state (T) and upon shifting from the telephoto end state (T) to the macro state (AM). In all of Examples 1 to 7, at least a part of the fourth lens group G4 serves as the focusing lens group and moves in the optical axis direction upon focusing from infinity to a short distant object.

In the figures, a combination of a sign G and a number represents each lens group, and a combination of a sign L and a number presents each lens. In each Example, lens groups and the like are each denoted with a combination of the reference sign and numeral independently from other Examples to prevent cumbersomeness due to an excessively wide variety or a large number of signs and numerals. Thus, components in different Examples denoted with the same combination of reference sign and numeral does not necessarily have the same configuration.

Table 1 to Table 7 described below are specification tables of Examples 1 to 7.

In Table [Lens specifications], a surface number represents an order of an optical surface from the object side in a traveling direction of a light beam, R represents a radius of curvature of each optical surface (with a surface having the center of curvature position on the image side provided with a positive value), D represents a distance between each optical surface and the next optical surface (or the image surface) on the optical axis, nd represents a refractive index of a material of an optical member with respect to the d-line, and vd represents Abbe number of the material of the optical member based on the d-line. In the table, object surface represents an object surface, "∞" of the radius of curvature represents a plane or an aperture, (stop S) represents the aperture stop S, and (stop FP) represents flare cut stop FP. The refractive index nd=1.00000 of air is omitted. An aspherical lens surface has a * mark in the field of surface number and has a paraxial radius of curvature in the field of radius of curvature R.

Table [Aspherical data] has the following formula (a) indicating the shape of an aspherical surface in [Lens specifications]. In the formula, X(y) represents a distance between the tangent plane at the vertex of the aspherical surface and a position on the aspherical surface at a height y along the optical axis direction, R represents a radius of curvature (paraxial radius of curvature) of a reference spherical surface, κ represents a conical coefficient, and Ai represents an ith aspherical coefficient. In the formula, "E-n" represents "×10$^{-n}$". For example, 1.234E-05=1.234×10$^{-5}$. A secondary aspherical coefficient A2 is 0.

$$X(y)=(y^2/R)/\{1+(1-\kappa \times y^2/R^2)^{1/2}\}+A4 \times y^4+A6 \times y^6+A8 \times y^8+A10 \times y^{10} \qquad (a)$$

Specifically, in Table [Overall specifications] including specifications of the whole zoom lens, f represents a focal length of the whole lens system, FNo represents F number, ω represents a half angle of view (maximum incident angle, unit: °), and Y represents an image height. Furthermore, Bf represents back focus that is a distance between a lens last surface and an image surface I on the optical axis upon focusing on infinity (air equivalent distance), and TL represents the total lens length that is a length obtained by adding BF to a distance between the lens forefront surface and the lens last surface on the optical axis. These values are provided for each of the zooming states including the wide angle end state (W), the intermediate focal length (M), the telephoto end state (T), and the macro (SM).

Tables [Variable distance data (upon focusing on infinity)], [Variable distance data (upon focusing on close distant object)], and [Variable distance data (macro state)] represents surface distances corresponding to surfaces with surface numbers appended with "variable" in Table [Lens specifications] (a surface distance between the surface with such a surface number and the next surface). For example, in Example 1, surface distances D3, D9, D18, D20, and D22 corresponding to the surfaces with the surface numbers 3, 9, 18, 20, and 22 are illustrated. Table [Variable distance data (upon focusing on infinity)] indicates surface distances upon focusing on infinity in zooming states including the wide angle end state (W), the intermediate focal length (M), and the telephoto end state (T). Table [Variable distance data (upon focusing on close distant object)] indicates surface distances upon focusing on a close distant object in zooming states including the wide angle end state (W), the intermediate focal length (M), and the telephoto end state (T). Table [Variable distance data (macro state)] indicates surface distances corresponding to surfaces with surface numbers appended with "variable" upon focusing on the far and near ends in the range in which focusing is possible, in the macro state. In Tables [Variable distance data (upon focusing on close distant object)] and [Variable distance data (macro state)], the object distance indicates a distance between the object and the lens forefront surface on the optical axis.

Table [Zoom lens group data] represents the group starting surface (surface closest to the object) of each of the first to the fifth (or sixth) lens groups and the focal length of each of the lens groups.

Table [Conditional expression corresponding value] represents values corresponding to the conditional expressions (1) to (16).

The focal length f, the radius of curvature R, the surface distance D and the other units of length described below as all the specification values, which are generally described with "mm" unless otherwise noted should not be construed in a limiting sense because the optical system proportionally expanded or reduced can have a similar or the same optical performance.

In FIGS. 2A-2C, FIGS. 4A-4C, FIGS. 6A-6C, FIGS. 8A-8C, FIGS. 10A-10C, FIGS. 12A-12C, and FIGS. 14A-14C illustrating aberration characteristics in Examples, FNO represents an F number, ω represents a half angle of view at each image height (unit: °), and d, g, C, and F represent aberrations on the d-line (λ=587.6 nm), the g-line (λ=435.8 nm), the C-line (λ=656.3 nm), and the F-line (λ=486.1 nm). In the astigmatism aberration graphs, a solid line represents a sagittal image surface, and a broken line represents a meridional image surface.

The description on the tables described above commonly applies to all Examples, and thus will not be given below.

Example 1

Example 1 is described with reference to FIG. 1 and FIGS. 2A-2C and Table 1. FIG. 1 is a diagram illustrating a lens configuration of a zoom lens ZL(1) according to Example 1 of the present embodiment. A zoom lens ZL(1) according to Example 1 includes, in order from an object: a first lens group G1 having positive refractive power; a second lens group G2 having negative refractive power; a third lens group G3 having positive refractive power; a fourth lens group G4 having negative refractive power; and a fifth lens group G5 having positive refractive power, as illustrated in the figure. A sign (+) or (−) provided to a sign of each lens group represents refractive power of the lens group. The third lens group G3 is provided with an aperture stop S on the object side and a flare cut stop FP on the image side. A filter FL and cover glass CG (protective glass for the image surface I) are provided more on the image side and closer to the image surface I than the fifth lens group G5. The filter FL includes a lowpass filter, an infrared cut filter, and the like.

The first lens group G1 includes a positive cemented lens including a negative meniscus lens L11 having a convex surface facing the object and a positive meniscus lens L12 having a convex surface facing the object.

The second lens group G2 includes a negative meniscus lens L21 having a convex surface facing the object, a biconcave negative lens L22, and a positive meniscus lens L23 having a convex surface facing the object. Both surfaces of the negative meniscus lens L21 have an aspherical shape.

The third lens group includes a biconvex positive lens L31, a negative meniscus lens L32 having a convex surface facing the object, a negative meniscus lens L33 having a convex surface facing the object, and a biconvex positive lens L34. Both surfaces of the biconvex positive lens L31 are aspherical surfaces, and the negative meniscus lens L33 and the biconvex positive lens L34 are integrally cemented to form a cemented lens.

The fourth lens group G4 includes a negative meniscus lens L41 having a convex surface facing the object. The surface of the negative meniscus lens L41 on the image side has an aspherical shape. The fourth lens group G4 serves as the focusing lens group and moves in the optical axis direction upon focusing from infinity to a short distant object.

The fifth lens group G5 includes a biconvex positive lens L51. The surface of the positive lens L51 on the object side has an aspherical shape.

In FIG. 1, the first to the fifth lens groups G1 to G5 each move in the optical axis direction upon zooming from the wide angle end state to the telephoto end state as indicated by arrows among the wide angle end state W in the upper section, the intermediate focal length state M in the middle section, and the telephoto end state T in the lower section.

In the zoom lens ZL(1), the fourth lens group G4 moves toward the image surface upon focusing from a long distant object to a short distant object.

In this zoom lens ZL(1), the telephoto end state (T) can be switched to the macro state (SM) with the second lens group G2 moving toward the object side as indicated by an arrow in FIG. 1. In other words, the second lens group G2 serves as a range changing lens group. Thus, as illustrated in Table [Variable distance data (macro state)], the range in which focusing is possible (object distance) using the fourth lens group G4 moves toward the short distant side. Specifically, the range in which focusing is possible is an object distance of 35 mm from infinity in the telephoto end state (T) and is in a range between 6.374 mm (far end) and 3.0776 mm (near end) in the macro state (SM).

Example 1 and other Examples described below involve the switching from the telephoto end state (T) to the macro state (SM). However, the zoom lens according to the present embodiment is not limited to this. Specifically, the intermediate focal length state (M) can be switched to the macro state (SM). The switching to the macro state (SM) may be performed with at least one of the first lens group G1 and the third lens group G3 moved in the optical axis direction, so that the range in which focusing is possible using the fourth lens group G4 moves toward the short distant side. The description above commonly applies to all Examples described below, and thus will not be redundantly given below.

In this Example, the third lens group G3 serves as a vibration-proof lens group, with a displacement component in a direction orthogonal to the optical axis, to be in charge of image blur correction on the image surface I (image stabilization, camera shake correction). To correct roll blur of an angle θ with an imaging lens having a focal length f of the whole system and a vibration proof coefficient K (the ratio of the image movement amount on the imaging surface to the movement amount of the moving lens group for camera shake correction), the vibration-proof lens group VR (moving lens group) for image blur correction is moved in the direction orthogonal to the optical axis by (f×tan θ)/K. This similarly applies to the other Examples described below, and thus a redundant description is omitted.

Image blur due to camera shake or the like may be corrected with a part of the third lens group G3 (the lens L31 closest to the object side, the partial lens groups L32 to L34 more on the image side, or the lens components L33 and L34 closest to the image side in the third lens group G3) moved with a component in a direction orthogonal to the optical axis. This commonly applies to Examples described below, and will not be redundantly described. Note that image blur due to camera shake or the like may be corrected with the second lens group G2 or the fourth lens group G4 moved with a component in a direction orthogonal to the optical axis. The image blur correction can also be performed by using the first or the fifth lens group G1 or G5 (or with the sixth lens group G6).

In the zoom lens according to this Example, a half angle of view ωt in the telephoto end state is 14.52003°, and a half angle of view ωw in the wide angle end state is 42.66851°.

Table 1 below lists specification values of the optical system according to Example 1.

TABLE 1

Example 1

[Lens specifications]

| Surface number | R | D | nd | vd |
|---|---|---|---|---|
| Object surface | | | | |
| 1 | 3.3875 | 0.0883 | 1.94595 | 17.98 |
| 2 | 2.5073 | 0.3917 | 1.804 | 46.6 |
| 3 | 15.3256 | D3 (Variable) | | |
| 4* | 10.4377 | 0.0883 | 1.77377 | 47.18 |
| 5* | 0.9368 | 0.5682 | | |
| 6 | −2.0103 | 0.0552 | 1.6968 | 55.52 |
| 7 | 11.741 | 0.0165 | | |
| 8 | 2.8956 | 0.182 | 2.00272 | 19.32 |
| 9 | 32.9378 | D9 (variable) | | |
| 10 | ∞ | 0.1103 | (stop S) | |
| 11* | 1.428 | 0.342 | 1.7433 | 49.32 |
| 12* | −20.4848 | 0.2482 | | |
| 13 | 2.0754 | 0.0662 | 1.78472 | 25.64 |
| 14 | 1.178 | 0.1048 | | |
| 15 | 2.0894 | 0.0662 | 1.84666 | 23.8 |
| 16 | 1.1635 | 0.4082 | 1.59319 | 67.9 |
| 17 | −2.2213 | 0.1324 | | |
| 18 | ∞ | D18 (variable) | (stop FP) | |
| 19 | 11.8729 | 0.0552 | 1.58313 | 59.44 |
| 20* | 1.4678 | D20 (variable) | | |
| 21* | 3.9352 | 0.342 | 1.7725 | 49.49 |
| 22 | −5.2116 | D22 (variable) | | |
| 23 | ∞ | 0.0519 | 1.5168 | 63.88 |
| 24 | ∞ | 0.1449 | | |
| 25 | ∞ | 0.0772 | 1.5168 | 63.88 |
| 26 | ∞ | 0.141 | | |
| Image surface I | ∞ | | | |

[Aspherical surface data]

| Surface number | K | A4 | A6 | A8 | A10 |
|---|---|---|---|---|---|
| 4 | 1 | −1.0277E−02 | −1.3472E−03 | 1.8041E−03 | 0.0000E+00 |
| 5 | 1 | −3.5627E−02 | −3.9762E−02 | −2.8089E−03 | −1.0271E−01 |
| 11 | 1 | −2.2811E−02 | 2.6608E−03 | 0.0000E+00 | 0.0000E+00 |
| 12 | 1 | 5.4839E−02 | 1.6759E−03 | 0.0000E+00 | 0.0000E+00 |
| 20 | 1 | 5.4875E−02 | −3.4000E−02 | −6.0070E−03 | 0.0000E+00 |
| 21 | 1 | 1.6561E−02 | 4.9596E−03 | 0.0000E+00 | 0.0000E+00 |

TABLE 1-continued

Example 1

[Overall specifications]

|  | Wide Angle End | Intermediate Focal Length | Telephoto End | Macro |
|---|---|---|---|---|
| f | 1 | 1.89786 | 3.35396 | 2.28336 |
| FNO | 1.85737 | 2.5538 | 2.82081 | 2.74749 |
| ω | 42.66851 | 25.63713 | 14.52003 |  |
| Y | 0.767 | 0.904 | 0.904 | 0.904 |
| Bf | 0.9752 | 0.8584 | 0.9272 | 0.9272 |
| TL | 7.0767 | 6.9849 | 7.8656 | 7.8656 |

|  | Wide Angle End | Intermediate Focal Length | Telephoto End |
|---|---|---|---|

[Variable distance data (upon focusing on infinity)]

| Object distance | ∞ | ∞ | ∞ |
|---|---|---|---|
| D3 | 0.0477 | 0.5288 | 1.5595 |
| D9 | 1.9831 | 0.8163 | 0.2790 |
| D18 | 0.2116 | 0.7499 | 1.0551 |
| D20 | 0.5934 | 0.7659 | 0.7792 |
| D22 | 0.6042 | 0.4874 | 0.5562 |

[Variable distance data (upon focusing on close distant object)]

| Object distance | 35 | 35 | 35 |
|---|---|---|---|
| Magnification | −0.02736 | −0.05105 | −0.08465 |
| D3 | 0.0477 | 0.5288 | 1.5595 |
| D9 | 1.9831 | 0.8163 | 0.2790 |
| D18 | 0.2127 | 0.7534 | 1.0660 |
| D20 | 0.5923 | 0.7623 | 0.7682 |
| D22 | 0.6042 | 0.4874 | 0.5562 |

[Variable distance data (macro state)]

|  | far end | near end |
|---|---|---|
| Object distance | 6.374 | 3.0776 |
| Magnification | −0.24955 | −0.37577 |
| D3 | 1.0575 | 1.0575 |
| D9 | 0.7810 | 0.7810 |
| D18 | 1.0452 | 1.3722 |
| D20 | 0.7890 | 0.4620 |
| D22 | 0.5562 | 0.5562 |

[Zoom lens group data]

| Group number | Group starting surface | Group focal length |
|---|---|---|
| G1 | 1 | 5.74405 |
| G2 | 4 | −1.16027 |
| G3 | 11 | 1.57546 |
| G4 | 19 | −2.87791 |
| G5 | 21 | 2.95058 |

[Conditional expression corresponding value]

Conditional expression (1) GD3/ft = 0.368
Conditional expression (2) GD2/ft = 0.271
Conditional expression (3) f1/ft = 1.713
Conditional expression (4) TLt/ft = 2.345
Conditional expression (5) (β45w)/ (β45t) = 0.962
Conditional expression (6) ωt = 14.52003°
Conditional expression (7) ωw = 42.66851°
Conditional expression (8) (−βSM) = 0.376
Conditional expression (9) βSM/βM = 4.439
Conditional expression (10) |fSM/fF| = 0.403
Conditional expression (11) |fSM|/fw = 1.160
Conditional expression (12) |fF|/fw = 2.878
Conditional expression (13) (β4w)/ (β4t) = 0.987
Conditional expression (14) (βFw)/ (βFt) = 0.987

TABLE 1-continued

Example 1

Conditional expression (15) (ft/fw)/FNw = 1.806
Conditional expression (16) FNw = 1.857

FIGS. 2A, 2B, and 2C are graphs showing various aberrations of the zoom optical system according to Example 1 upon focusing on infinity, respectively in the wide angle end state, the intermediate focal length state, and the telephoto end state.

It can be seen in these aberration graphs that the zoom optical system according to this Example can achieve excellent imaging performance with various aberrations successfully corrected from the wide angle end state to the telephoto end state.

Example 2

Example 2 is described with reference to FIG. 3 and FIGS. 4A-4C and Table 2. FIG. 3 is a diagram illustrating a lens configuration of a zoom lens ZL(2) according to Example 2 of the present embodiment. The zoom lens ZL(2) according to Example 2 includes, in order from an object: a first lens group G1 having positive refractive power; a second lens group G2 having negative refractive power; a third lens group G3 having positive refractive power; a fourth lens group G4 having negative refractive power; and a fifth lens group G5 having positive refractive power, as illustrated in the figure. The third lens group G3 is provided with an aperture stop S on the object side and a flare cut stop FP on the image side. A filter FL and cover glass CG (protective glass for the image surface I) are provided more on the image side and closer to the image surface I than the fifth lens group G5.

The first lens group G1 includes a positive cemented lens including a negative meniscus lens L11 having a convex surface facing the object and a positive meniscus lens L12 having a convex surface facing the object.

The second lens group G2 includes a negative meniscus lens L21 having a convex surface facing the object, a biconcave negative lens L22, and a positive meniscus lens L23 having a convex surface facing the object. Both surfaces of the negative meniscus lens L21 have an aspherical shape.

The third lens group includes a biconvex positive lens L31, a biconvex positive lens L32, a biconcave negative lens L33, a negative meniscus lens L34 having a convex surface facing the object, and a biconvex positive lens L35. Both surfaces of the biconvex positive lens L31 have an aspherical shape. The biconvex positive lens L32 and the biconcave negative lens L33 are integrally cemented to form a cemented lens. The negative meniscus lens L34 and the biconvex positive lens L35 are also integrally cemented to form a cemented lens.

The fourth lens group G4 includes a negative meniscus lens L41 having a convex surface facing the object. The surface of the negative meniscus lens L41 on the image side has an aspherical shape. The fourth lens group G4 serves as the focusing lens group and moves in the optical axis direction upon focusing from infinity to a short distant object.

The fifth lens group G5 includes a biconvex positive lens L51. The surface of the positive lens L51 on the object side has an aspherical shape.

In FIG. 3, the first to the fifth lens groups G1 to G5 each move in the optical axis direction upon zooming from the wide angle end state to the telephoto end state as indicated by arrows among the wide angle end state W in the upper section, the intermediate focal length state M in the middle section, and the telephoto end state T in the lower section.

In the zoom lens ZL(2), the fourth lens group G4 moves toward the image surface upon focusing from a long distant object to a short distant object.

In this zoom lens ZL(2), the telephoto end state (T) can be switched to the macro state (SM) with the second lens group G2 moving toward the object side as indicated by an arrow in FIG. 3. In other words, the second lens group G2 serves as a range changing lens group. Thus, as illustrated in Table [Variable distance data (macro state)], the range in which focusing is possible using the fourth lens group G4 moves toward the short distant side.

In this Example, the third lens group G3 serves as a vibration-proof lens group, with a displacement component in a direction orthogonal to the optical axis, to be in charge of image blur correction on the image surface I (image stabilization, camera shake correction). Image blur due to camera shake or the like may be corrected with a part of the third lens group G3 (the lens L31 closest to the object side, the partial lens groups L32 to L35 more on the image side, or the lens components L34 and L35 closest to the image side in the third lens group G3) moved with a component in a direction orthogonal to the optical axis.

In the zoom lens according to this Example, a half angle of view ωt in the telephoto end state is 14.53401°, and a half angle of view ωw in the wide angle end state is 42.43174°.

Table 2 below lists specification values of the optical system according to Example 2.

TABLE 2

Example 2

[Lens specifications]

| Surface number | R | D | nd | vd |
| --- | --- | --- | --- | --- |
| Object surface | | | | |
| 1 | 3.1536 | 0.0773 | 1.94595 | 17.98 |
| 2 | 2.5266 | 0.4042 | 1.72916 | 54.61 |
| 3 | 15.6755 | D3 (variable) | | |
| 4* | 7.9832 | 0.0884 | 1.77377 | 47.18 |

TABLE 2-continued

| Example 2 | | | | |
|---|---|---|---|---|
| 5* | 0.9378 | 0.558 | | |
| 6 | −2.5161 | 0.0552 | 1.72916 | 54.61 |
| 7 | 6.4431 | 0.0166 | | |
| 8 | 2.3071 | 0.1823 | 1.94595 | 17.98 |
| 9 | 8.6129 | D9 (variable) | | |
| 10 | ∞ | 0.221 | (stop S) | |
| 11* | 1.473 | 0.3315 | 1.7433 | 49.32 |
| 12* | −9.5313 | 0.0387 | | |
| 13 | 1.5629 | 0.2762 | 1.497 | 81.73 |
| 14 | 25.8147 | 0.0663 | 1.6727 | 32.19 |
| 15 | 1.0285 | 0.1547 | | |
| 16 | 3.163 | 0.0552 | 1.86074 | 23.08 |
| 17 | 1.5302 | 0.2762 | 1.6968 | 55.52 |
| 18 | −2.4035 | 0 | | |
| 19 | ∞ | D19 (Variable) | (stop FP) | |
| 20* | 51.2989 | 0.0552 | 1.58913 | 61.24 |
| 21* | 1.7425 | D21 (variable) | | |
| 22* | 4.2621 | 0.3315 | 1.6935 | 53.22 |
| 23 | −4.0082 | D23 (variable) | | |
| 24 | ∞ | 0.0519 | 1.5168 | 63.88 |
| 25 | ∞ | 0.0898 | | |
| 26 | ∞ | 0.0773 | 1.5168 | 63.88 |
| 27 | ∞ | 0.141 | | |
| Image surface I | ∞ | | | |

[Aspherical surface data]

| Surface number | K | A4 | A6 | A8 | A10 |
|---|---|---|---|---|---|
| 4 | 1 | −3.8126E−03 | −1.6217E−02 | 1.5790E−02 | −4.8965E−03 |
| 5 | 1 | −8.8940E−03 | −5.0871E−03 | −8.5885E−02 | 4.4979E−02 |
| 11 | 1 | −2.8024E−02 | 1.2681E−02 | 4.0042E−03 | 0.0000E+00 |
| 12 | 1 | 3.8589E−02 | 1.8219E−02 | 0.0000E+00 | 0.0000E+00 |
| 20 | 1 | −5.8686E−02 | 1.3480E−01 | 0.0000E+00 | 0.0000E+00 |
| 21 | 1 | 1.1002E−02 | 9.4759E−02 | −3.4107E−02 | 0.0000E+00 |
| 22 | 1 | 2.5224E−02 | 0.0000E+00 | 0.0000E+00 | 0.0000E+00 |

[Overall specifications]

| | Wide Angle End | Intermediate Focal Length | Telephoto End | Macro |
|---|---|---|---|---|
| f | 1 | 1.87846 | 3.36895 | 2.26309 |
| FNO | 1.87916 | 2.80398 | 2.86889 | 2.88258 |
| ω | 42.43174 | 25.18874 | 14.53401 | |
| Y | 0.767 | 0.904 | 0.904 | 0.904 |
| Bf | 1.0628 | 0.9394 | 1.0231 | 1.0231 |
| TL | 6.8148 | 6.7811 | 7.7414 | 7.7414 |

| | Wide Angle End | Intermediate Focal Length | Telephoto End |
|---|---|---|---|

[Variable distance data (upon focusing on infinity)]

| Object distance | ∞ | ∞ | ∞ |
|---|---|---|---|
| D3 | 0.0410 | 0.4834 | 1.5573 |
| D9 | 1.7759 | 0.6899 | 0.1669 |
| D19 | 0.2204 | 0.7541 | 1.0519 |
| D21 | 0.5262 | 0.7258 | 0.7537 |
| D23 | 0.7468 | 0.6234 | 0.7071 |

[Variable distance data (upon focusing on close distant object)]

| Object distance | 35 | 35 | 35 |
|---|---|---|---|
| Magnification | −0.02738 | −0.05073 | −0.08562 |
| D3 | 0.0410 | 0.4834 | 1.5573 |
| D9 | 1.7759 | 0.6899 | 0.1669 |
| D19 | 0.2215 | 0.7578 | 1.0635 |
| D21 | 0.5251 | 0.7221 | 0.7421 |
| D23 | 0.7468 | 0.6234 | 0.7071 |

TABLE 2-continued

Example 2

[Variable distance data (macro state)]

|  | far end | near end |
|---|---|---|
| Object distance | 6.1755 | 3.1721 |
| Magnification | −0.25483 | −0.37261 |
| D3 | 1.0553 | 1.0553 |
| D9 | 0.6689 | 0.6689 |
| D19 | 1.0519 | 1.3691 |
| D21 | 0.7537 | 0.4366 |
| D23 | 0.7071 | 0.7071 |

[Zoom lens group data]

| Group number | Group starting surface | Group focal length |
|---|---|---|
| G1 | 1 | 5.82896 |
| G2 | 4 | −1.16011 |
| G3 | 11 | 1.51941 |
| G4 | 20 | −3.06294 |
| G5 | 22 | 3.02824 |

[Conditional expression corresponding value]

Conditional expression (1) GD3/ft = 0.356
Conditional expression (2) GD2/ft = 0.267
Conditional expression (3) f1/ft = 1.730
Conditional expression (4) TLt/ft = 2.298
Conditional expression (5) (β45w)/ (β45t) = 0.958
Conditional expression (6) ωt = 14.53401°
Conditional expression (7) ωw = 42.43174°
Conditional expression (8) (−βSM) = 0.373
Conditional expression (9) βSM/βM = 4.352
Conditional expression (10) |fSM/fF| = 0.379
Conditional expression (11) |fSM|/fw = 1.160
Conditional expression (12) |fF|/fw = 3.063
Conditional expression (13) (β4w)/ (β4t) = 0.978
Conditional expression (14) (βFw)/ (βFt) = 0.978
Conditional expression (15) (ft/fw)/FNw = 1.793
Conditional expression (16) FNw = 1.879

Figure 4C:
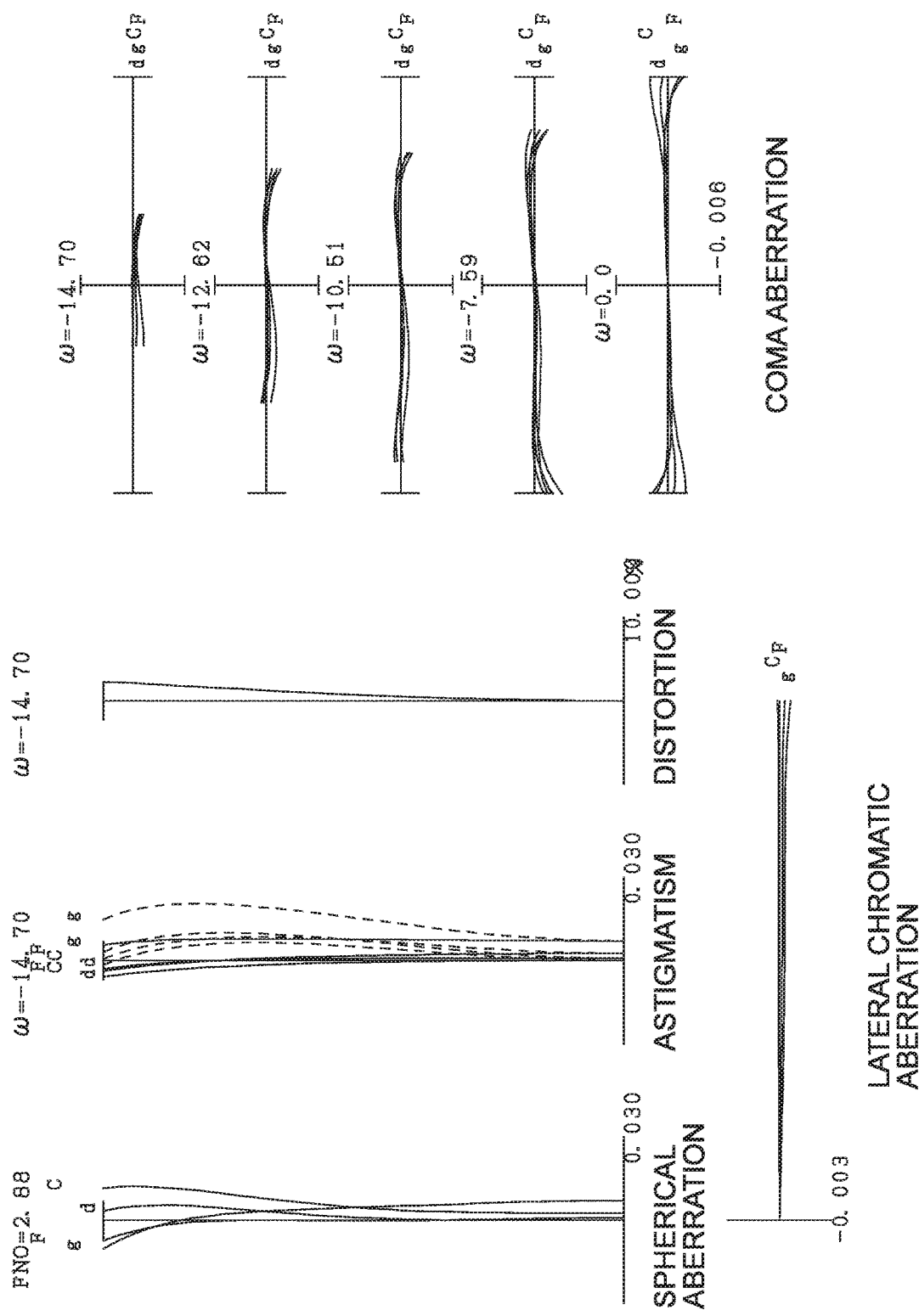

FIGS. 4A, 4B, and 4C are graphs showing various aberrations of the zoom optical system according to Example 2 upon focusing on infinity, respectively in the wide angle end state, the intermediate focal length state, and the telephoto end state.

It can be seen in these aberration graphs that the zoom optical system according to this Example can achieve excellent imaging performance with various aberrations successfully corrected from the wide angle end state to the telephoto end state.

Example 3

Example 3 is described with reference to FIG. 5 and FIGS. 6A-6C and Table 3. FIG. 5 is a diagram illustrating a lens configuration of a zoom lens ZL(3) according to Example 3 of the present embodiment. The zoom lens ZL(3) according to Example 3 includes, in order from an object: a first lens group G1 having positive refractive power; a second lens group G2 having negative refractive power; a third lens group G3 having positive refractive power; a fourth lens group G4 having negative refractive power; and a fifth lens group G5 having positive refractive power, as illustrated in the figure. The third lens group G3 is provided with an aperture stop S on the object side and a flare cut stop FP on the image side. A filter FL and cover glass CG (protective glass for the image surface I) are provided more on the image side and closer to the image surface I than the fifth lens group G5.

The first lens group G1 includes a positive cemented lens including a negative meniscus lens L11 having a convex surface facing the object and a positive meniscus lens L12 having a convex surface facing the object.

The second lens group G2 includes a negative meniscus lens L21 having a convex surface facing the object, a biconcave negative lens L22, and a positive meniscus lens L23 having a convex surface facing the object. Both surfaces of the negative meniscus lens L21 have an aspherical shape.

The third lens group includes a biconvex positive lens L31, a biconvex positive lens L32, a biconcave negative lens L33, a negative meniscus lens L34 having a convex surface facing the object, and a biconvex positive lens L35. Both surfaces of the biconvex positive lens L31 have an aspherical shape. The biconvex positive lens L32 and the biconcave negative lens L33 are integrally cemented to form a cemented lens. The negative meniscus lens L34 and the biconvex positive lens L35 are also integrally cemented to form a cemented lens.

The fourth lens group G4 includes a negative meniscus lens L41 having a convex surface facing the object. Both surfaces of the negative meniscus lens L41 have an aspherical shape. The fourth lens group G4 serves as the focusing lens group and moves in the optical axis direction upon focusing from infinity to a short distant object.

The fifth lens group G5 includes a biconvex positive lens L51. The surface of the positive lens L51 on the object side has an aspherical shape.

In FIG. 5, the first to the fifth lens groups G1 to G5 each move in the optical axis direction upon zooming from the wide angle end state to the telephoto end state as indicated by arrows among the wide angle end state W in the upper section, the intermediate focal length state M in the middle section, and the telephoto end state T in the lower section.

In the zoom lens ZL(3), the fourth lens group G4 moves toward the image surface upon focusing from a long distant object to a short distant object.

In this zoom lens ZL(3), the telephoto end state (T) can be switched to the macro state (SM) with the second lens group G2 moving toward the object side as indicated by an arrow in FIG. 5. In other words, the second lens group G2 serves as a range changing lens group. Thus, as illustrated in Table [Variable distance data (macro state)], the range in which focusing is possible using the fourth lens group G4 moves toward the short distant side.

In this Example, the third lens group G3 serves as a vibration-proof lens group, with a displacement component in a direction orthogonal to the optical axis, to be in charge of image blur correction on the image surface I (image stabilization, camera shake correction). Image blur due to camera shake or the like may be corrected with a part of the third lens group G3 (the lens L31 closest to the object side, the partial lens groups L32 to L35 more on the image side, or the lens components L34 and L35 closest to the image side in the third lens group G3) moved with a component in a direction orthogonal to the optical axis.

In the zoom lens according to this Example, a half angle of view ωt in the telephoto end state is 14.69713°, and a half angle of view ωw in the wide angle end state is 43.16675°.

Table 3 below lists specification values of the optical system according to Example 3.

TABLE 3

Example 3

[Lens specifications]

| Surface number | R | D | nd | vd |
|---|---|---|---|---|
| Object surface | | | | |
| 1 | 3.262 | 0.0773 | 1.94595 | 17.98 |
| 2 | 2.6152 | 0.4004 | 1.72916 | 54.61 |
| 3 | 19.259 | D3 (variable) | | |
| 4* | 9.3069 | 0.0884 | 1.77377 | 47.18 |
| 5* | 0.954 | 0.5578 | | |
| 6 | −2.573 | 0.0552 | 1.72916 | 54.61 |
| 7 | 8.1048 | 0.0166 | | |
| 8 | 2.3225 | 0.1822 | 1.94595 | 17.98 |
| 9 | 7.9296 | D9 (variable) | | |
| 10 | ∞ | 0.2209 | (stop S) | |
| 11* | 1.4456 | 0.3313 | 1.7433 | 49.32 |
| 12* | −10.45 | 0.0387 | | |
| 13 | 1.5349 | 0.2761 | 1.497 | 81.73 |
| 14 | −18.3425 | 0.0663 | 1.6727 | 32.19 |
| 15 | 1.0028 | 0.1546 | | |
| 16 | 3.2294 | 0.0552 | 1.86074 | 23.08 |
| 17 | 1.5988 | 0.2761 | 1.6968 | 55.52 |
| 18 | −2.4672 | 0 | | |
| 19 | ∞ | D19 (variable) | (stop FP) | |
| 20* | 25.8254 | 0.0552 | 1.58913 | 61.24 |
| 21* | 1.7391 | D21 (variable) | | |
| 22* | 3.7316 | 0.3313 | 1.6935 | 53.22 |
| 23 | −4.7609 | D23 (variable) | | |
| 24 | ∞ | 0.0519 | 1.5168 | 63.88 |
| 25 | ∞ | 0.0898 | | |
| 26 | ∞ | 0.0773 | 1.5168 | 63.88 |
| 27 | ∞ | 0.141 | | |
| Image surface I | ∞ | | | |

[Aspherical surface data]

| Surface number | K | A4 | A6 | A8 | A10 |
|---|---|---|---|---|---|
| 4 | 1 | −5.2858E−03 | −1.7600E−02 | 1.8250E−02 | −5.7364E−03 |
| 5 | 1 | −1.2357E−02 | −1.8167E−02 | −6.4645E−02 | 2.4629E−02 |
| 11 | 1 | −2.8836E−02 | 1.2255E−02 | 4.1574E−03 | 0.0000E+00 |
| 12 | 1 | 3.7458E−02 | 1.8284E−02 | 0.0000E+00 | 0.0000E+00 |
| 20 | 1 | −5.2731E−02 | 1.4672E−01 | 0.0000E+00 | 0.0000E+00 |
| 21 | 1 | 8.6032E−03 | 9.3057E−02 | −1.9129E−02 | 0.0000E+00 |
| 22 | 1 | 2.1390E−02 | 0.0000E+00 | 0.0000E+00 | 0.0000E+00 |

TABLE 3-continued

Example 3

[Overall specifications]

|  | Wide Angle End | Intermediate Focal Length | Telephoto End | Macro |
|---|---|---|---|---|
| f | 1 | 1.8914 | 3.36583 | 2.24309 |
| FNO | 1.88356 | 2.89577 | 2.88494 | 2.88908 |
| ω | 43.16675 | 25.96976 | 14.69713 | |
| Y | 0.767 | 0.904 | 0.904 | 0.904 |
| Bf | 1.0284 | 0.9052 | 1.0419 | 1.0419 |
| TL | 6.8685 | 6.7817 | 7.7424 | 7.7424 |

[Variable distance data (upon focusing on infinity)]

|  | Wide Angle End | Intermediate Focal Length | Telephoto End |
|---|---|---|---|
| Object distance | ∞ | ∞ | ∞ |
| D3 | 0.0442 | 0.5122 | 1.5303 |
| D9 | 1.8532 | 0.7122 | 0.1802 |
| D19 | 0.2209 | 0.7684 | 0.9886 |
| D21 | 0.5383 | 0.7000 | 0.8178 |
| D23 | 0.7124 | 0.5893 | 0.7259 |

[Variable distance data (upon focusing on close distant object)]

|  | Wide Angle End | Intermediate Focal Length | Telephoto End |
|---|---|---|---|
| Object distance | 35 | 35 | 35 |
| Magnification | −0.02737 | −0.05098 | −0.08598 |
| D3 | 0.0442 | 0.5122 | 1.5303 |
| D9 | 1.8532 | 0.7122 | 0.1802 |
| D19 | 0.2221 | 0.7725 | 1.0003 |
| D21 | 0.5372 | 0.6960 | 0.8061 |
| D23 | 0.7124 | 0.5893 | 0.7259 |

[Variable distance data (macro state)]

|  | far end | near end |
|---|---|---|
| Object distance | 6.1947 | 3.2118 |
| Magnification | −0.25471 | −0.37427 |
| D3 | 1.0003 | 1.0003 |
| D9 | 0.7102 | 0.7102 |
| D19 | 0.9886 | 1.3057 |
| D21 | 0.8178 | 0.5006 |
| D23 | 0.7259 | 0.7259 |

[Zoom lens group data]

| Group number | Group starting surface | Group focal length |
|---|---|---|
| G1 | 1 | 5.79867 |
| G2 | 4 | −1.19283 |
| G3 | 11 | 1.5409 |
| G4 | 20 | −3.16791 |
| G5 | 22 | 3.06545 |

[Conditional expression corresponding value]

Conditional expression (1) GD3/ft = 0.356
Conditional expression (2) GD2/ft = 0.267
Conditional expression (3) f1/ft = 1.723
Conditional expression (4) TLt/ft = 2.300
Conditional expression (5) (β45w)/(β45t) = 0.954
Conditional expression (6) ωt = 14.69713°
Conditional expression (7) ωw = 43.16675°
Conditional expression (8) (−βSM) = 0.374
Conditional expression (9) βSM/βM = 4.353
Conditional expression (10) |fSM/fF| = 0.377
Conditional expression (11) |fSM|/fw = 1.193
Conditional expression (12) |fF|/fw = 3.168

TABLE 3-continued

Example 3

Conditional expression (13) (β4w)/(β4t) = 0.947
Conditional expression (14) (βFw)/(βFt) = 0.947
Conditional expression (15) (ft/fw)/FNw = 1.787
Conditional expression (16) FNw = 1.884

Figure 6C:
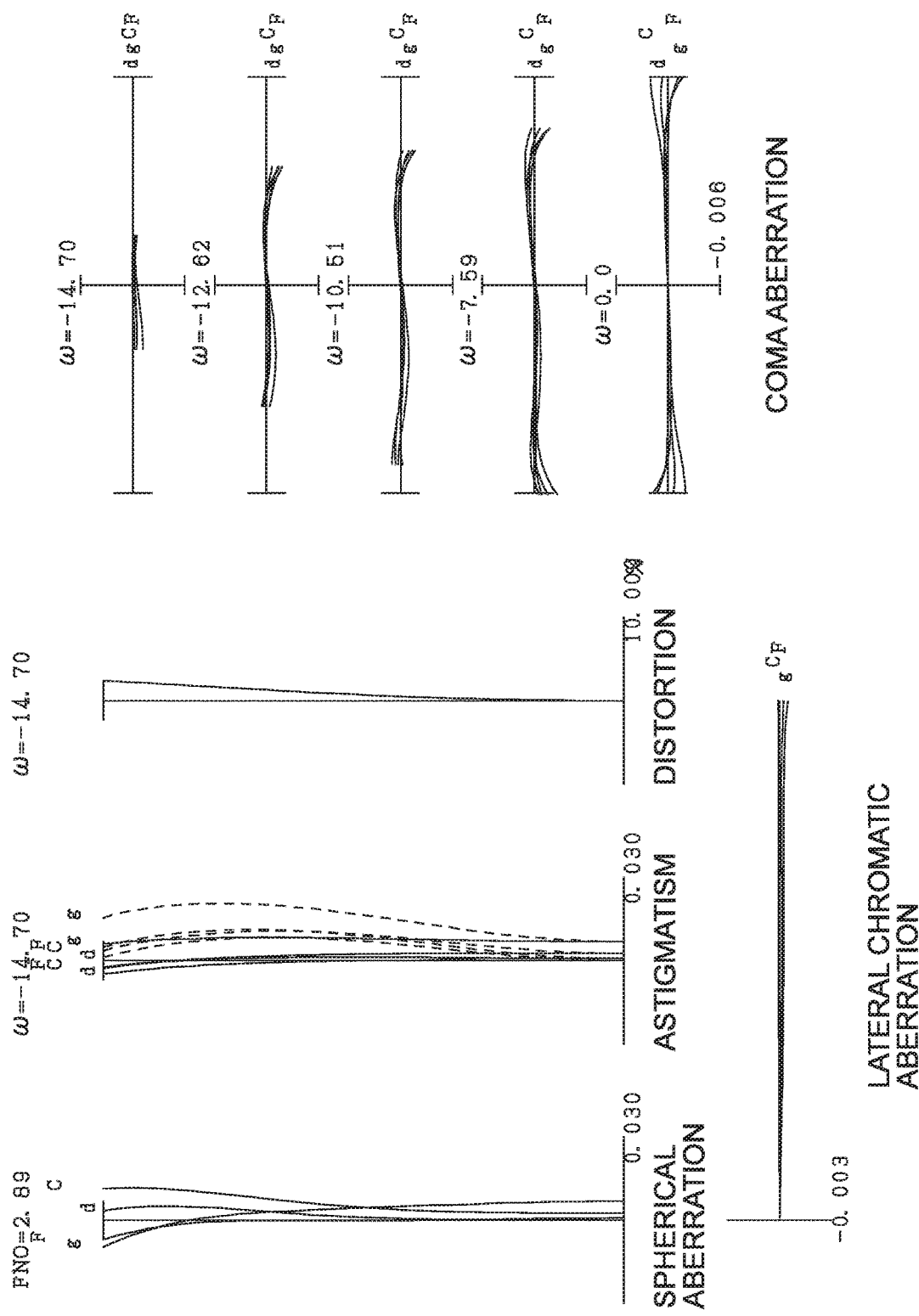

FIGS. 6A, 6B, and 6C are graphs showing various aberrations of the zoom optical system according to Example 3 upon focusing on infinity, respectively in the wide angle end state, the intermediate focal length state, and the telephoto end state.

It can be seen in these aberration graphs that the zoom optical system according to this Example can achieve excellent imaging performance with various aberrations successfully corrected from the wide angle end state to the telephoto end state.

Example 4

Example 4 is described with reference to FIG. 7 and FIGS. 8A-8C and Table 4. FIG. 7 is a diagram illustrating a lens configuration of a zoom lens ZL(4) according to Example 4 of the present embodiment. The zoom lens ZL(4) according to Example 4 includes, in order from an object: a first lens group G1 having positive refractive power; a second lens group G2 having negative refractive power; a third lens group G3 having positive refractive power; a fourth lens group G4 having negative refractive power; and a fifth lens group G5 having positive refractive power, as illustrated in the figure. The third lens group G3 is provided with an aperture stop S on the object side and a flare cut stop FP on the image side. A filter FL and cover glass CG (protective glass for the image surface I) are provided more on the image side and closer to the image surface I than the fifth lens group G5.

The first lens group G1 includes a positive cemented lens including a negative meniscus lens L11 having a convex surface facing the object and a positive meniscus lens L12 having a convex surface facing the object.

The second lens group G2 includes a negative meniscus lens L21 having a convex surface facing the object, a biconcave negative lens L22, and a positive meniscus lens L23 having a convex surface facing the object. The surface of the negative meniscus lens L21 on the image side has an aspherical shape.

The third lens group includes a biconvex positive lens L31, a positive meniscus lens L32 having a convex surface facing the object, a negative meniscus lens L33 having a convex surface facing the object, a negative meniscus lens L34 having a convex surface facing the object, and a biconvex positive lens L35. Both surfaces of the biconvex positive lens L31 have an aspherical shape. The positive meniscus lens L32 and the negative meniscus lens L33 are integrally cemented to form a cemented lens. The negative meniscus lens L34 and the biconvex positive lens L35 are also integrally cemented to form a cemented lens.

The fourth lens group G4 includes a negative meniscus lens L41 having a convex surface facing the object. Both surfaces of the negative meniscus lens L41 have an aspherical shape. The fourth lens group G4 serves as the focusing lens group and moves in the optical axis direction upon focusing from infinity to a short distant object.

The fifth lens group G5 includes a positive meniscus lens L51 having a convex surface facing the object. The surface of the positive lens L51 on the object side has an aspherical shape.

In FIG. 7, the first to the fifth lens groups G1 to G5 each move in the optical axis direction upon zooming from the wide angle end state to the telephoto end state as indicated by arrows among the wide angle end state W in the upper section, the intermediate focal length state M in the middle section, and the telephoto end state T in the lower section.

In the zoom lens ZL(4), the fourth lens group G4 moves toward the image surface upon focusing from a long distant object to a short distant object.

In this zoom lens ZL(4), the telephoto end state (T) can be switched to the macro state (SM) with the second lens group G2 moving toward the object side as indicated by an arrow in FIG. 7. In other words, the second lens group G2 serves as a range changing lens group. Thus, as illustrated in Table [Variable distance data (macro state)], the range in which focusing is possible using the fourth lens group G4 moves toward the short distant side.

In this Example, the third lens group G3 serves as a vibration-proof lens group, with a displacement component in a direction orthogonal to the optical axis, to be in charge of image blur correction on the image surface I (image stabilization, camera shake correction). Image blur due to camera shake or the like may be corrected with a part of the third lens group G3 (the lens L31 closest to the object side, the partial lens groups L32 to L35 more on the image side, or the lens components L34 and L35 closest to the image side in the third lens group G3) moved with a component in a direction orthogonal to the optical axis.

In the zoom lens according to this Example, a half angle of view ωt in the telephoto end state is 14.51777°, and a half angle of view ωw in the wide angle end state is 42.67031°.

Table 4 below lists specification values of the optical system according to Example 4.

TABLE 4

Example 4

[Lens specifications]

| Surface number | R | D | nd | νd |
|---|---|---|---|---|
| Object surface | | | | |
| 1 | 3.2141 | 0.0884 | 1.94595 | 17.98 |
| 2 | 2.3453 | 0.4309 | 1.816 | 46.59 |
| 3 | 17.3395 | D3 (variable) | | |

TABLE 4-continued

| Example 4 | | | | |
|---|---|---|---|---|
| 4* | 16.3087 | 0.0884 | 1.7433 | 49.32 |
| 5* | 0.9531 | 0.6022 | | |
| 6 | −1.8874 | 0.0552 | 1.6968 | 55.52 |
| 7 | 57.6296 | 0.0282 | | |
| 8 | 3.4874 | 0.1699 | 2.00272 | 19.32 |
| 9 | 111.2282 | D9 (variable) | | |
| 10 | ∞ | 0.221 | (stop S) | |
| 11* | 1.3816 | 0.3432 | 1.72903 | 54.04 |
| 12* | −7.376 | 0.0247 | | |
| 13 | 1.4205 | 0.2445 | 1.497 | 81.73 |
| 14 | 5.5815 | 0.0442 | 1.68893 | 31.16 |
| 15 | 0.9507 | 0.4486 | | |
| 16 | 2.2113 | 0.0442 | 1.85026 | 32.35 |
| 17 | 1.1215 | 0.3315 | 1.62299 | 58.12 |
| 18 | −3.5608 | 0 | (stop FP) | |
| 19 | ∞ | D19 (variable) | | |
| 20* | 5.0681 | 0.0552 | 1.73077 | 40.51 |
| 21* | 2.0224 | D21 (variable) | | |
| 22* | 1.7141 | 0.2669 | 1.77377 | 47.18 |
| 23 | 3.557 | D23 (variable) | | |
| 24 | ∞ | 0.0519 | 1.5168 | 63.88 |
| 25 | ∞ | 0.0898 | | |
| 26 | ∞ | 0.0773 | 1.5168 | 63.88 |
| 27 | ∞ | 0.141 | | |
| Image surface I | ∞ | | | |

[Aspherical surface data]

| Surface number | K | A4 | A6 | A8 | A10 |
|---|---|---|---|---|---|
| 5 | 1 | −2.5859E−02 | −5.6063E−02 | 7.7839E−02 | −1.3757E−01 |
| 11 | 1 | −4.0586E−02 | 2.6733E−03 | −1.7504E−03 | 0.0000E+00 |
| 12 | 1 | 2.9516E−02 | 6.5358E−03 | 0.0000E+00 | 0.0000E+00 |
| 20 | 1 | 8.3482E−02 | −7.8078E−02 | 0.0000E+00 | 0.0000E+00 |
| 21 | 1 | 9.8739E−02 | −5.5317E−02 | −5.8759E−02 | 0.0000E+00 |
| 22 | 1 | −6.4620E−03 | 1.4245E−02 | −2.3396E−03 | 0.0000E+00 |

[Overall specifications]

| | Wide Angle End | Intermediate Focal Length | Telephoto End | Macro |
|---|---|---|---|---|
| f | 1 | 1.92696 | 3.35673 | 2.08794 |
| FNO | 1.88928 | 2.82255 | 2.88619 | 2.87291 |
| ω | 42.67031 | 25.26831 | 14.51777 | |
| Y | 0.767 | 0.904 | 0.904 | 0.904 |
| Bf | 0.7481 | 0.7376 | 0.7312 | 0.7312 |
| TL | 7.1599 | 6.9821 | 7.6287 | 7.6287 |

[Variable distance data (upon focusing on infinity)]

| | Wide Angle End | Intermediate Focal Length | Telephoto End |
|---|---|---|---|
| Object distance | ∞ | ∞ | ∞ |
| D3 | 0.0636 | 0.6770 | 1.3697 |
| D9 | 1.9834 | 0.7169 | 0.1626 |
| D19 | 0.0663 | 0.6972 | 0.9499 |
| D21 | 0.8113 | 0.6662 | 0.9281 |
| D23 | 0.4321 | 0.4216 | 0.4152 |

[Variable distance data (upon focusing on close distant object)]

| | Wide Angle End | Intermediate Focal Length | Telephoto End |
|---|---|---|---|
| Object distance | 35 | 35 | 35 |
| Magnification | −0.02723 | −0.05085 | −0.08377 |
| D3 | 0.0636 | 0.6770 | 1.3697 |
| D9 | 1.9834 | 0.7169 | 0.1626 |
| D19 | 0.0680 | 0.7041 | 0.9678 |
| D21 | 0.8096 | 0.6593 | 0.9102 |
| D23 | 0.4321 | 0.4216 | 0.4152 |

TABLE 4-continued

Example 4

[Variable distance data (macro state)]

|  | far end | near end |
|---|---|---|
| Object distance | 6.1525 | 3.1352 |
| Magnification | −0.24709 | −0.3630 |
| D3 | 0.7747 | 0.7747 |
| D9 | 0.7576 | 0.7576 |
| D19 | 0.9499 | 1.4499 |
| D21 | 0.9281 | 0.4281 |
| D23 | 0.4152 | 0.4152 |

[Zoom lens group data]

| Group number | Group starting surface | Group focal length |
|---|---|---|
| G1 | 1 | 5.105 |
| G2 | 4 | −1.16285 |
| G3 | 11 | 1.66345 |
| G4 | 20 | −4.64087 |
| G5 | 22 | 4.02186 |

[Conditional expression corresponding value]

Conditional expression (1) GD3/ft = 0.441
Conditional expression (2) GD2/ft = 0.281
Conditional expression (3) f1/ft = 1.521
Conditional expression (4) TLt/ft = 2.273
Conditional expression (5) (β45w)/(β45t) = 0.982
Conditional expression (6) ωt = 14.51777°
Conditional expression (7) ωw = 42.67031°
Conditional expression (8) (−βSM) = 0.363
Conditional expression (9) βSM/βM = 4.333
Conditional expression (10) |fSM/fF| = 0.251
Conditional expression (11) |fSM|/fw = 1.163
Conditional expression (12) |fF|/fw = 4.641
Conditional expression (13) (β4w)/(β4t) = 0.987
Conditional expression (14) (βFw)/(βFt) = 0.987
Conditional expression (15) (ft/fw)/FNw = 1.777
Conditional expression (16) FNw = 1.889

Figure 8A:
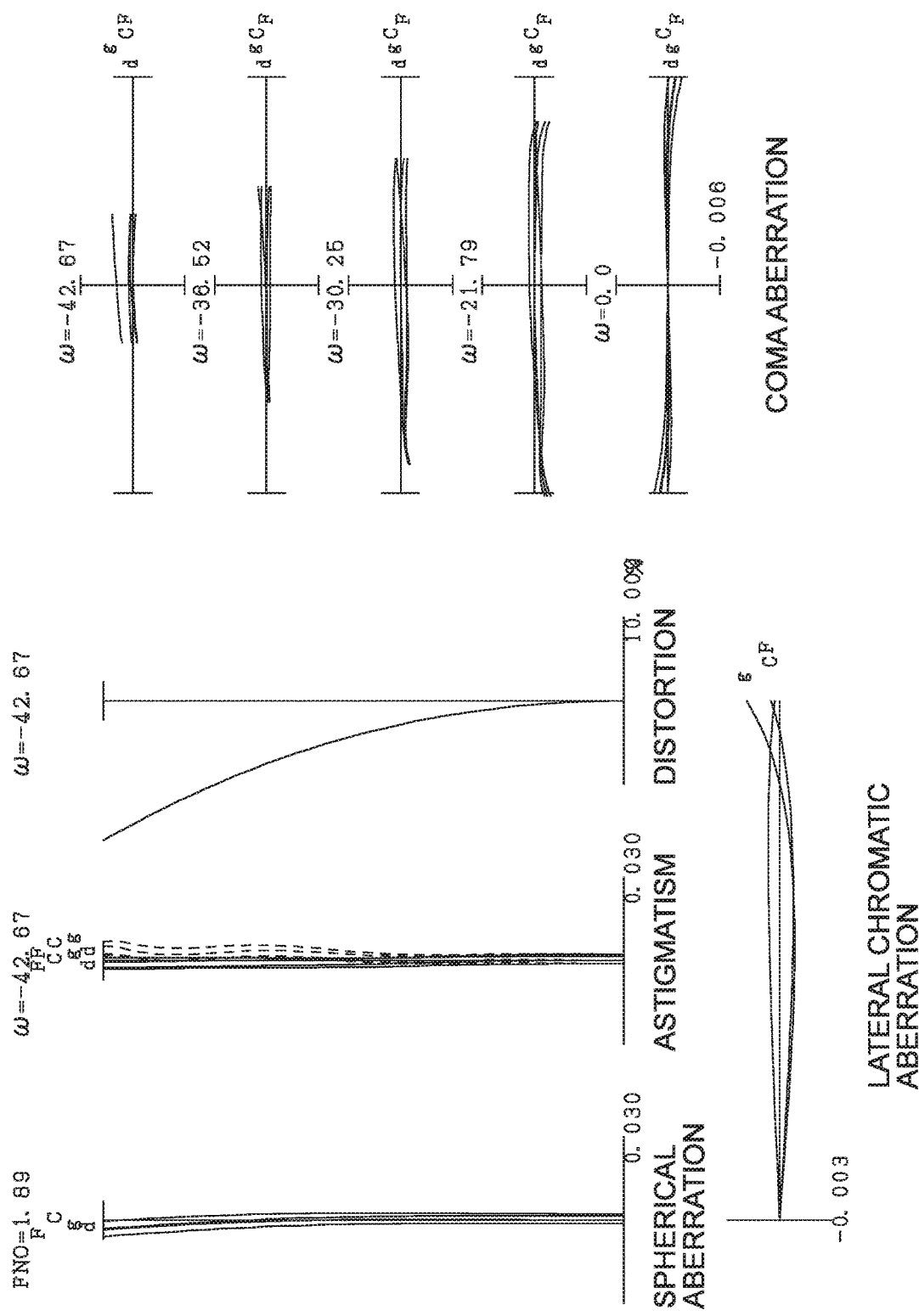
FIGS. 8A, 8B, and 8C are graphs showing various aberrations of the zoom lens according to Example 4 respectively in the wide angle end state, the intermediate focal length state, and the telephoto end state.
Figure 8B:
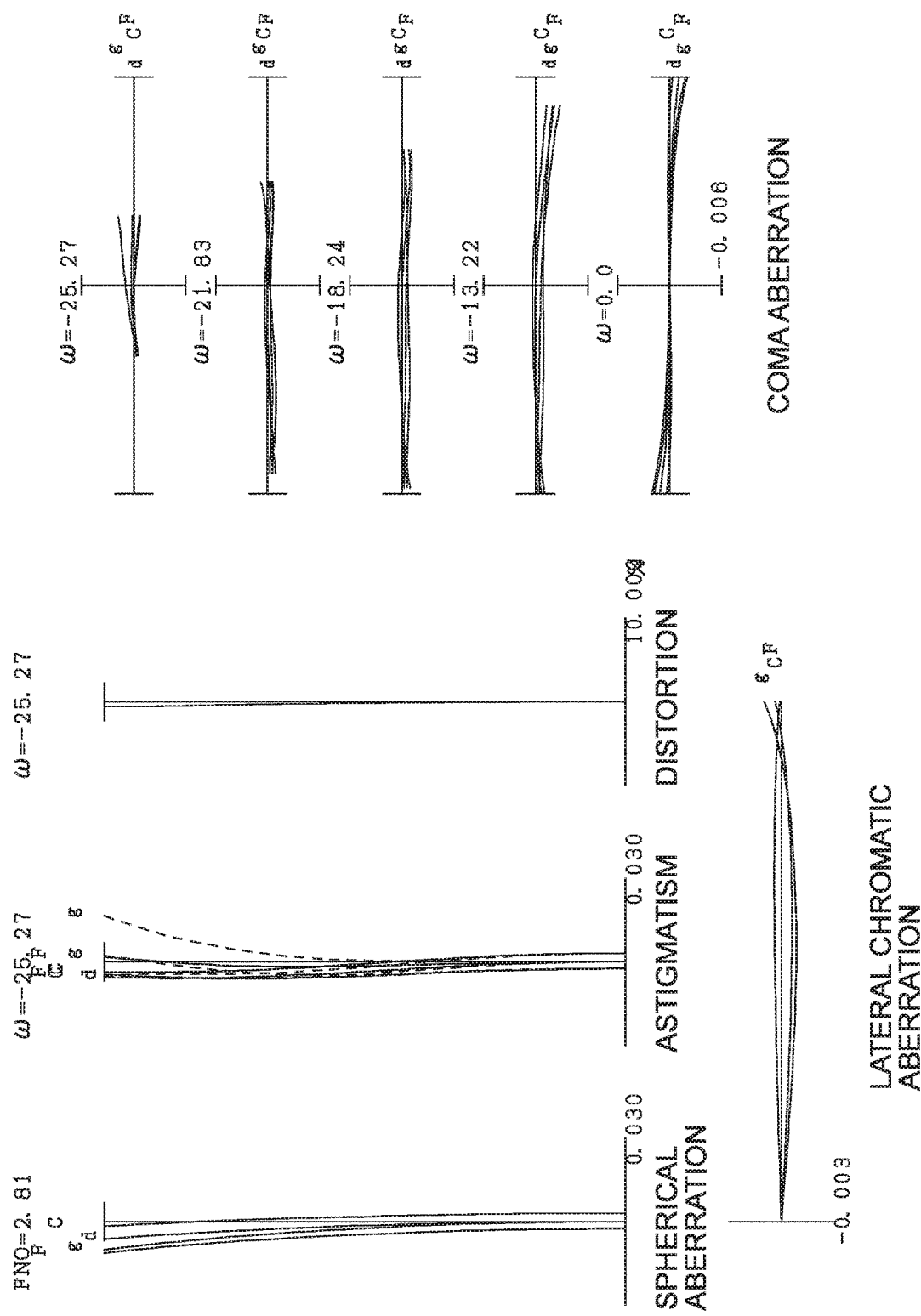
Figure 8C:
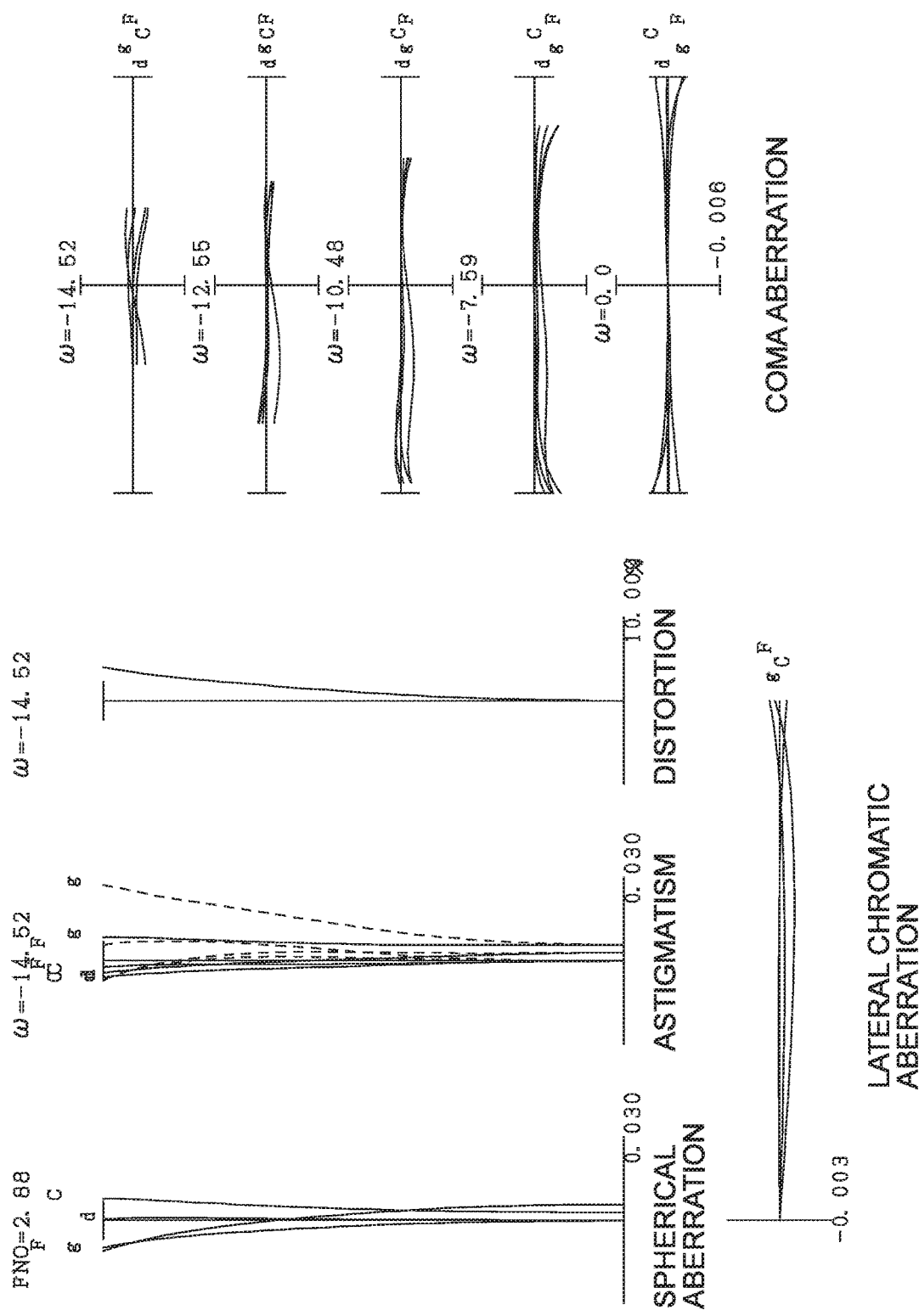

FIGS. 8A, 8B, and 8C are graphs showing various aberrations of the zoom optical system according to Example 4 upon focusing on infinity, respectively in the wide angle end state, the intermediate focal length state, and the telephoto end state.

It can be seen in these aberration graphs that the zoom optical system according to this Example can achieve excellent imaging performance with various aberrations successfully corrected from the wide angle end state to the telephoto end state.

Example 5

Example 5 is described with reference to FIG. 9 and FIGS. 10A-10C and Table 5. FIG. 9 is a diagram illustrating a lens configuration of a zoom lens ZL(5) according to Example 5 of the present embodiment. The zoom lens ZL(5) according to Example 5 includes, in order from an object: a first lens group G1 having positive refractive power; a second lens group G2 having negative refractive power; a third lens group G3 having positive refractive power; a fourth lens group G4 having negative refractive power; and a fifth lens group G5 having positive refractive power, as illustrated in the figure. The third lens group G3 is provided with an aperture stop S on the object side and a flare cut stop FP on the image side. A filter FL and cover glass CG (protective glass for the image surface I) are provided more on the image side and closer to the image surface I than the fifth lens group G5.

The first lens group G1 includes a positive cemented lens including a negative meniscus lens L11 having a convex surface facing the object and a positive meniscus lens L12 having a convex surface facing the object.

The second lens group G2 includes a negative meniscus lens L21 having a convex surface facing the object, a biconcave negative lens L22, and a positive meniscus lens L23 having a convex surface facing the object. The surface of the negative meniscus lens L21 on the image side has an aspherical shape.

The third lens group includes a biconvex positive lens L31, a positive meniscus lens L32 having a convex surface facing the object, a negative meniscus lens L33 having a convex surface facing the object, a biconvex positive lens L34, and a negative meniscus lens L35 having a concave surface facing the object. Both surfaces of the biconvex positive lens L31 have an aspherical shape. The positive meniscus lens L32 and the negative meniscus lens L33 are integrally cemented to form a cemented lens. The biconvex positive lens L34 and the negative meniscus lens L35 are also integrally cemented to form a cemented lens.

The fourth lens group G4 includes a negative meniscus lens L41 having a convex surface facing the object. Both surfaces of the negative meniscus lens L41 have an aspherical shape. The fourth lens group G4 serves as the focusing lens group and moves in the optical axis direction upon focusing from infinity to a short distant object.

The fifth lens group G5 includes a positive meniscus lens L51 having a convex surface facing the object. The surface of the positive lens L51 on the object side has an aspherical shape.

In FIG. 9, the first to the fifth lens groups G1 to G5 each move in the optical axis direction upon zooming from the wide angle end state to the telephoto end state as indicated by arrows among the wide angle end state W in the upper section, the intermediate focal length state M in the middle section, and the telephoto end state T in the lower section.

In the zoom lens ZL(5), the fourth lens group G4 moves toward the image surface upon focusing from a long distant object to a short distant object.

In this zoom lens ZL(5), the telephoto end state (T) can be switched to the macro state (SM) with the second lens group G2 moving toward the object side as indicated by an arrow in FIG. 9. In other words, the second lens group G2 serves as a range changing lens group. Thus, as illustrated in Table [Variable distance data (macro state)], the range in which focusing is possible using the fourth lens group G4 moves toward the short distant side.

In this Example, the third lens group G3 serves as a vibration-proof lens group, with a displacement component in a direction orthogonal to the optical axis, to be in charge of image blur correction on the image surface I (image stabilization, camera shake correction). Image blur due to camera shake or the like may be corrected with a part of the third lens group G3 (the lens L31 closest to the object side, the partial lens groups L32 to L35 more on the image side, or the lens components L34 and L35 closest to the image side in the third lens group G3) moved with a component in a direction orthogonal to the optical axis.

In the zoom lens according to this Example, a half angle of view ωt in the telephoto end state is 14.53401°, and a half angle of view ωw in the wide angle end state is 42.43174°.

Table 5 below lists specification values of the optical system according to Example 5.

TABLE 5

Example 5

[Lens specifications]

| Surface number | R | D | nd | vd |
|---|---|---|---|---|
| Object surface | | | | |
| 1 | 3.2044 | 0.0884 | 1.94595 | 17.98 |
| 2 | 2.3264 | 0.4309 | 1.816 | 46.59 |
| 3 | 17.16 | D3 (variable)) | | |
| 4 | 17.9136 | 0.0884 | 1.7433 | 49.32 |
| 5* | 0.9625 | 0.6022 | | |
| 6 | −2.2918 | 0.0552 | 1.6968 | 55.52 |
| 7 | 7.6677 | 0.0282 | | |
| 8 | 2.6818 | 0.1699 | 2.00272 | 19.32 |
| 9 | 12.6188 | D9 (variable) | | |
| 10 | ∞ | 0.221 | (stop S) | |
| 11* | 1.3036 | 0.3432 | 1.72903 | 54.04 |
| 12* | −11.261 | 0.0247 | | |
| 13 | 1.3167 | 0.2445 | 1.497 | 81.73 |
| 14 | 4.6476 | 0.0442 | 1.68893 | 31.16 |
| 15 | 0.8709 | 0.4486 | | |
| 16 | 2.6037 | 0.3315 | 1.62299 | 58.12 |
| 17 | −1.1215 | 0.0442 | 1.85026 | 32.35 |
| 18 | −2.4302 | 0 | (stop FP) | |
| 19 | ∞ | D19 (variable) | | |
| 20* | 4.4199 | 0.0552 | 1.73077 | 40.51 |
| 21* | 1.9088 | D21 (variable) | | |
| 22* | 1.9819 | 0.2669 | 1.77377 | 47.18 |
| 23 | 5.137 | D23 (variable) | | |
| 24 | ∞ | 0.0519 | 1.5168 | 63.88 |
| 25 | ∞ | 0.0898 | | |
| 26 | ∞ | 0.0773 | 1.5168 | 63.88 |
| 27 | ∞ | 0.141 | | |
| Image surface I | ∞ | | | |

[Aspherical surface data]

| Surface number | K | A4 | A6 | A8 | A10 |
|---|---|---|---|---|---|
| 5 | 1 | −1.7791E−02 | −4.6675E−02 | 7.2601E−02 | −1.1891E−01 |
| 11 | 1 | −3.9866E−02 | −2.1355E−03 | −4.2878E−03 | 0.0000E+00 |
| 12 | 1 | 2.7811E−02 | 4.4447E−03 | 0.0000E+00 | 0.0000E+00 |
| 20 | 1 | 1.1539E−01 | 2.3824E−02 | 0.0000E+00 | 0.0000E+00 |
| 21 | 1 | 1.3406E−01 | 4.4920E−02 | −7.4216E−03 | 0.0000E+00 |
| 22 | 1 | −5.6707E−04 | 8.0669E−03 | 2.0901E−03 | 0.0000E+00 |

TABLE 5-continued

Example 5

[Overall specifications]

|   | Wide Angle End | Intermediate Focal Length | Telephoto End | Macro |
|---|---|---|---|---|
| f | 1 | 1.92695 | 3.35671 | 2.08792 |
| FNO | 1.87916 | 2.80398 | 2.86889 | 2.86628 |
| ω | 42.43174 | 25.18874 | 14.53401 | |
| Y | 0.767 | 0.904 | 0.904 | 0.904 |
| Bf | 0.7850 | 0.7745 | 0.7681 | 0.7681 |
| TL | 7.1381 | 6.9603 | 7.6069 | 7.6069 |

[Variable distance data (upon focusing on infinity)]

|   | Wide Angle End | Intermediate Focal Length | Telephoto End |
|---|---|---|---|
| Object distance | ∞ | ∞ | ∞ |
| D3 | 0.0554 | 0.6688 | 1.3615 |
| D9 | 1.9810 | 0.7145 | 0.1602 |
| D19 | 0.0556 | 0.6865 | 0.9392 |
| D21 | 0.7739 | 0.6288 | 0.8907 |
| D23 | 0.4690 | 0.4585 | 0.4521 |

[Variable distance data (upon focusing on close distant object)]

|   | Wide Angle End | Intermediate Focal Length | Telephoto End |
|---|---|---|---|
| Object distance | 35 | 35 | 35 |
| Magnification | −0.02723 | −0.05085 | −0.08378 |
| D3 | 0.0554 | 0.6688 | 1.3615 |
| D9 | 1.9810 | 0.7145 | 0.1602 |
| D19 | 0.0573 | 0.6934 | 0.9571 |
| D21 | 0.7722 | 0.6220 | 0.8728 |
| D23 | 0.4690 | 0.4585 | 0.4521 |

[Variable distance data (macro state)]

|   | far end | near end |
|---|---|---|
| Object distance | 6.1525 | 3.034 |
| Magnification | −0.2471 | −0.36856 |
| D3 | 0.7665 | 0.7665 |
| D9 | 0.7552 | 0.7552 |
| D19 | 0.9392 | 1.4692 |
| D21 | 0.8907 | 0.3607 |
| D23 | 0.4521 | 0.4521 |

[Zoom lens group data]

| Group number | Group starting surface | Group focal length |
|---|---|---|
| G1 | 1 | 5.10497 |
| G2 | 4 | −1.16284 |
| G3 | 11 | 1.66344 |
| G4 | 20 | −4.64084 |
| G5 | 22 | 4.02184 |

[Conditional expression corresponding value]

Conditional expression (1) GD3/ft = 0.441
Conditional expression (2) GD2/ft = 0.281
Conditional expression (3) f1/ft = 1.521
Conditional expression (4) TLt/ft = 2.266
Conditional expression (5) (β45w)/(β45t) = 0.982
Conditional expression (6) ωt = 14.53401°
Conditional expression (7) ωw = 42.43174°
Conditional expression (8) (−βSM) = 0.369
Conditional expression (9) βSM/βM = 4.399
Conditional expression (10) |fSM/fF| = 0.251
Conditional expression (11) |fSM|/fw = 1.163
Conditional expression (12) |fF|/fw = 4.641

TABLE 5-continued

Example 5

Conditional expression (13) (β4w)/(β4t) = 0.987
Conditional expression (14) (βFw)/(βFt) = 0.987
Conditional expression (15) (ft/fw)/FNw = 1.786
Conditional expression (16) FNw = 1.879

FIGS. 10A, 10B, and 10C are graphs showing various aberrations of the zoom optical system according to Example 5 upon focusing on infinity, respectively in the wide angle end state, the intermediate focal length state, and the telephoto end state.

It can be seen in these aberration graphs that the zoom optical system according to this Example can achieve excellent imaging performance with various aberrations successfully corrected from the wide angle end state to the telephoto end state.

Example 6

Example 6 is described with reference to FIG. 11 and FIGS. 12A-12C and Table 6. FIG. 11 is a diagram illustrating a lens configuration of a zoom lens ZL(6) according to Example 6 of the present embodiment. The zoom lens ZL(6) according to Example 6 includes, in order from an object: a first lens group G1 having positive refractive power; a second lens group G2 having negative refractive power; a third lens group G3 having positive refractive power; a fourth lens group G4 having negative refractive power; a fifth lens group G5 having positive refractive power; and a sixth lens group G6 having negative refractive power, as illustrated in the figure. The third lens group G3 is provided with an aperture stop S on the object side and a flare cut stop FP on the image side. The filter FL and cover glass CG (protective glass for the image surface I) are provided more on the image side and closer to the image surface I than the sixth lens group G6.

The first lens group G1 includes a positive cemented lens including a negative meniscus lens L11 having a convex surface facing the object and a positive meniscus lens L12 having a convex surface facing the object.

The second lens group G2 includes a negative meniscus lens L21 having a convex surface facing the object, a biconcave negative lens L22, and a positive meniscus lens L23 having a convex surface facing the object. Both surfaces of the negative meniscus lens L21 have an aspherical shape.

The third lens group includes a biconvex positive lens L31, a negative meniscus lens L32 having a convex surface facing the object, a negative meniscus lens L33 having a convex surface facing the object, and a biconvex positive lens L34. Both surfaces of the biconvex positive lens L31 are aspherical surfaces, and the negative meniscus lens L33 and the biconvex positive lens L34 are integrally cemented to form a cemented lens.

The fourth lens group G4 includes a negative meniscus lens L41 having a convex surface facing the object. The surface of the negative meniscus lens L41 on the image side has an aspherical shape. The fourth lens group G4 serves as the focusing lens group and moves in the optical axis direction upon focusing from infinity to a short distant object.

The fifth lens group G5 includes a biconvex positive lens L51. The surface of the positive lens L51 on the object side has an aspherical shape.

The sixth lens group G6 includes a negative meniscus lens L61 having a convex surface facing the object.

In FIG. 11, the first to the fifth lens groups G1 to G5 each move in the optical axis direction upon zooming from the wide angle end state to the telephoto end state as indicated by arrows among the wide angle end state W in the upper section, the intermediate focal length state M in the middle section, and the telephoto end state T in the lower section. In this process, the sixth lens group G6 is fixed and held.

In the zoom lens ZL(6), the fourth lens group G4 moves toward the image surface upon focusing from a long distant object to a short distant object.

In this zoom lens ZL(6), the telephoto end state (T) can be switched to the macro state (SM) with the second lens group G2 moving toward the object side as indicated by an arrow in FIG. 11. In other words, the second lens group G2 serves as a range changing lens group. Thus, as illustrated in Table [Variable distance data (macro state)], the range in which focusing is possible using the fourth lens group G4 moves toward the short distant side.

In this Example, the third lens group G3 serves as a vibration-proof lens group, with a displacement component in a direction orthogonal to the optical axis, to be in charge of image blur correction on the image surface I (image stabilization, camera shake correction). Image blur due to camera shake or the like may be corrected with a part of the third lens group G3 (the lens L31 closest to the object side, the partial lens groups L32 to L34 more on the image side, or the lens components L33 and L34 closest to the image side in the third lens group G3) moved with a component in a direction orthogonal to the optical axis.

In the zoom lens according to this Example, a half angle of view ωt in the telephoto end state is 14.53992°, and a half angle of view ωw in the wide angle end state is 42.67674°.

Table 6 below lists specification values of the optical system according to Example 6.

TABLE 6

Example 6

[Lens specifications]

| Surface number | R | D | nd | vd |
|---|---|---|---|---|
| Object surface | | | | |
| 1 | 3.2901 | 0.0882 | 1.94595 | 17.98 |
| 2 | 2.6402 | 0.3916 | 1.72916 | 54.61 |
| 3 | 21.1939 | D3 (variable) | | |
| 4* | 15.4456 | 0.0882 | 1.77377 | 47.18 |

TABLE 6-continued

Example 6

| | | | | |
|---|---|---|---|---|
| 5* | 0.9837 | 0.5681 | | |
| 6 | −2.2701 | 0.0552 | 1.6968 | 55.52 |
| 7 | 7.0401 | 0.0165 | | |
| 8 | 2.6497 | 0.182 | 2.00272 | 19.32 |
| 9 | 14.405 | D9 (variable) | | |
| 10 | ∞ | 0.1103 | (stop S) | |
| 11* | 1.5449 | 0.342 | 1.7433 | 49.32 |
| 12* | −28.5524 | 0.2482 | | |
| 13 | 1.6489 | 0.0662 | 1.78472 | 25.64 |
| 14 | 1.2161 | 0.1103 | | |
| 15 | 2.5754 | 0.0662 | 1.84666 | 23.8 |
| 16 | 1.1765 | 0.4081 | 1.59319 | 67.9 |
| 17 | −2.1185 | 0.1324 | | |
| 18 | ∞ | D18 (variable) | (stop FP) | |
| 19 | 11.1739 | 0.0552 | 1.58313 | 59.44 |
| 20* | 1.4562 | D20 (variable) | | |
| 21* | 4.519 | 0.342 | 1.7725 | 49.49 |
| 22 | −4.4457 | D22 (variable) | | |
| 23 | 3.356 | 0.0882 | 1.62299 | 58.12 |
| 24 | 2.857 | D24 (fixed) | | |
| 25 | ∞ | 0.0518 | 1.5168 | 63.88 |
| 26 | ∞ | 0.1448 | | |
| 27 | ∞ | 0.0772 | 1.5168 | 63.88 |
| 28 | ∞ | 0.1412 | | |
| Image surface I | ∞ | | | |

[Aspherical surface data]

| Surface number | K | A4 | A6 | A8 | A10 |
|---|---|---|---|---|---|
| 4 | 1 | 3.9922E−03 | −4.4140E−03 | 5.9089E−04 | 0.0000E+00 |
| 5 | 1 | −5.8580E−03 | −1.7876E−02 | 4.1541E−02 | −7.9696E−02 |
| 11 | 1 | −1.4027E−02 | 8.6442E−03 | 0.0000E+00 | 0.0000E+00 |
| 12 | 1 | 5.7779E−02 | 7.7172E−03 | 0.0000E+00 | 0.0000E+00 |
| 20 | 1 | 7.6285E−02 | −3.2205E−02 | −2.3999E−02 | 0.0000E+00 |
| 21 | 1 | 2.5897E−02 | 6.1646E−04 | 0.0000E+00 | 0.0000E+00 |

[Overall specifications]

| | Wide Angle End | Intermediate Focal Length | Telephoto End | Macro |
|---|---|---|---|---|
| f | 1 | 1.89724 | 3.35295 | 2.24281 |
| FNO | 1.84511 | 2.55007 | 2.81632 | 2.81477 |
| ω | 42.67674 | 25.80641 | 14.53992 | |
| Y | 0.767 | 0.904 | 0.904 | 0.904 |
| Bf | 0.6245 | 0.4778 | 0.5543 | 0.5543 |
| TL | 7.0167 | 6.7970 | 7.7481 | 7.7481 |

[Variable distance data (upon focusing on infinity)]

| | Wide Angle End | Intermediate Focal Length | Telephoto End |
|---|---|---|---|
| Object distance | ∞ | ∞ | ∞ |
| D3 | 0.0459 | 0.5102 | 1.5361 |
| D9 | 1.9704 | 0.8173 | 0.2755 |
| D18 | 0.2358 | 0.7660 | 1.0747 |
| D20 | 0.5277 | 0.7500 | 0.7653 |
| D22 | 0.2535 | 0.1168 | 0.1833 |
| D24 | 0.3329 | 0.3329 | 0.3329 |

[Variable distance data (upon focusing on close distant object)]

| | Wide Angle End | Intermediate Focal Length | Telephoto End |
|---|---|---|---|
| Object distance | 35 | 35 | 35 |
| Magnification | −0.02735 | −0.05104 | −0.08473 |
| D3 | 0.0459 | 0.5102 | 1.5361 |
| D9 | 1.9704 | 0.8173 | 0.2755 |
| D18 | 0.2651 | 0.8631 | 1.3684 |
| D20 | 0.4984 | 0.6529 | 0.4716 |

TABLE 6-continued

| Example 6 | | | |
|---|---|---|---|
| D22 | 0.2535 | 0.1168 | 0.1833 |
| D24 | 0.3329 | 0.3329 | 0.3329 |

[Variable distance data (macro state)]

| | far end | near end |
|---|---|---|
| Object distance | 6.2367 | 3.0633 |
| Magnification | −0.25391 | −0.37824 |
| D3 | 1.0341 | 1.0341 |
| D9 | 0.7775 | 0.7775 |
| D18 | 1.0747 | 1.3919 |
| D20 | 0.7653 | 0.4482 |
| D22 | 0.1833 | 0.1833 |
| D24 | 0.3329 | 0.3329 |

[Zoom lens group data]

| Group number | Group starting surface | Group focal length |
|---|---|---|
| G1 | 1 | 5.74295 |
| G2 | 4 | −1.16005 |
| G3 | 11 | 1.57516 |
| G4 | 19 | −2.87736 |
| G5 | 21 | 2.95002 |
| G6 | 23 | −33.09216 |

[Conditional expression corresponding value]

Conditional expression (1) GD3/ft = 0.410
Conditional expression (2) GD2/ft = 0.271
Conditional expression (3) f1/ft = 1.713
Conditional expression (4) TLt/ft = 2.311
Conditional expression (5) (β45w)/(β45t) = 0.952
Conditional expression (6) ωt = 14.53992°
Conditional expression (7) ωw = 42.67674°
Conditional expression (8) (−βSM) = 0.378
Conditional expression (9) βSM/βM = 4.464
Conditional expression (10) |fSM/fF| = 0.403
Conditional expression (11) |fSM|/fw = 1.160
Conditional expression (12) |fF|/fw = 2.877
Conditional expression (13) (β4w)/(β4t) = 0.988
Conditional expression (14) (βFw)/(βFt) = 0.988
Conditional expression (15) (ft/fw)/FNw = 1.817
Conditional expression (16) FNw = 1.845

Figure 12A:
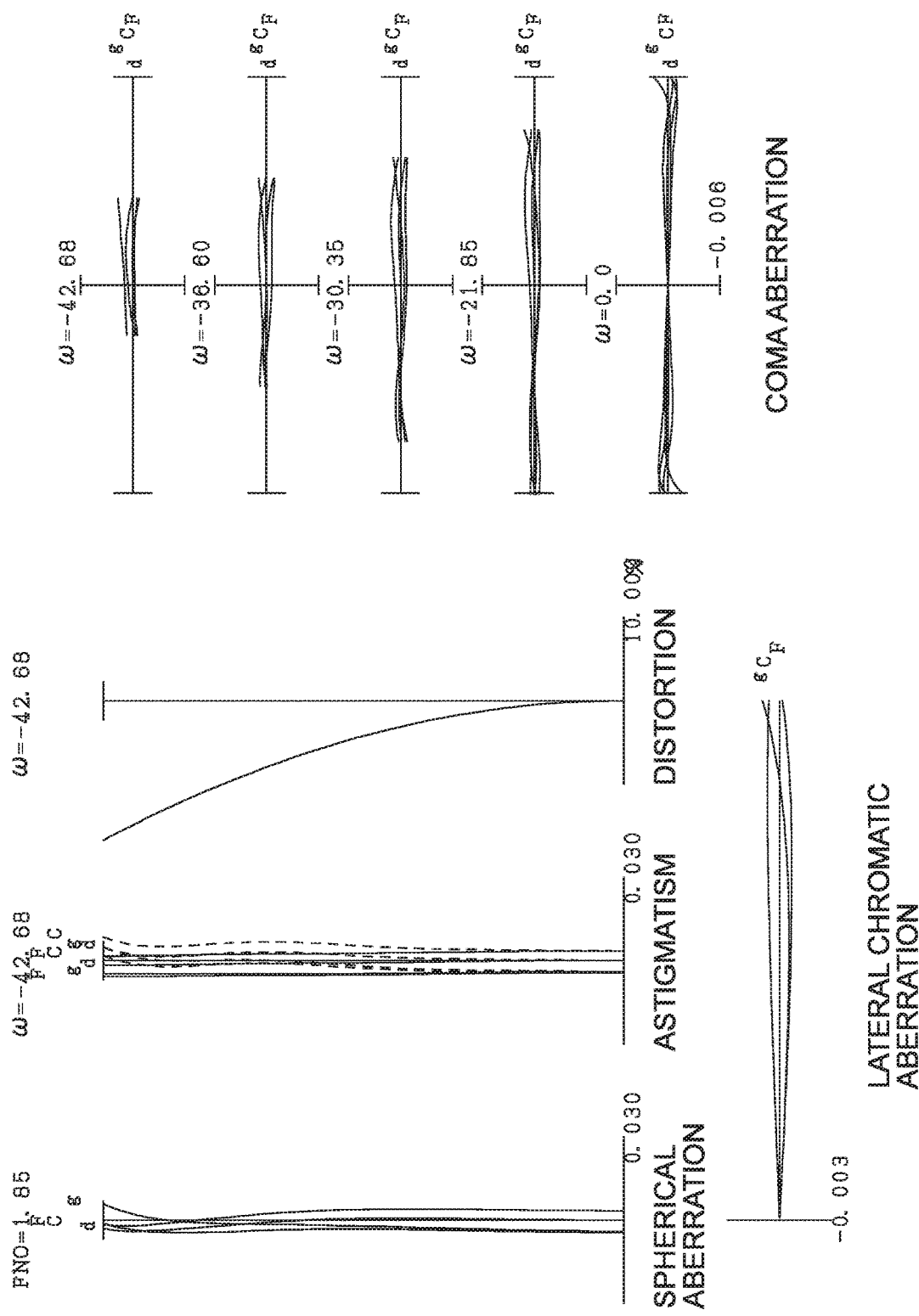

FIGS. 12A, 12B, and 12C are graphs showing various aberrations of the zoom optical system according to Example 6 upon focusing on infinity, respectively in the wide angle end state, the intermediate focal length state, and the telephoto end state.

It can be seen in these aberration graphs that the zoom optical system according to this Example can achieve excellent imaging performance with various aberrations successfully corrected from the wide angle end state to the telephoto end state.

Example 7

Example 7 is described with reference to FIG. 13 and FIGS. 14A-14C and Table 7. FIG. 13 is a diagram illustrating a lens configuration of a zoom lens ZL(7) according to Example 7 of the present embodiment. The zoom lens ZL(7) according to Example 7 includes, in order from an object: a first lens group G1 having positive refractive power; a second lens group G2 having negative refractive power; a third lens group G3 having positive refractive power; a fourth lens group G4 having positive refractive power; and a fifth lens group G5 having negative refractive power, as illustrated in the figure. The third lens group G3 is provided with an aperture stop S on the object side and a flare cut stop FP on the image side. A filter FL and cover glass CG (protective glass for the image surface I) are provided more on the image side and closer to the image surface I than the fifth lens group G5.

The first lens group G1 includes a positive cemented lens including a negative meniscus lens L11 having a convex surface facing the object and a positive meniscus lens L12 having a convex surface facing the object.

The second lens group G2 includes a negative meniscus lens L21 having a convex surface facing the object, a biconcave negative lens L22, and a positive meniscus lens L23 having a convex surface facing the object. Both surfaces of the negative meniscus lens L21 have an aspherical shape.

The third lens group includes a biconvex positive lens L31, a biconvex positive lens L32, a biconcave negative lens L33, and a biconvex positive lens L34. The biconvex positive lens L32 and the biconcave negative lens L33 are integrally cemented to form a cemented lens. Both surfaces of the biconvex positive lens L31, and the surface of the biconvex positive lens L34 on the image side have an aspherical shape.

The fourth lens group G4 includes a biconvex positive lens L41. Both surfaces of the positive lens L41 have an aspherical shape. The fourth lens group G4 serves as the focusing lens group and moves in the optical axis direction upon focusing from infinity to a short distant object.

The fifth lens group G5 includes a biconcave negative lens L51. The surface of the negative lens L51 on the object side has an aspherical shape.

In FIG. 13, the first to the fifth lens groups G1 to G5 each move in the optical axis direction upon zooming from the wide angle end state to the telephoto end state as indicated by arrows among the wide angle end state W in the upper section, the intermediate focal length state M in the middle section, and the telephoto end state T in the lower section.

In the zoom lens ZL(7), the fourth lens group G4 moves toward the image surface upon focusing from a long distant object to a short distant object.

In this zoom lens ZL(7), the telephoto end state (T) can be switched to the macro state (SM) with the second lens group G2 moving toward the object side as indicated by an arrow in FIG. 13. In other words, the second lens group G2 serves as a range changing lens group. Thus, as illustrated in Table [Variable distance data (macro state)], the range in which focusing is possible using the fourth lens group G4 moves toward the short distant side.

In this Example, the third lens group G3 serves as a vibration-proof lens group, with a displacement component in a direction orthogonal to the optical axis, to be in charge of image blur correction on the image surface I (image stabilization, camera shake correction). Image blur due to camera shake or the like may be corrected with a part of the third lens group G3 (the lens L31 closest to the object side, the partial lens groups L32 to L34 more on the image side, or the lens components L33 and L34 closest to the image side in the third lens group G3) moved with a component in a direction orthogonal to the optical axis.

In the zoom lens according to this Example, a half angle of view ωt in the telephoto end state is 12.37580°, and a half angle of view ωw in the wide angle end state is 43.30179°.

Table 7 below lists specification values of the optical system according to Example 7.

TABLE 7

Example 7

[Lens specifications]

| Surface number | R | D | nd | vd |
|---|---|---|---|---|
| Object surface | | | | |
| 1 | 3.6173 | 0.1105 | 1.94595 | 17.98 |
| 2 | 2.7628 | 0.4585 | 1.755 | 52.34 |
| 3 | 54.6358 | D3 (variable) | | |
| 4* | 38.9382 | 0.0994 | 1.85135 | 40.1 |
| 5* | 1.1252 | 0.5137 | | |
| 6 | −4.2898 | 0.0773 | 1.72916 | 54.61 |
| 7 | 3.8889 | 0.011 | | |
| 8 | 2.1649 | 0.2209 | 1.94595 | 17.98 |
| 9 | 9.5995 | D9 (variable) | | |
| 10 | ∞ | 0.0552 | (stop S) | |
| 11* | 1.1867 | 0.3701 | 1.7433 | 49.32 |
| 12* | −7.3091 | 0.1105 | | |
| 13 | 2.7618 | 0.2486 | 1.48749 | 70.31 |
| 14 | −2.6936 | 0.0552 | 1.80518 | 25.45 |
| 15 | 1.2031 | 0.1657 | | |
| 16 | 3.9463 | 0.2541 | 1.62263 | 58.19 |
| 17* | −5.2112 | 0 | | |
| 18 | ∞ | D18 (variable) | (stop FP) | |
| 19* | 2.0922 | 0.3038 | 1.6935 | 53.22 |
| 20* | −5.2062 | D20 (variable) | | |
| 21* | −3.9412 | 0.0773 | 1.6968 | 55.48 |
| 22 | 5.1429 | D22 (variable) | | |
| 23 | ∞ | 0.0519 | 1.5168 | 63.88 |
| 24 | ∞ | 0.05 | | |
| 25 | ∞ | 0.0773 | 1.5168 | 63.88 |
| 26 | ∞ | 0.1 | | |
| Image surface I | ∞ | | | |

[Aspherical surface data]

| Surface number | K | A4 | A6 | A8 | A10 |
|---|---|---|---|---|---|
| 4 | 1 | 1.9047E−03 | −3.5909E−03 | 3.1539E−03 | −1.5240E−03 |
| 5 | −3.5417 | 3.9833E−01 | −3.1316E−01 | 3.5521E−01 | −1.4261E−01 |
| 11 | 1 | −1.3066E−02 | 6.1910E−03 | 0.0000E+00 | 0.0000E+00 |
| 12 | 1 | 9.3778E−02 | −3.0825E−02 | 0.0000E+00 | 0.0000E+00 |
| 17 | 1 | −3.0383E−02 | 5.5197E−02 | 5.1720E−02 | 0.0000E+00 |
| 19 | 1 | −5.6503E−02 | −1.3308E−01 | 1.4892E−01 | 0.0000E+00 |
| 20 | 1 | 2.2515E−02 | −2.5850E−01 | 1.9342E−01 | 0.0000E+00 |
| 21 | 1 | 5.8433E−02 | −1.4607E−01 | 4.5339E−02 | 0.0000E+00 |

TABLE 7-continued

Example 7

[Overall specifications]

|  | Wide Angle End | Intermediate Focal Length | Telephoto End | Macro |
|---|---|---|---|---|
| f | 1 | 1.98851 | 3.94294 | 2.24281 |
| FNO | 1.86671 | 2.56554 | 2.85296 | 2.85417 |
| ω | 43.30179 | 24.56857 | 12.3758 | |
| Y | 0.767 | 0.904 | 0.904 | 0.904 |
| Bf | 0.3350 | 0.7684 | 1.3951 | 1.3951 |
| TL | 6.3713 | 6.5362 | 7.7513 | 7.7513 |

[Variable distance data (upon focusing on infinity)]

|  | Wide Angle End | Intermediate Focal Length | Telephoto End |
|---|---|---|---|
| Object distance | ∞ | ∞ | ∞ |
| D3 | 0.0552 | 0.7859 | 1.7626 |
| D9 | 1.8740 | 0.7295 | 0.2210 |
| D18 | 0.4644 | 0.6498 | 1.0475 |
| D20 | 0.5109 | 0.4708 | 0.1933 |
| D22 | 0.2363 | 0.6697 | 1.2964 |

[Variable distance data (upon focusing on close distant object)]

|  | Wide Angle End | Intermediate Focal Length | Telephoto End |
|---|---|---|---|
| Object distance | 35 | 35 | 35 |
| Magnification | −0.02668 | −0.05087 | −0.0915 |
| D3 | 0.0552 | 0.7859 | 1.7626 |
| D9 | 1.8740 | 0.7295 | 0.2210 |
| D18 | 0.4644 | 0.6498 | 1.0475 |
| D20 | 0.5986 | 0.6394 | 0.5354 |
| D22 | 0.1486 | 0.5011 | 0.9543 |

[Variable distance data (macro state)]

|  | far end | near end |
|---|---|---|
| Object distance | 5.2579 | 3.0633 |
| Magnification | −0.26856 | −0.38137 |
| D3 | 0.8788 | 0.8788 |
| D9 | 1.1047 | 1.1047 |
| D18 | 1.0475 | 1.0475 |
| D20 | 0.1933 | 0.4574 |
| D22 | 1.2964 | 1.0324 |

[Zoom lens group data]

| Group number | Group starting surface | Group focal length |
|---|---|---|
| G1 | 1 | 5.54001 |
| G2 | 4 | −1.3232 |
| G3 | 11 | 1.96534 |
| G4 | 19 | 2.18937 |
| G5 | 21 | −3.19103 |

[Conditional expression corresponding value]

Conditional expression (1) GD3/ft = 0.305
Conditional expression (2) GD2/ft = 0.234
Conditional expression (3) f1/ft = 1.405
Conditional expression (4) TLt/ft = 1.966
Conditional expression (5) (β45w)/(β45t) = 1.067
Conditional expression (6) ωt = 12.37580°
Conditional expression (7) ωw = 43.30179°
Conditional expression (8) (−βSM) = 0.381
Conditional expression (9) βSM/βM = 4.168
Conditional expression (10) |fSM/fF| = 0.603
Conditional expression (11) |fSM|/fw = 1.323
Conditional expression (12) |fF|/fw = 2.189

TABLE 7-continued

Example 7

Conditional expression (13) (β4w)/(β4t) = 1.374
Conditional expression (14) (βFw)/(βFt) = 1.374
Conditional expression (15) (ft/fw)/FNw = 2.112
Conditional expression (16) FNw = 1.867

Figure 14B:
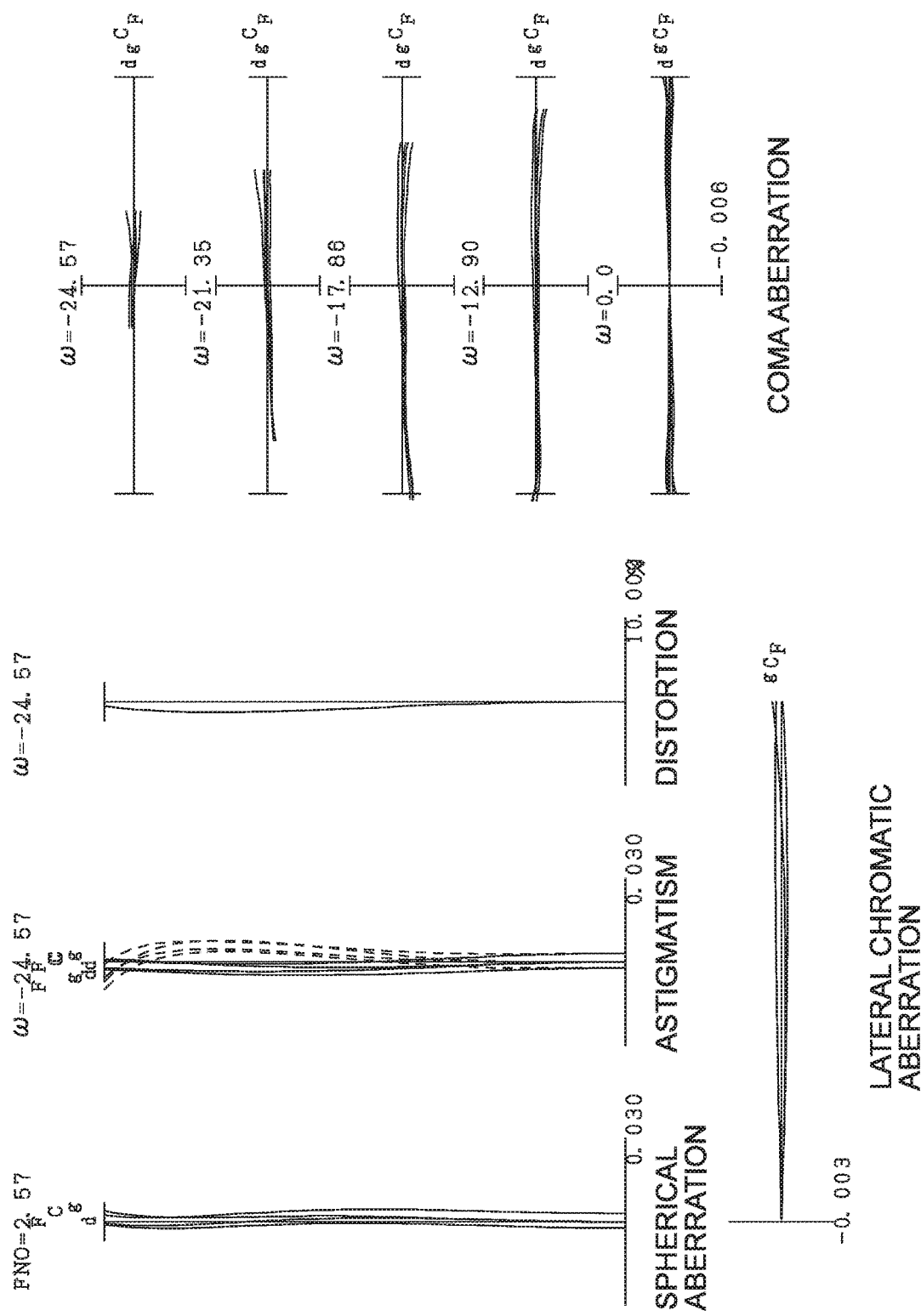
Figure 14C:
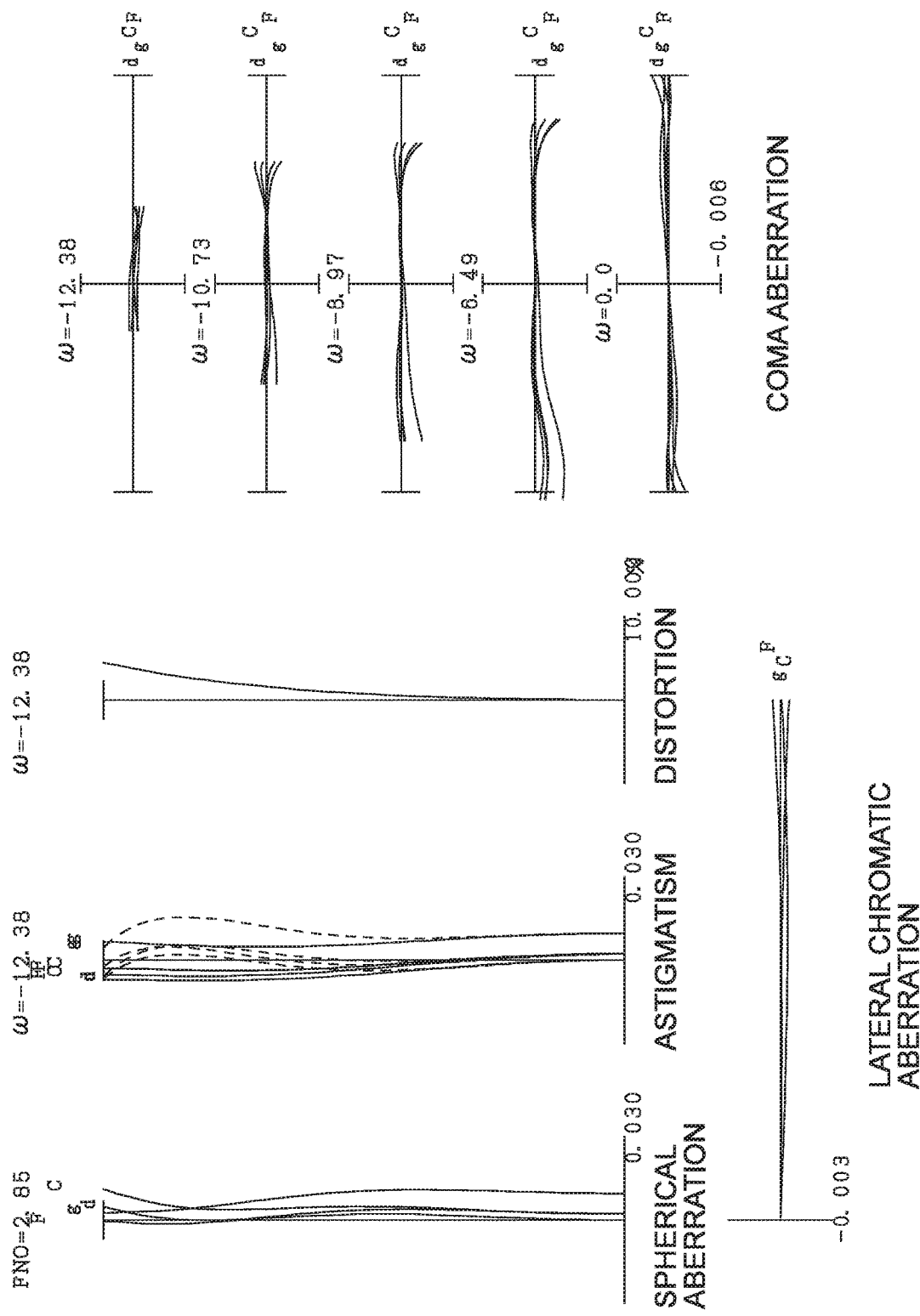

FIGS. 14A, 14B, and 14C are graphs showing various aberrations of the zoom optical system according to Example 7 upon focusing on infinity, respectively in the wide angle end state, the intermediate focal length state, and the telephoto end state.

It can be seen in these aberration graphs that the zoom optical system according to this Example can achieve excellent imaging performance with various aberrations successfully corrected from the wide angle end state to the telephoto end state.

Examples described above are merely examples of the invention according to the present application. The invention according to the present application is not limited to these examples.

The following configurations can be appropriately employed as long as the optical performance of the zoom lens according to the present embodiment is not compromised.

The zoom lens according to Examples of the present embodiment has the five or the six lens groups. However, this should not be construed in a limiting sense, and a zoom lens with other lens group configurations (for example, a configuration with seven lens groups or the like) may be employed. More specifically, the zoom lens according to the present embodiment may be further provided with a lens or a lens group closest to an object or further provided with a lens or a lens group closest to the image surface. The lens group is a portion including at least one lens separated from another lens with a di stance varying upon zooming.

A focusing lens group may be provided for focusing from an infinite distant object to a short distant object, with a single or a plurality of lens groups or a partial lens group moved in the optical axis direction. The focusing lens group can be applied to auto focus, and is suitable for motor driving for auto focus (using supersonic wave motors, etc.). At least a part of the fourth lens group is especially preferably used as the focusing lens group.

The lens groups may be entirely or partially moved with a displacement component in a direction orthogonal to the optical axis, or may be moved and rotated (swing) within an in-plane direction including the optical axis, to serve as a vibration-proof lens group for correcting image blur due to camera shake or the like. At least a part of the third lens group is especially preferably used as the vibration-proof lens group.

The lens surface may be formed to have a spherical surface or a planer surface, or may be formed to have an aspherical shape. The lens surface having a spherical surface or a planer surface features easy lens processing and assembly adjustment, which leads to the processing and assembly adjustment less likely to involve an error compromising the optical performance, and thus is preferable. Furthermore, there is an advantage that a rendering performance is not largely compromised even when the image surface is displaced.

The lens surface having an aspherical shape may be achieved with any one of an aspherical shape formed by grinding, a glass-molded aspherical shape obtained by molding a glass piece into an aspherical shape, and a composite type aspherical surface obtained by providing an aspherical shape resin piece on a glass surface. A lens surface may be a diffractive surface. The lens may be a gradient index lens (GRIN lens) or a plastic lens.

The aperture stop is preferably disposed in the neighborhood of or within the third lens group. Alternatively, a lens frame may serve as the aperture stop so that the member serving as the aperture stop needs not to be provided.

The lens surfaces may be provided with an antireflection film featuring high transmittance over a wide range of wavelengths to achieve an excellent optical performance with reduced flare and ghosting and increased contrast.

The zoom lens (zoom optical system) according to the present embodiment has a zooming rate in a range of approximately 2 to 10.

EXPLANATION OF NUMERALS AND CHARACTERS

| G1 | first lens group | G2 | second lens group |
|----|------------------|----|-------------------|
| G3 | third lens group | G4 | fourth lens group |
| G5 | fifth lens group | I  | image surface     |
| S  | aperture stop    | FP | flare cut stop    |

The invention claimed is:

1. A zoom lens comprising, in order from an object: a first lens group having positive refractive power; a second lens group having negative refractive power; a third lens group having positive refractive power; a fourth lens group having negative refractive power; and a fifth lens group having positive refractive power, wherein
the first to the fifth lens groups each move in an optical axis direction upon zooming from a wide angle end state to a telephoto end state,
at least a part of the fourth lens group is configured to serve as a focusing lens group to move in the optical axis direction upon focusing,
the first lens group consists of two lenses cemented with each other, and
following conditional expressions are satisfied:

$$0.85<(\beta 4w)/(\beta 4t)<1.20$$

$$11.0°<\omega t<22.0°$$

$$1.000<(ft/fw)/FNw<2.350$$

where,
β4w denotes a magnification of the fourth lens group in the wide angle end state,
β4t denotes a magnification of the fourth lens group in the telephoto end state,
ωt denotes a half angle of view in the telephoto end state,
fw denotes a focal length of the zoom lens in the wide angle end state,
ft denotes a focal length of the zoom lens in the telephoto end state, and
FNw denotes the maximum aperture in the wide angle end state.

2. The zoom lens according to claim 1, wherein the fifth lens group consists of a single lens.

3. The zoom lens according to claim 1, wherein a following conditional expression is satisfied $$0.80<(\beta 45w)/(\beta 45t)<1.30$$

where,

β45w denotes a combined magnification of the fourth lens group and the fifth lens group in the wide angle end state, and β45t denotes a combined magnification of the fourth lens group and the fifth lens group in the telephoto end state.

4. The zoom lens according to claim 1, wherein a following conditional expression is satisfied $$0.85<(\beta Fw)/(\beta Ft)<1.20$$

where,

βFw denotes a magnification of the focusing lens group in the wide angle end state, and βFt denotes a magnification of the focusing lens group in the telephoto end state.

5. The zoom lens according to claim 1, wherein a following conditional expression is satisfied $$1.35<FNw<2.65$$

where,

FNw denotes the maximum aperture in the wide angle end state.

6. The zoom lens according to claim 1, wherein a following conditional expression is satisfied $$0.21<GD2/ft<0.55$$

where,

GD2 denotes a thickness of the second lens group on the optical axis, and ft denotes a focal length of the zoom lens in the telephoto end state.

7. The zoom lens according to claim 1, wherein a following conditional expression is satisfied $$1.10<f1/ft<2.30$$

where, f1 denotes a focal length of the first lens group, and ft denotes a focal length of the zoom lens in the telephoto end state.

8. The zoom lens according to claim 1, wherein a following conditional expression is satisfied $$1.90<TLt/ft<3.80$$

where,

TLt denotes a total length of the zoom lens in the telephoto end state, and ft denotes a focal length of the zoom lens in the telephoto end state.

9. The zoom lens according to claim 1, wherein a following conditional expression is satisfied $$30.0°<\omega w<60.0°$$

where, cow denotes a half angle of view in the wide angle end state.

10. The zoom lens according to claim 1, wherein the second lens group consists of, in order from the object: a lens having negative refractive power, a lens having negative refractive power, and a lens having positive refractive power.

11. The zoom lens according to claim 1, wherein the fourth lens group consists of a single lens having negative refractive power.

12. The zoom lens according to claim 1, wherein the two lenses of the first lens group are a cemented lens having a meniscus shape having a convex surface facing the object.

13. The zoom lens according to claim 1, wherein the third lens group comprises, in order from the object: a positive lens component, a negative lens component, and a positive lens component, each of the lens components being a single lens or a cemented lens.

14. The zoom lens according to claim 1, wherein a distance between adjacent lens groups in the first to the fifth lens groups is changed upon zooming from the wide angle end state to the telephoto end state.

15. The zoom lens according to claim 1, wherein at least a part of the first to the fifth lens groups is configured to serve as a vibration-proof lens group with a displacement component in a direction orthogonal to the optical axis.

16. The zoom lens according to claim 1, wherein at least a part of the second to the fourth lens groups is configured to serve as a vibration-proof lens group with a displacement component in a direction orthogonal to the optical axis.

17. The zoom lens according to claim 1, wherein at least a part of the third lens group is configured to serve as a vibration-proof lens group with a displacement component in a direction orthogonal to the optical axis.

18. The zoom lens according to claim 1, wherein the fourth lens group comprises at least one aspherical surface.

19. The zoom lens according to claim 1, wherein a range in which focusing is possible is moved toward a short distant side with at least one of the lens groups not serving as the focusing lens group moved, at any focal length between the wide angle end state and the telephoto end state.

20. An optical apparatus comprising the zoom lens according to claim 1.

21. The zoom lens according to claim 1, wherein the third lens group comprises two lenses both having negative refractive power.

22. The zoom lens according to claim 1, wherein the fifth lens group comprises a bi-convex lens having positive refractive power.

23. A zoom lens comprising, in order from an object: a first lens group having positive refractive power; a second lens group having negative refractive power; a third lens group having positive refractive power; a fourth lens group having negative refractive power and having at least one negative lens; and a fifth lens group having positive refractive power, wherein the first to the fifth lens groups each move in an optical axis direction upon zooming from a wide angle end state to a telephoto end state, and respective distances between the first to the fifth lens groups are changed upon zooming from a wide angle end state to a telephoto end state, the first lens group consists of two lenses cemented with each other, which has a meniscus shape having a convex surface facing an object side, at least a part of the fourth lens group is configured to serve as a focusing lens group to move in the optical axis direction upon focusing, and following conditional expressions are satisfied:

$$1.10<f1/ft<2.30$$

$$1.000<(ft/fw)/FNw<1.900$$

where, f1 denotes a focal length of the first lens group, ft denotes a focal length of the zoom lens in the telephoto end state, fw denotes a focal length of the zoom lens in the wide angle end state, and FNw denotes the maximum aperture in the wide angle end state.

24. An optical apparatus comprising the zoom lens according to claim 23.

25. A method for manufacturing a zoom lens including, in order from an object: a first lens group having positive refractive power; a second lens group having negative refractive power; a third lens group having positive refractive power; a fourth lens group having negative refractive power; and a fifth lens group having positive refractive power, the method comprising:

arranging the first to the fifth lens groups so that each moves in an optical axis direction upon zooming from a wide angle end state to a telephoto end state; and at least a part of the fourth lens group being configured to serve as a focusing lens group to move in the optical axis direction upon focusing, and the method further comprising one of the following features A or B, wherein the feature A comprising:

the first lens group consisting of two lenses cemented with each other; and following conditional expressions being satisfied:

$$0.85 < (\beta 4w)/(\beta 4t) < 1.20$$

$$11.0° < \omega t < 22.0°$$

$$1.000 < (ft/fw)/FNw < 2.350$$

where, $\beta 4w$ denotes a magnification of the fourth lens group in the wide angle end state, $\beta 4t$ denotes a magnification of the fourth lens group in the telephoto end state, $\omega t$ denotes a half angle of view in the telephoto end state, fw denotes a focal length of the zoom lens in the wide angle end state, ft denotes a focal length of the zoom lens in the telephoto end state, and FNw denotes the maximum aperture in the wide angle end state, and the feature B comprising:

the fourth lens group having at least one negative lens;

the first lens group consisting of two lenses cemented with each other, which has a meniscus shape having a convex surface facing an object side; and following conditional expressions being satisfied:

$$1.10 < f1/ft < 2.30$$

$$1.000 < (ft/fw)/FNw < 1.900$$

where, f1 denotes a focal length of the first lens group, ft denotes a focal length of the zoom lens in the telephoto end state, fw denotes a focal length of the zoom lens in the wide angle end state, and FNw denotes the maximum aperture in the wide angle end state.

* * * * *